Figure 9:
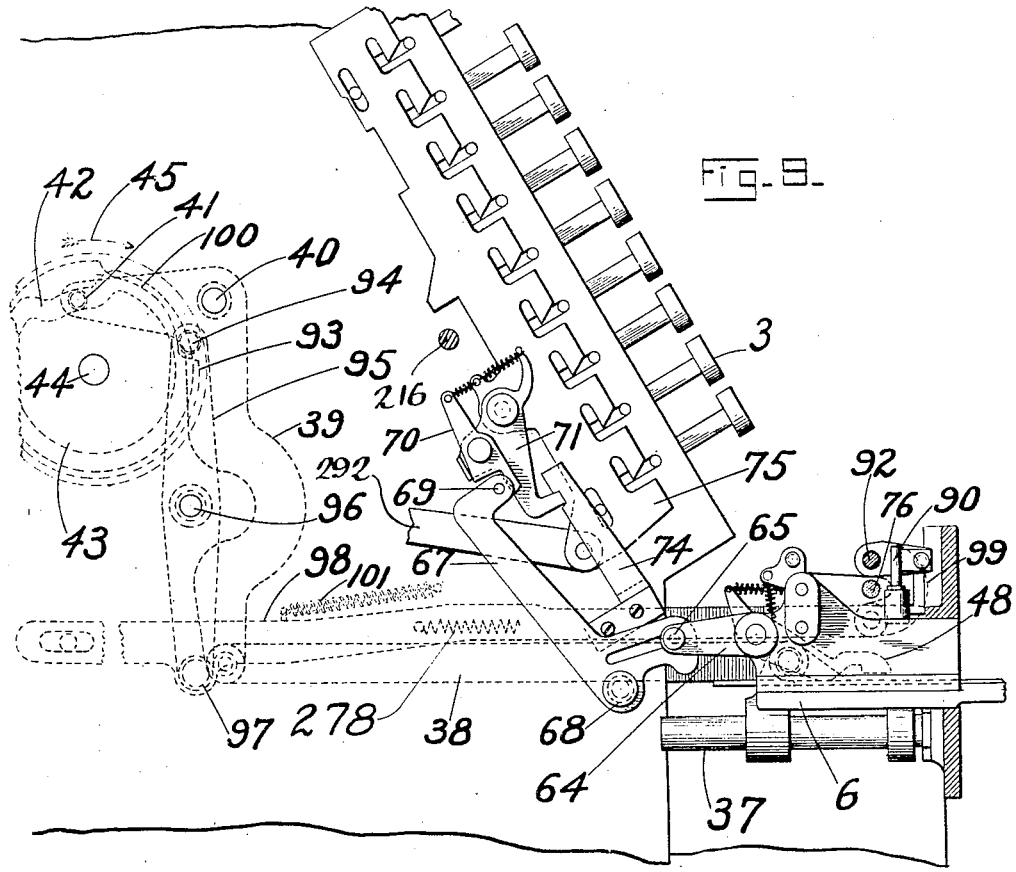

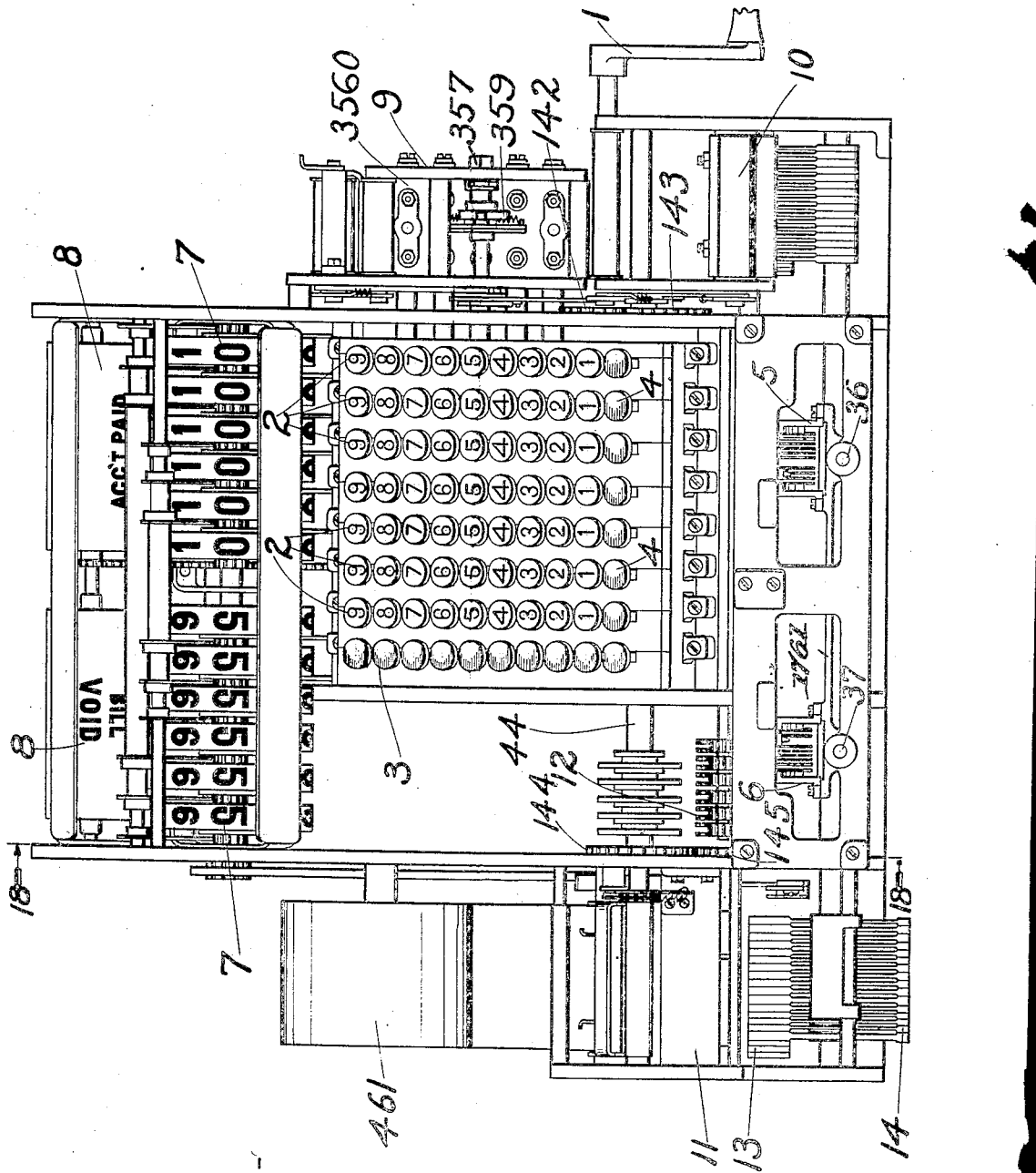

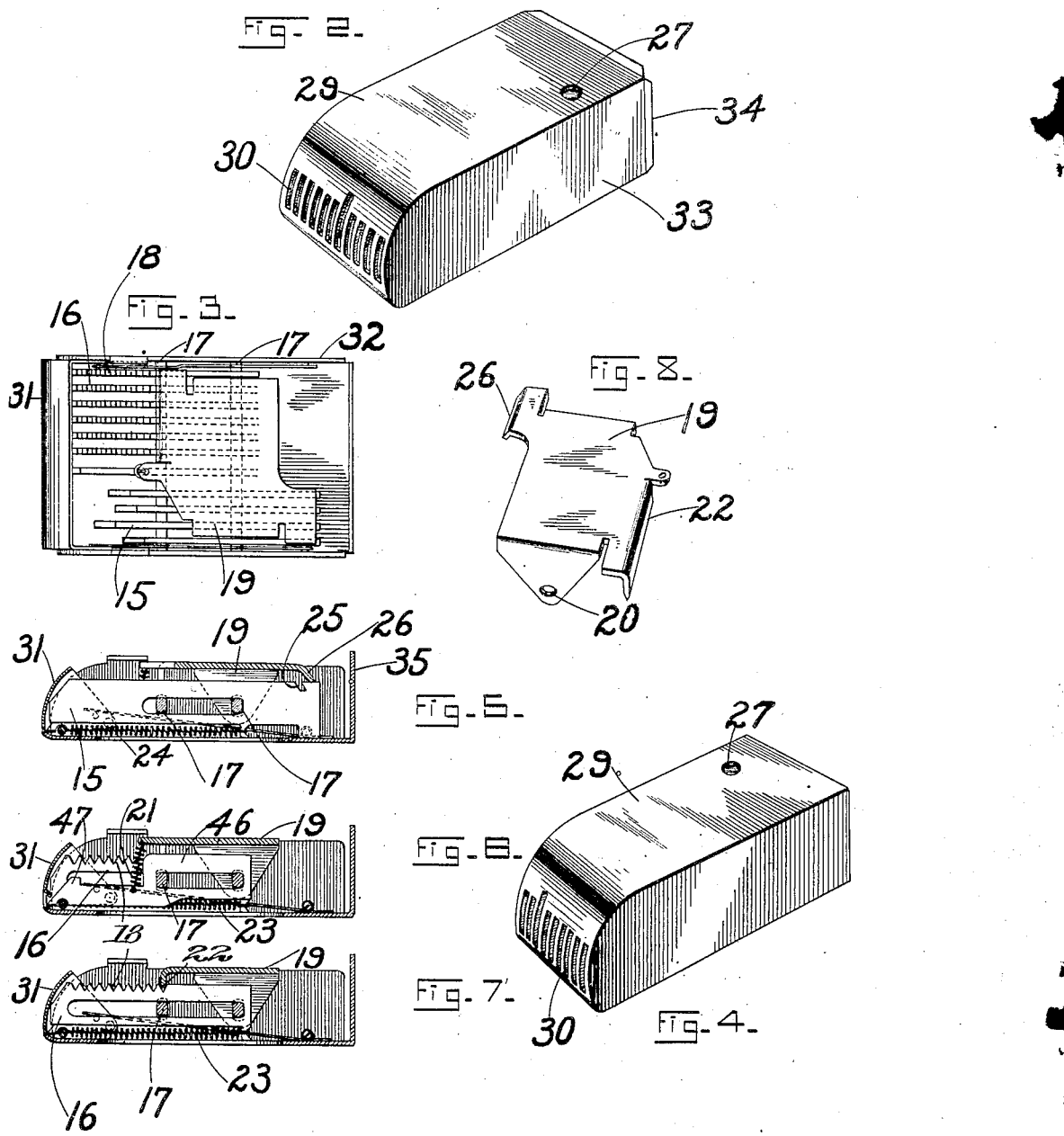

E. S. CHURCH.
CASH AND CREDIT REGISTER.
APPLICATION FILED JAN. 17, 1910.

1,206,813.

Patented Dec. 5, 1916.
33 SHEETS—SHEET 3.

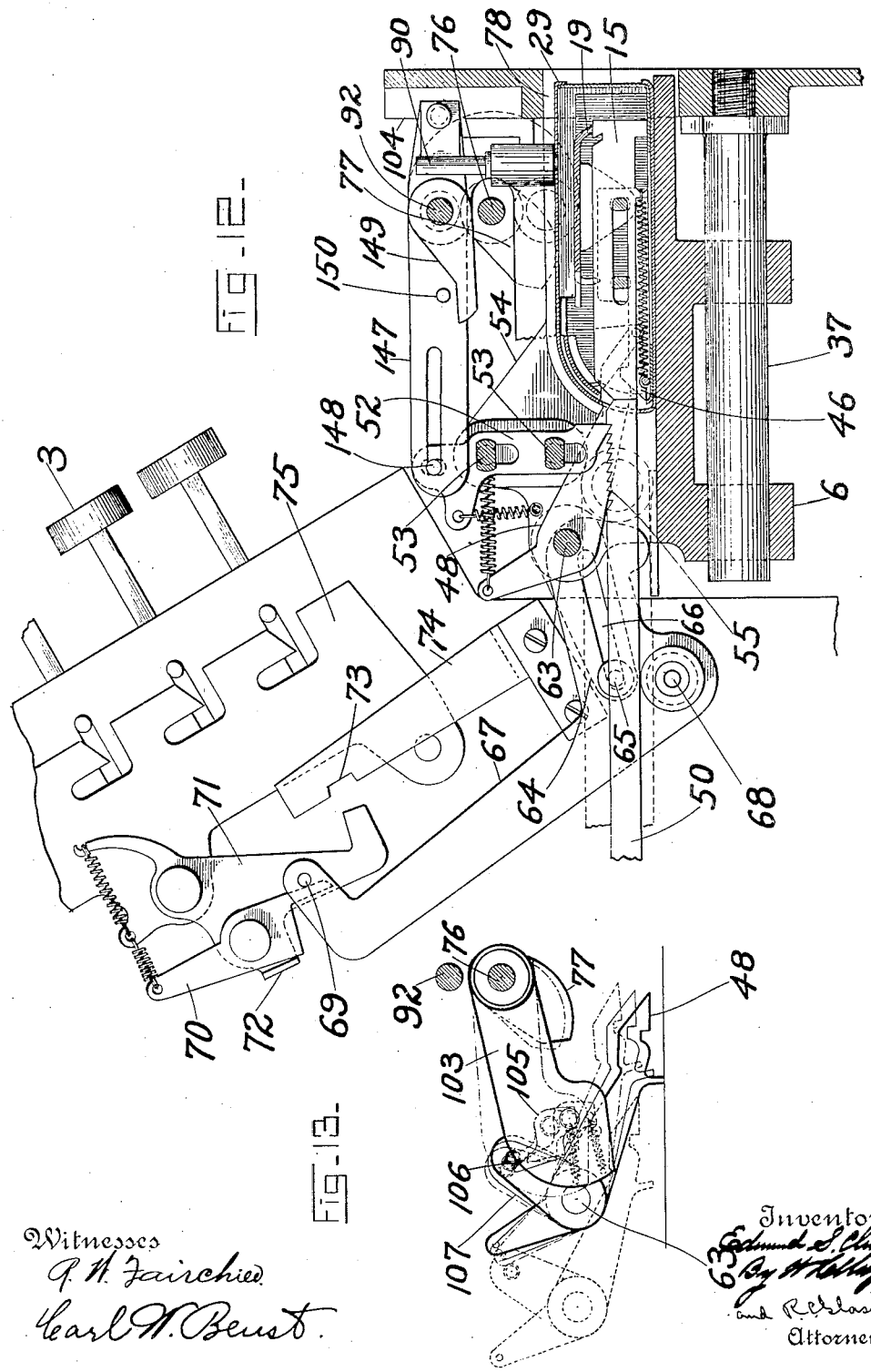

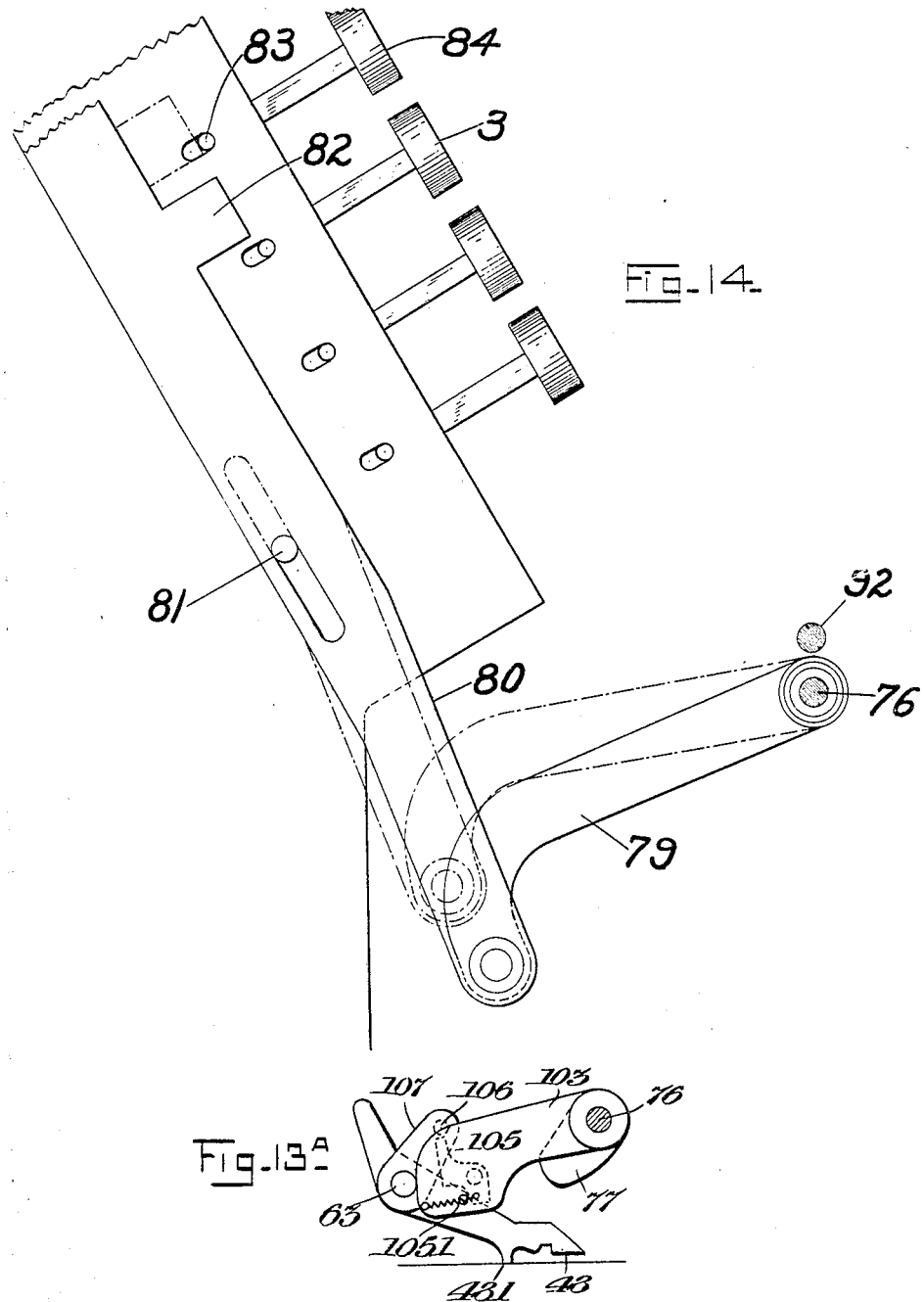

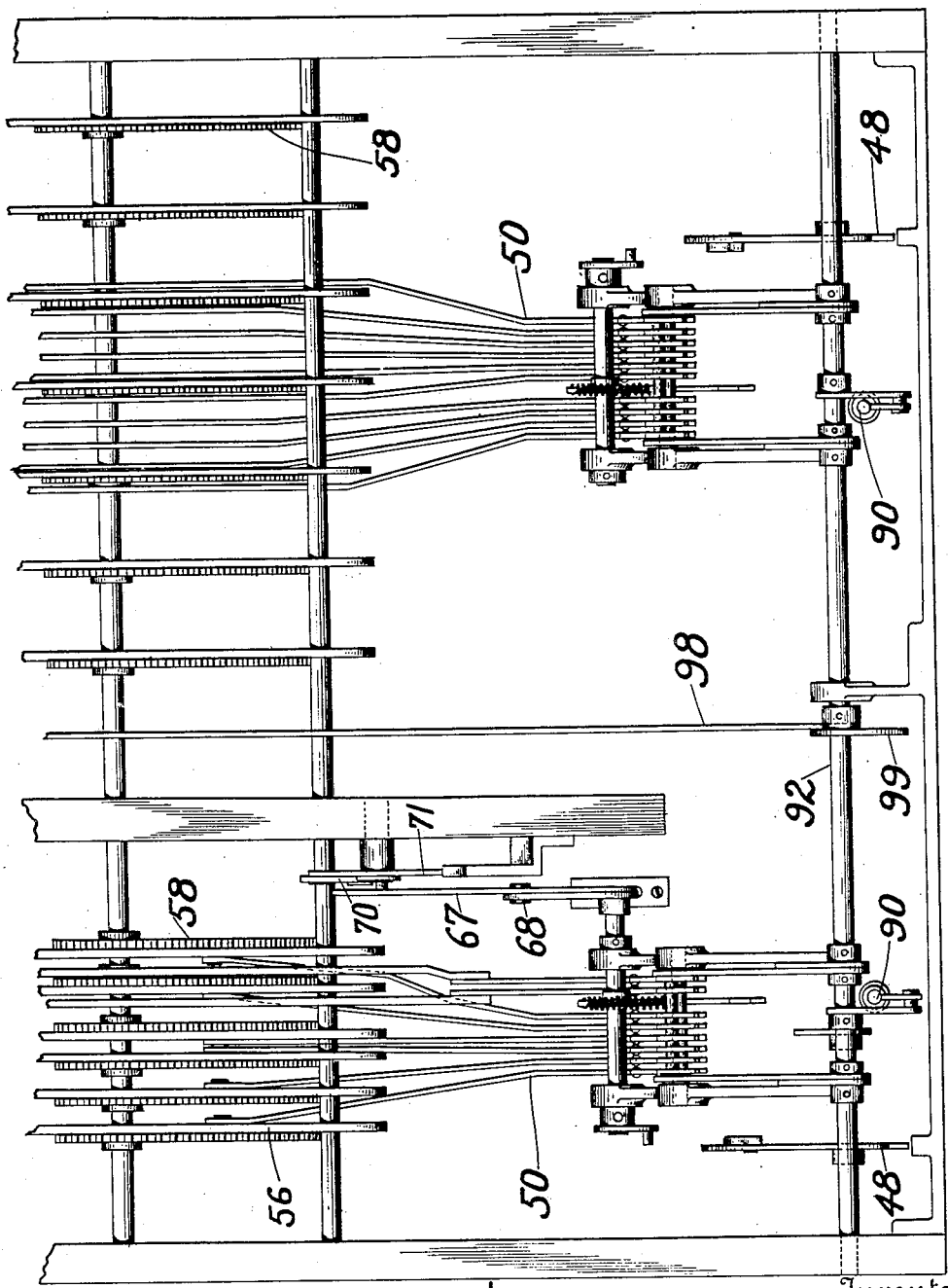

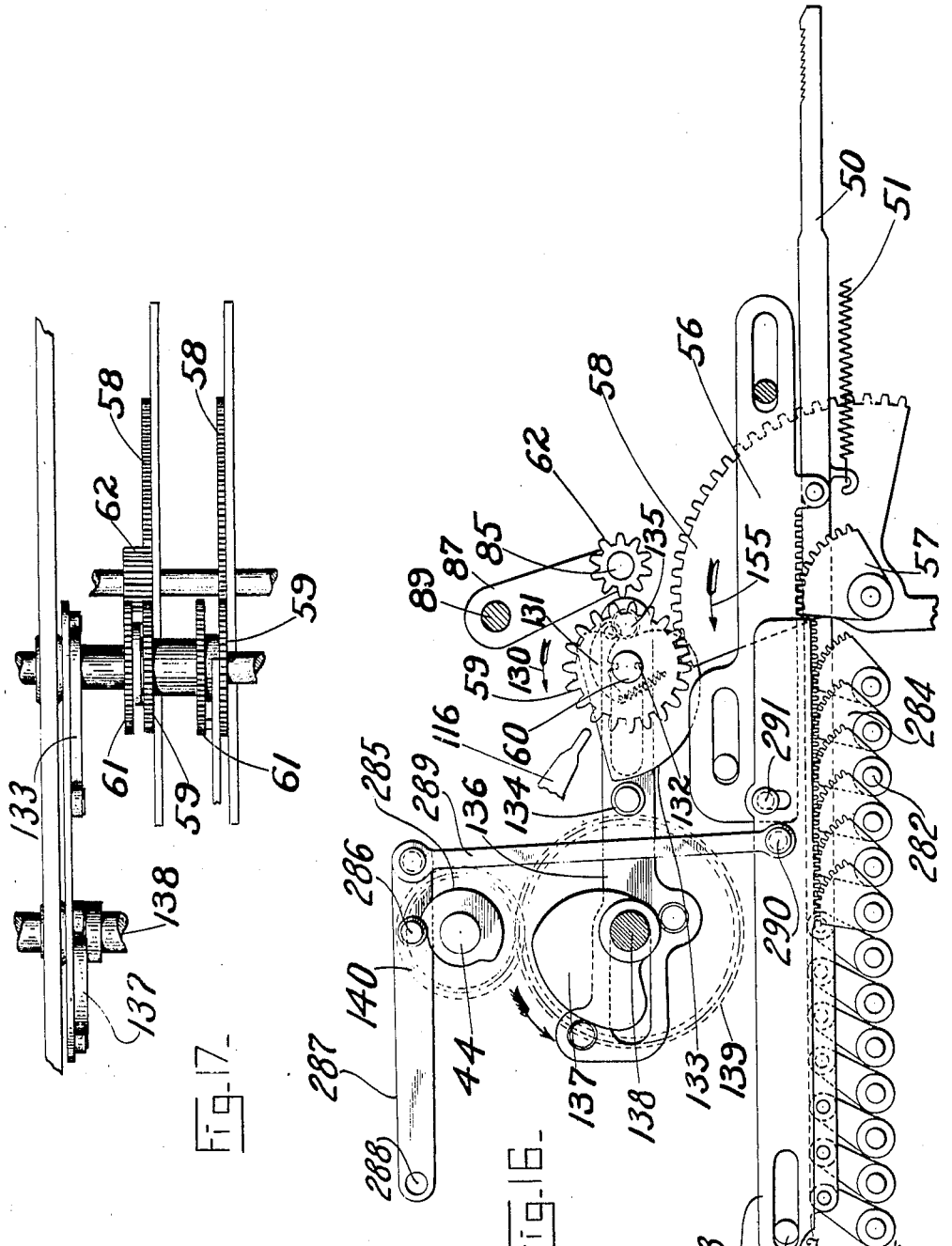

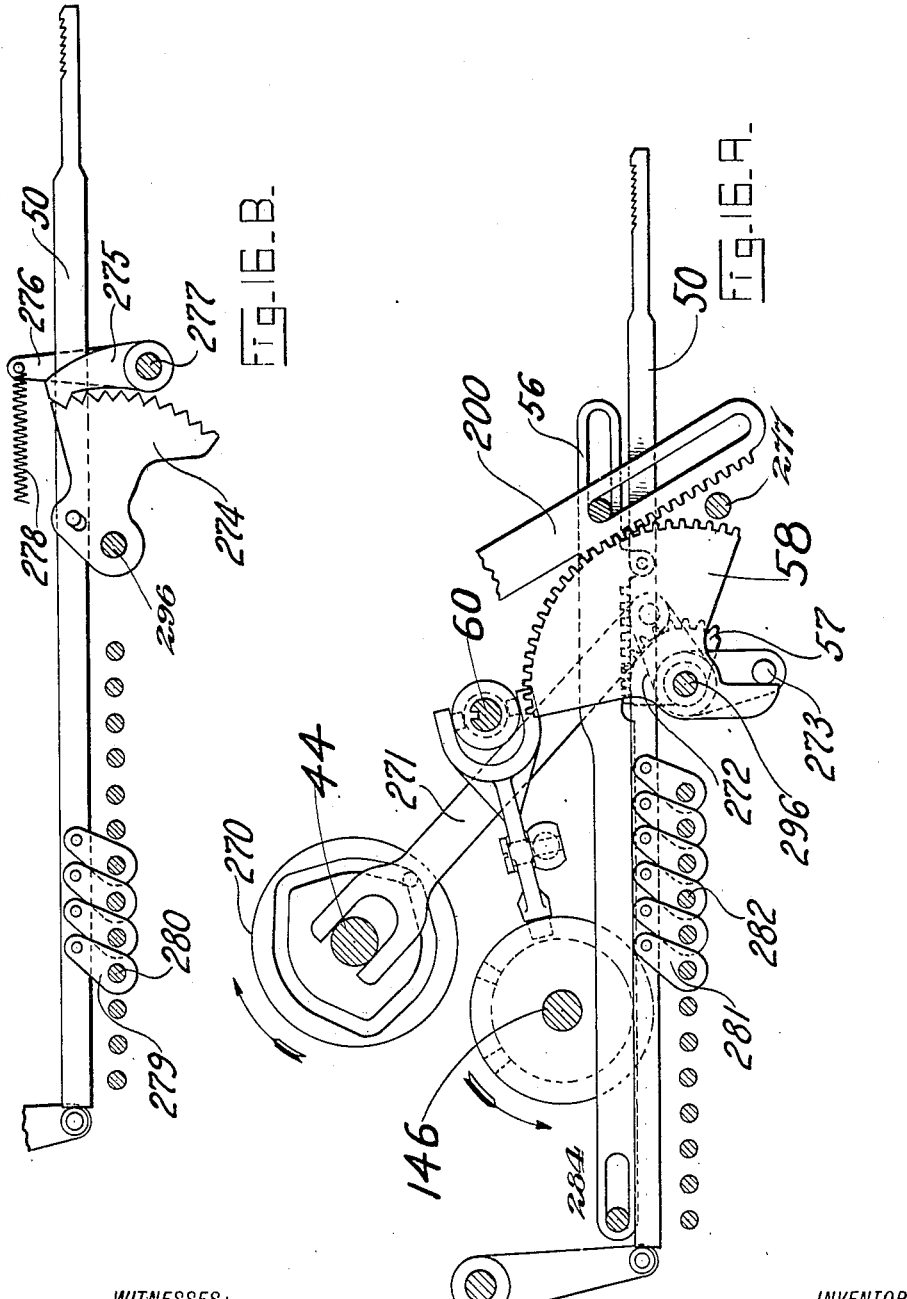

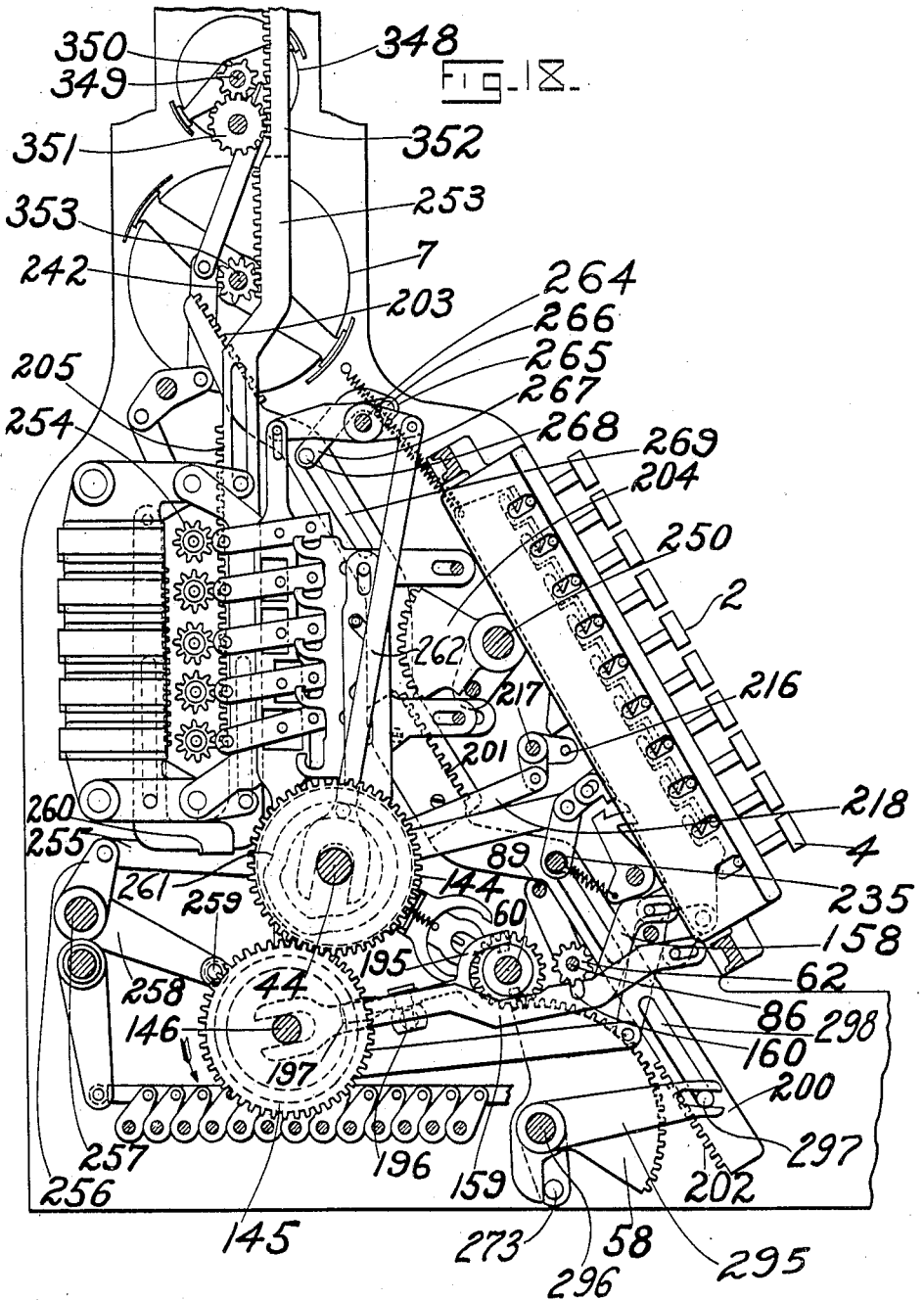

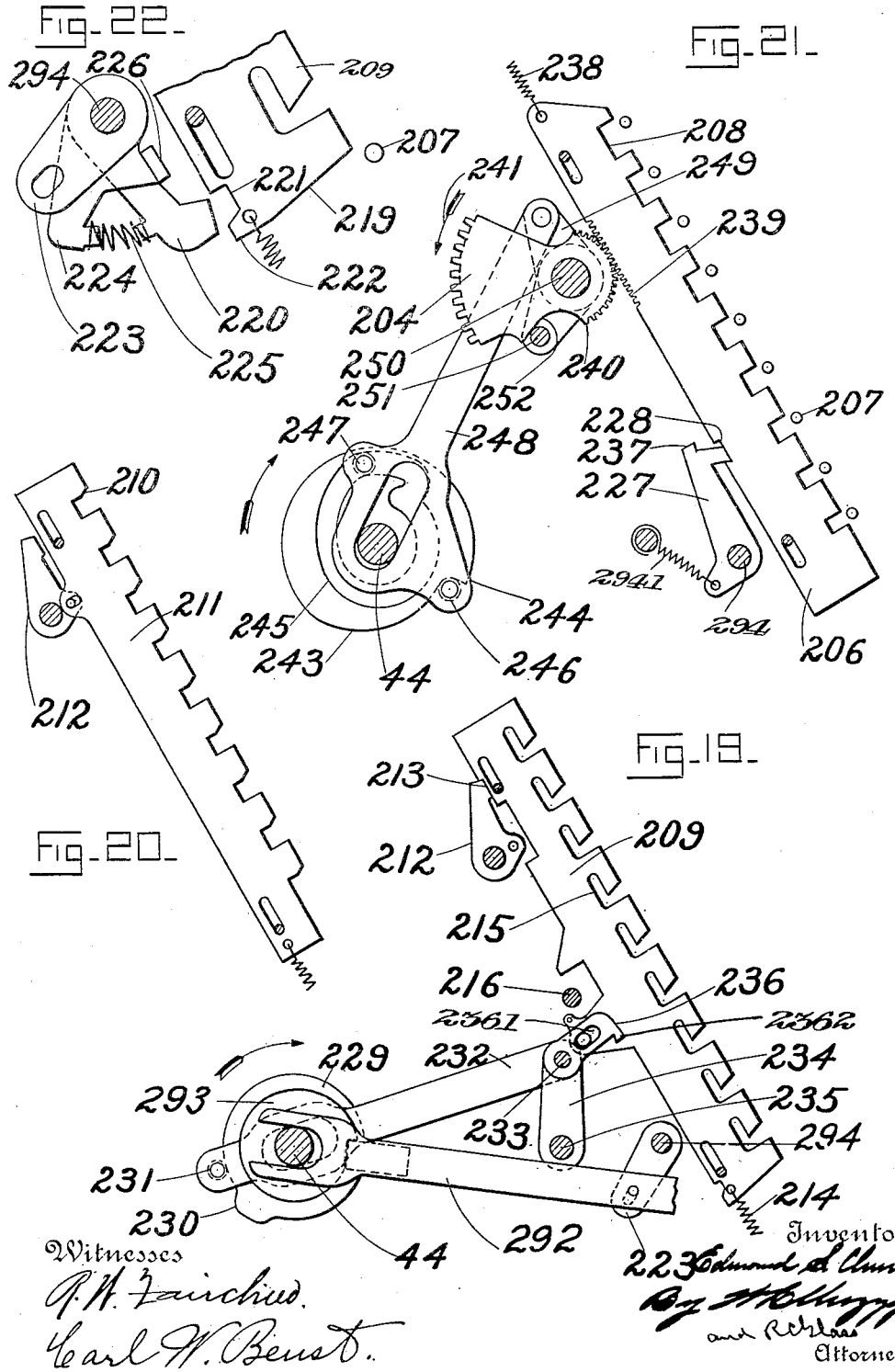

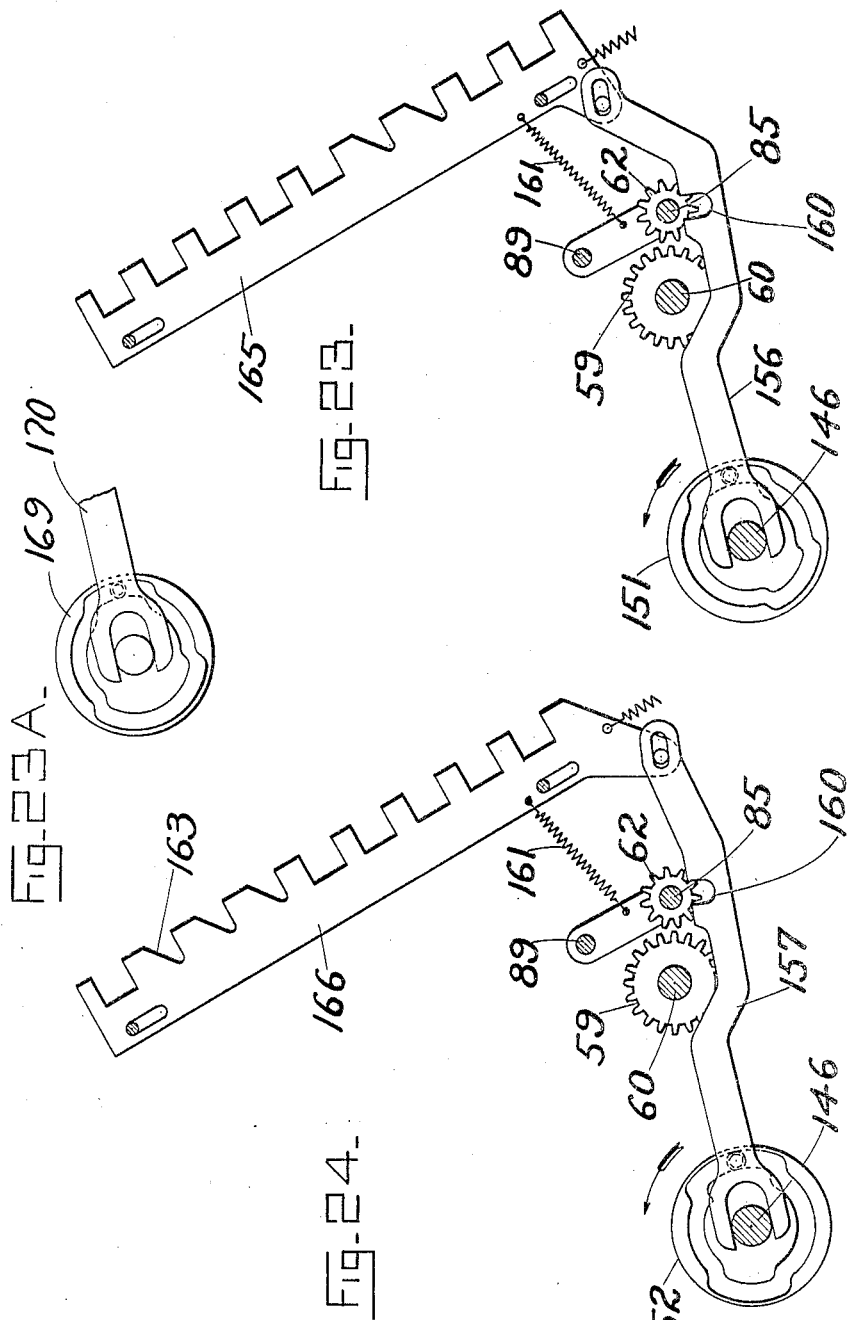

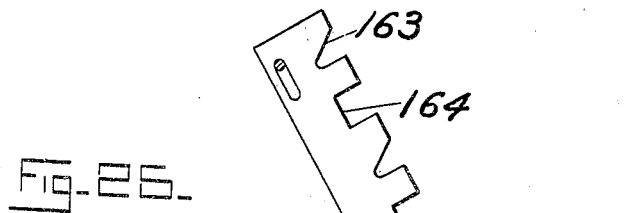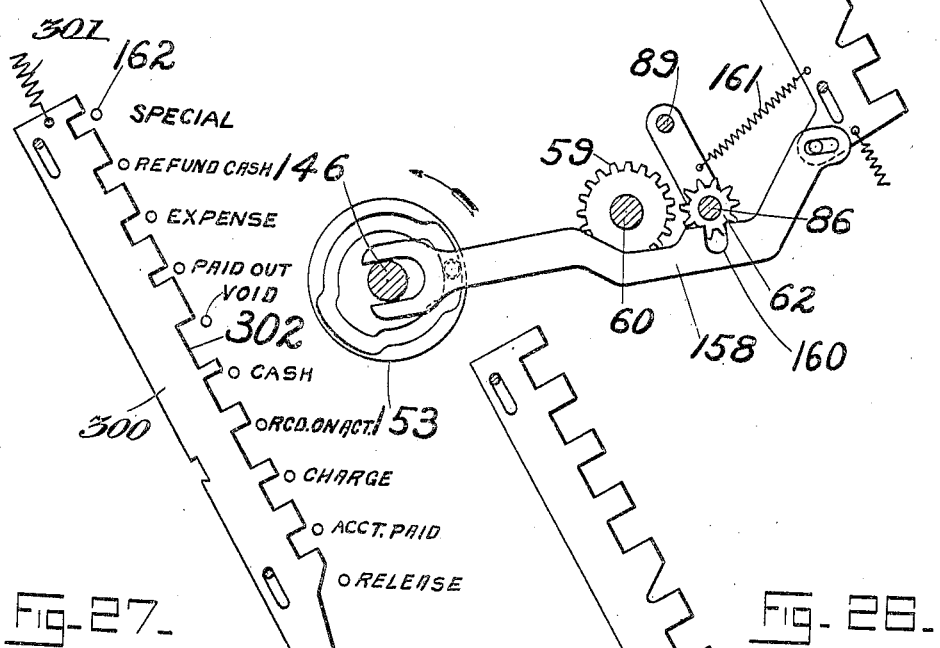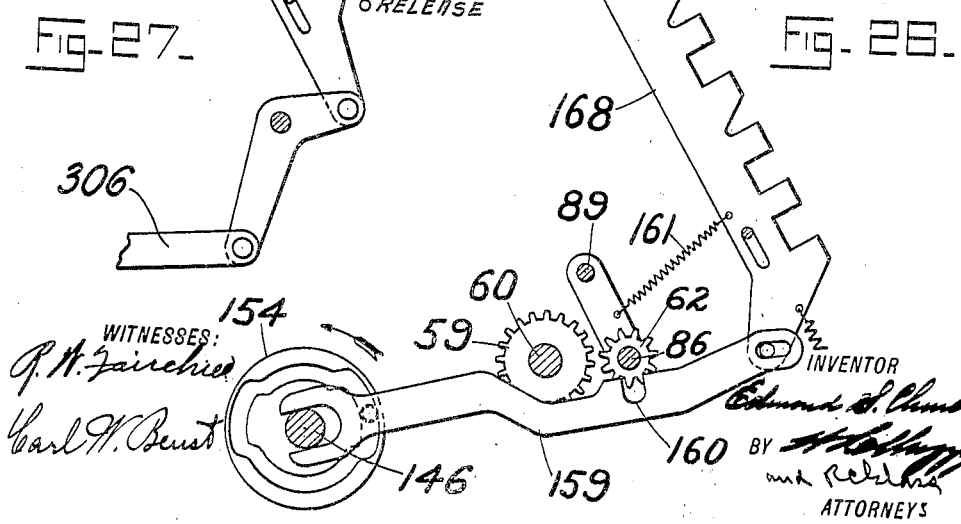

E. S. CHURCH.
CASH AND CREDIT REGISTER.
APPLICATION FILED JAN. 17, 1910.

1,206,813.

Patented Dec. 5, 1916.
33 SHEETS—SHEET 13.

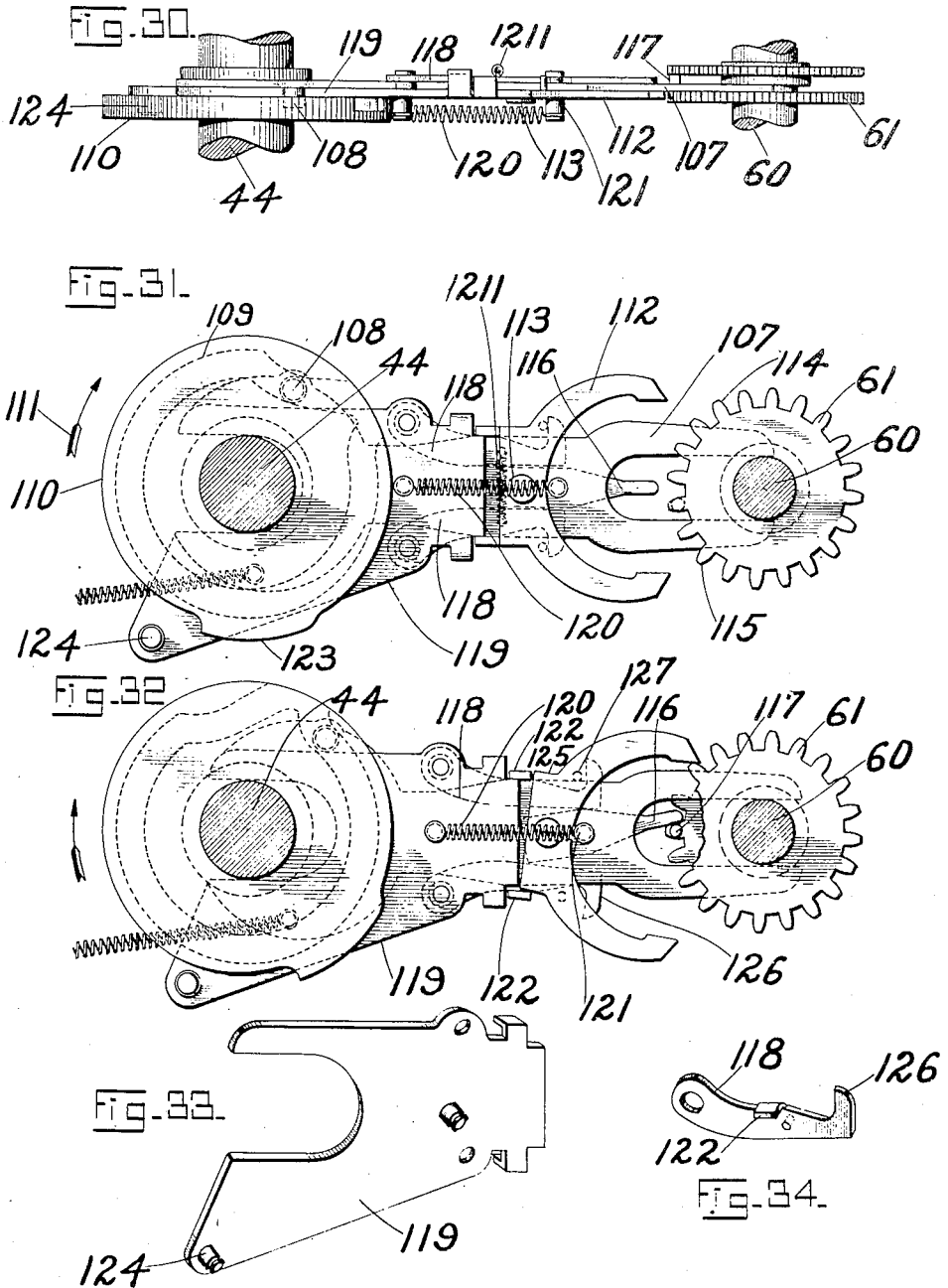

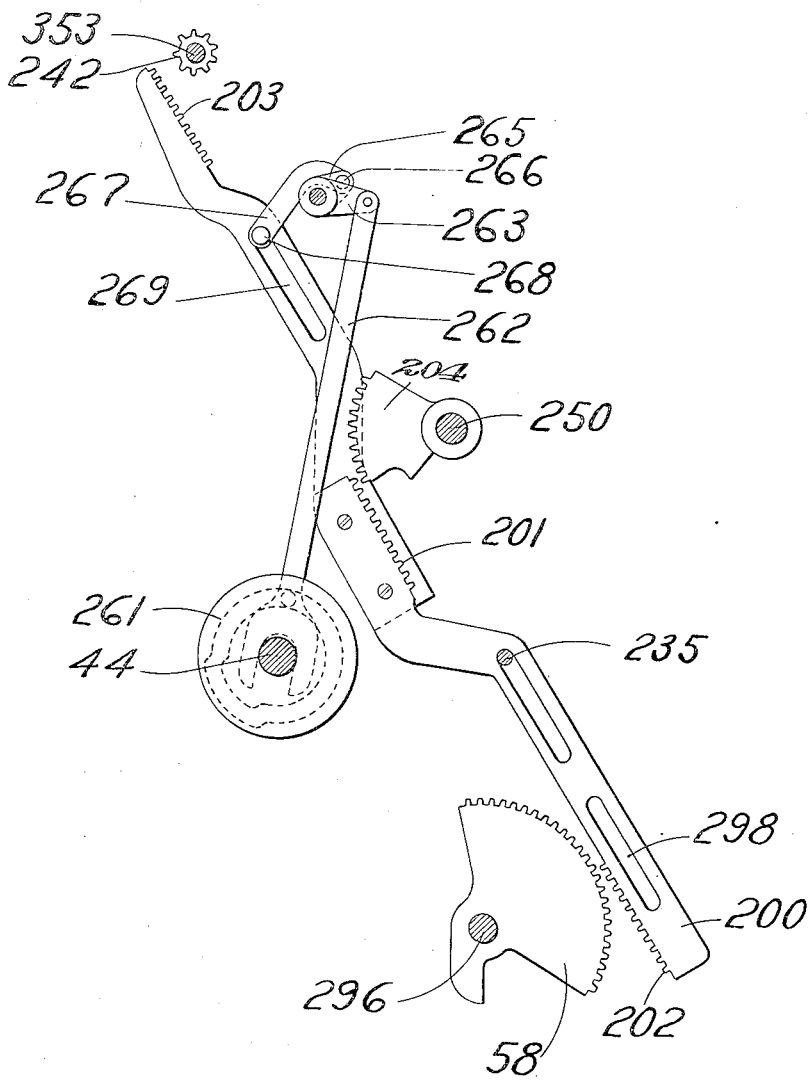

E. S. CHURCH.
CASH AND CREDIT REGISTER.
APPLICATION FILED JAN. 17, 1910.
1,206,813.
Patented Dec. 5, 1916.
33 SHEETS—SHEET 16.
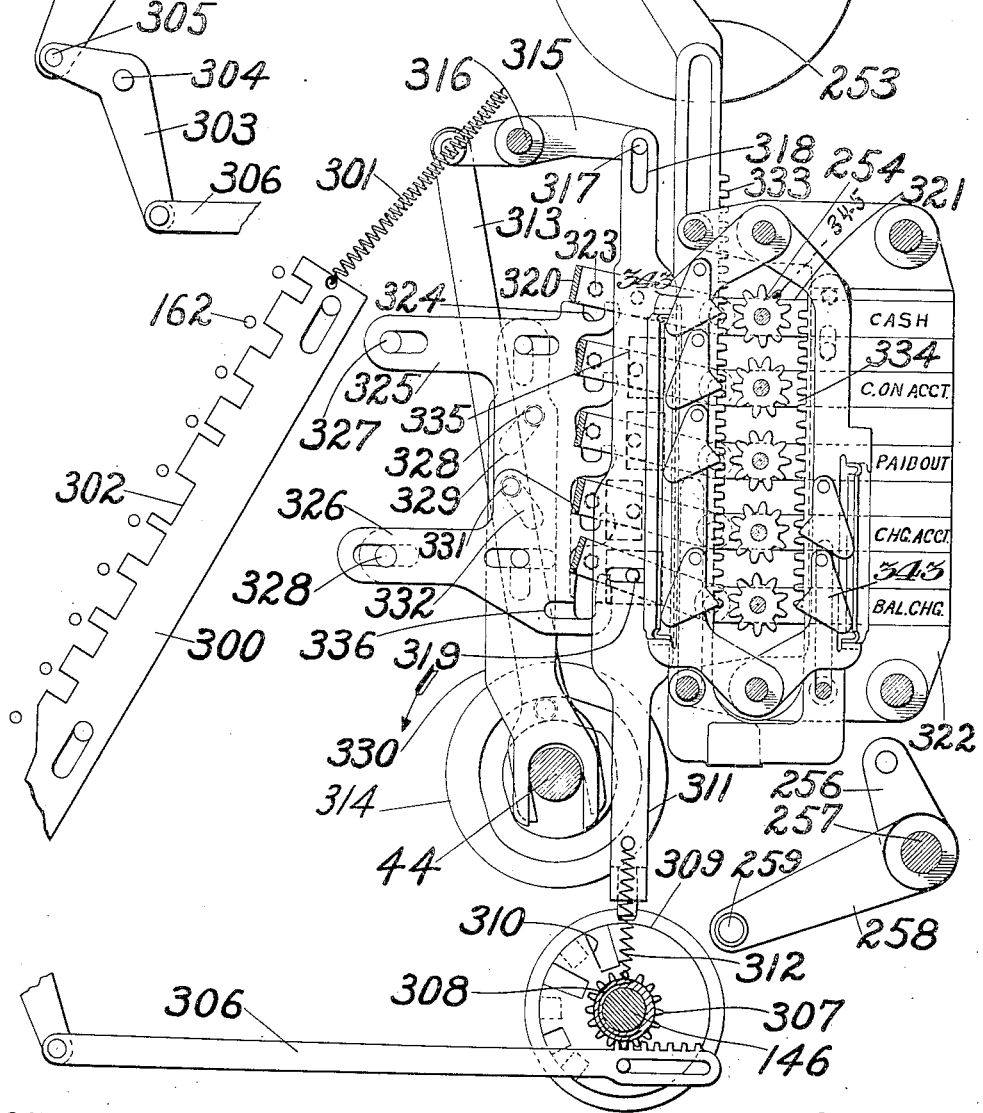

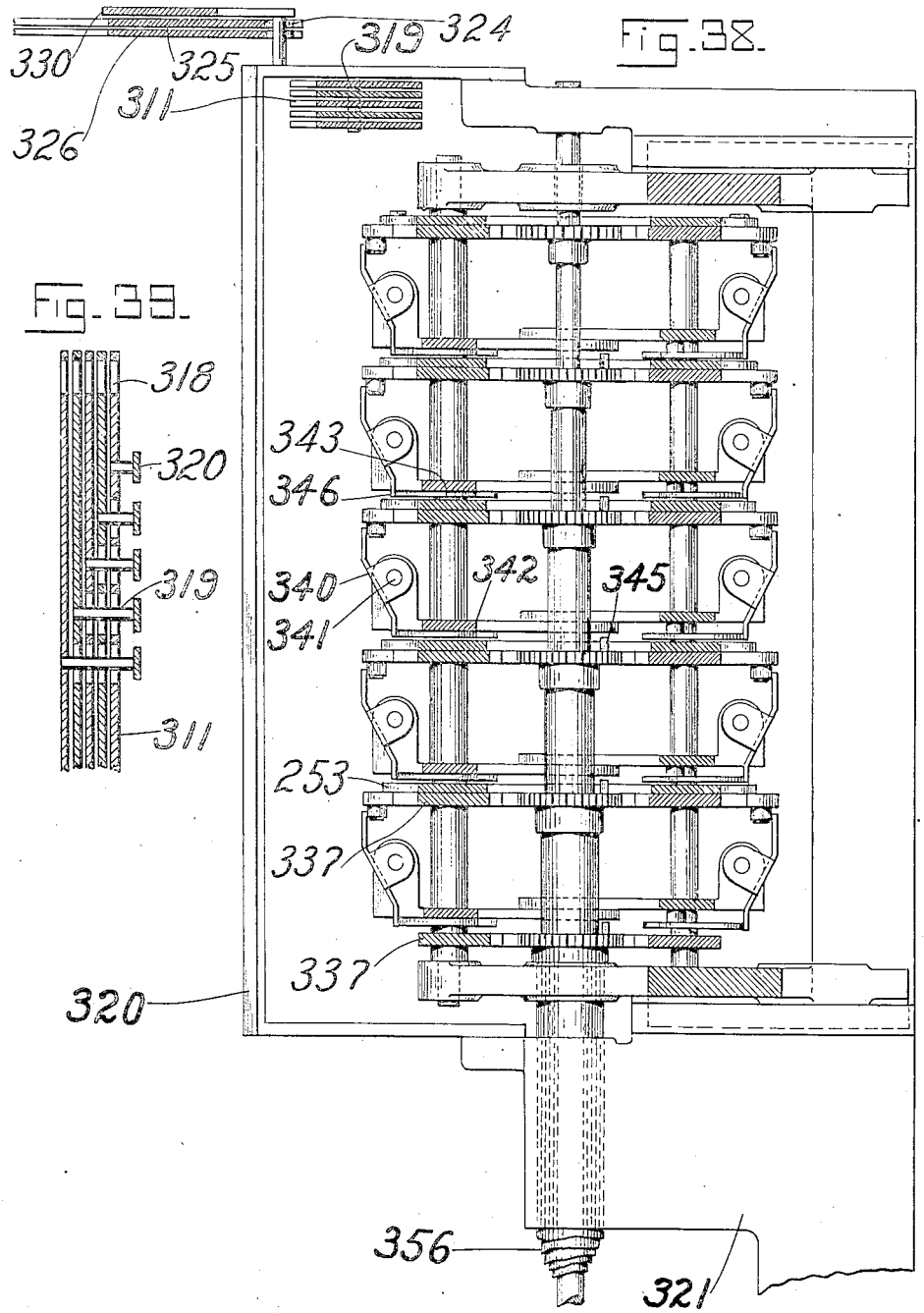

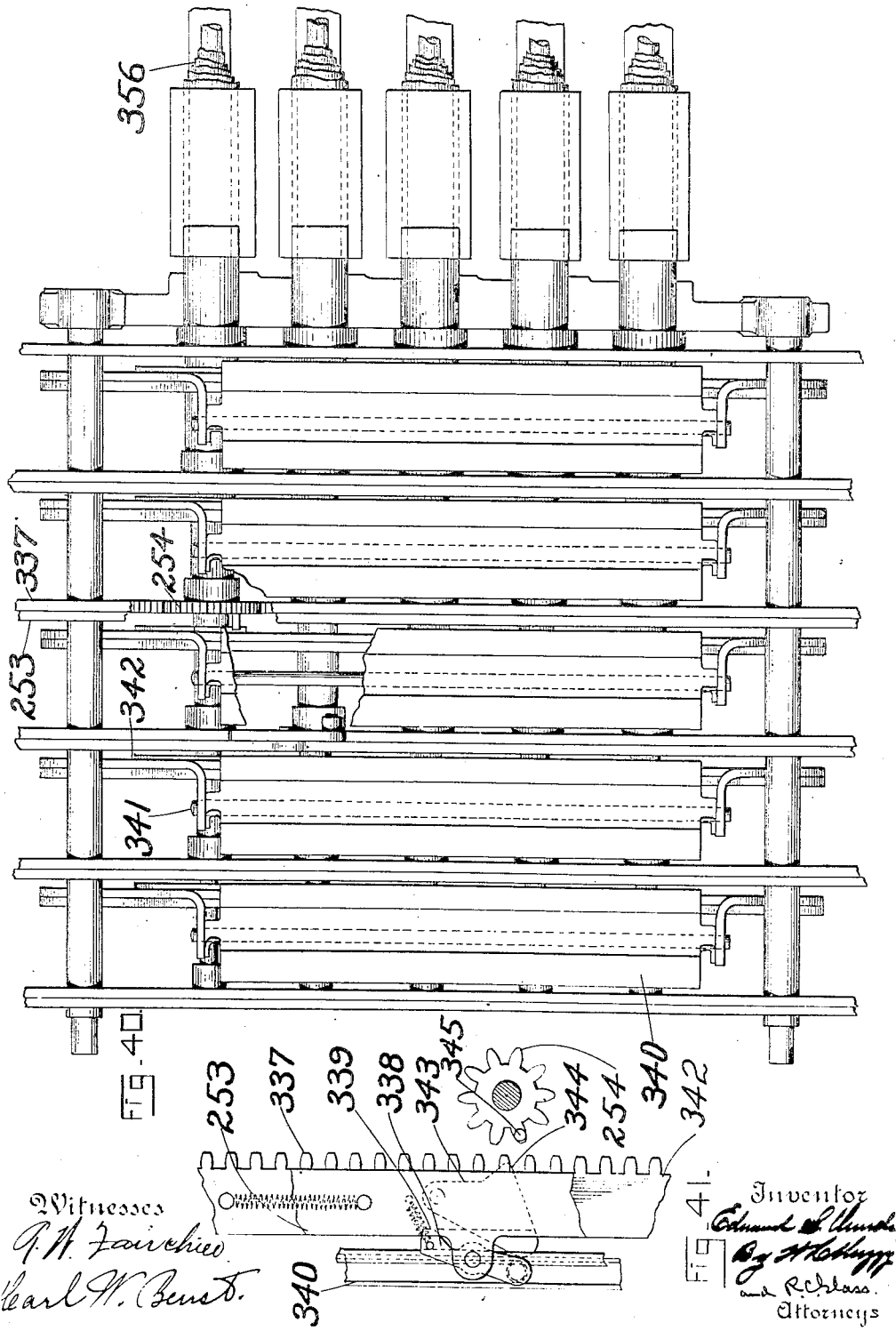

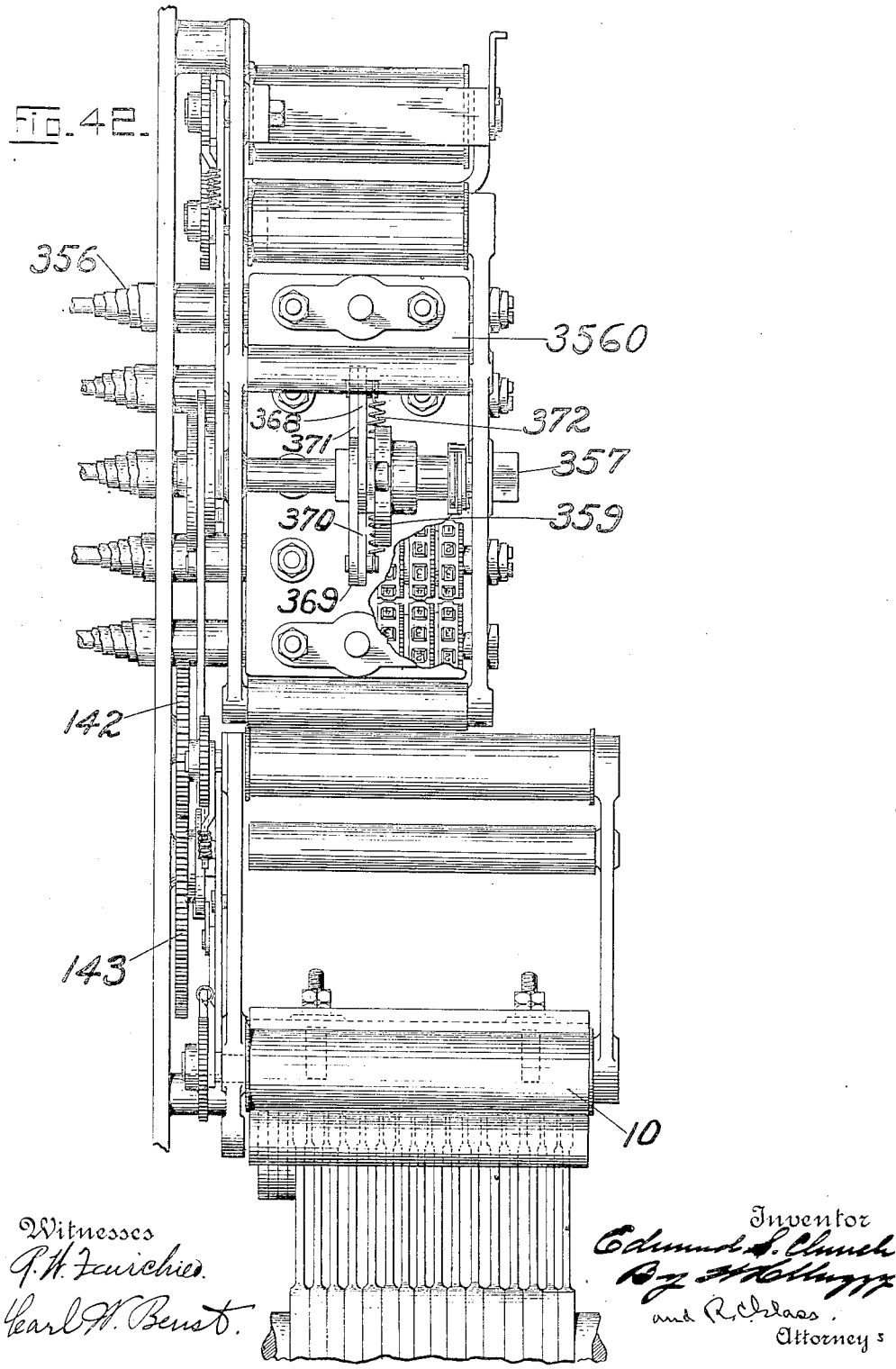

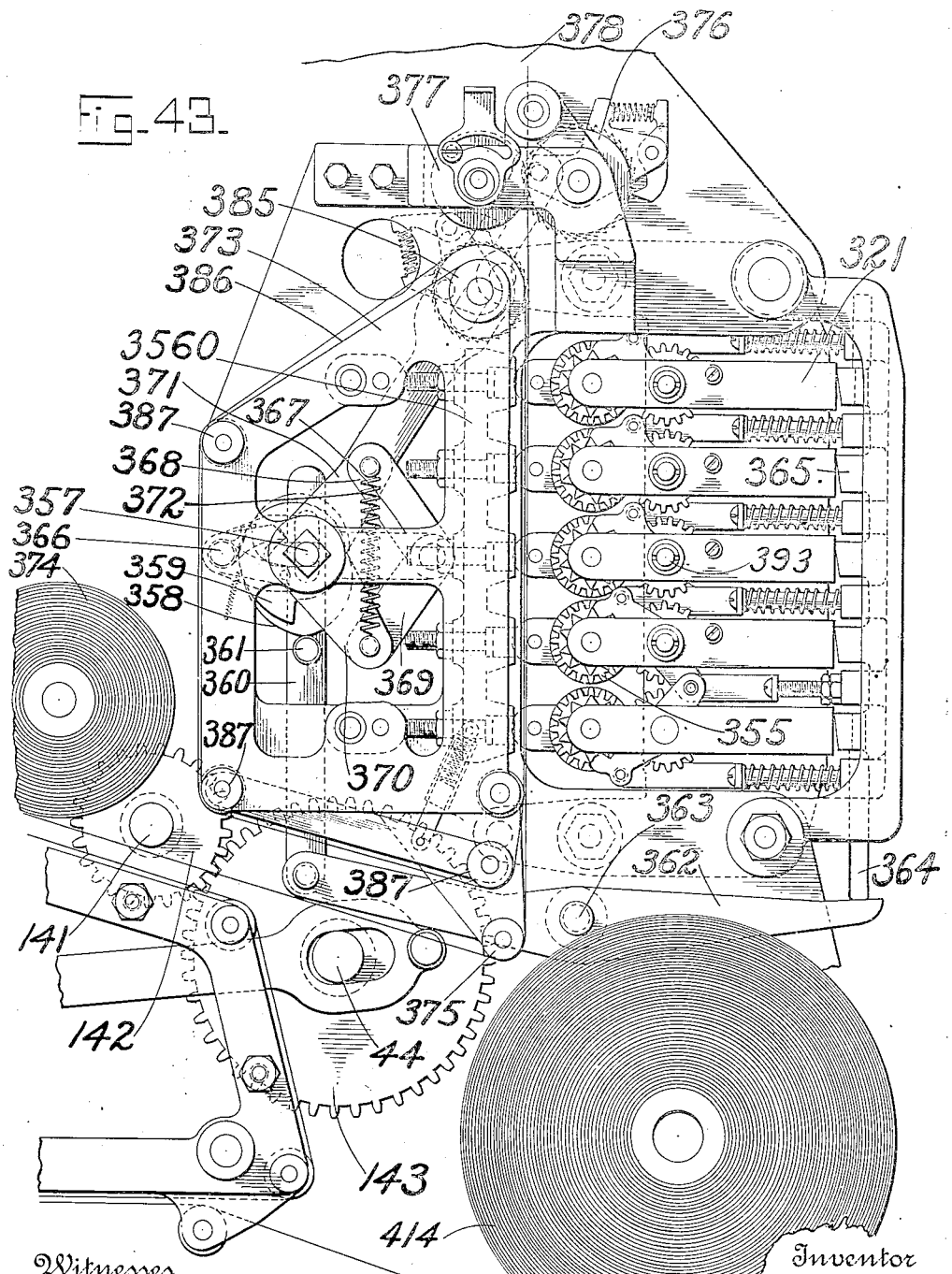

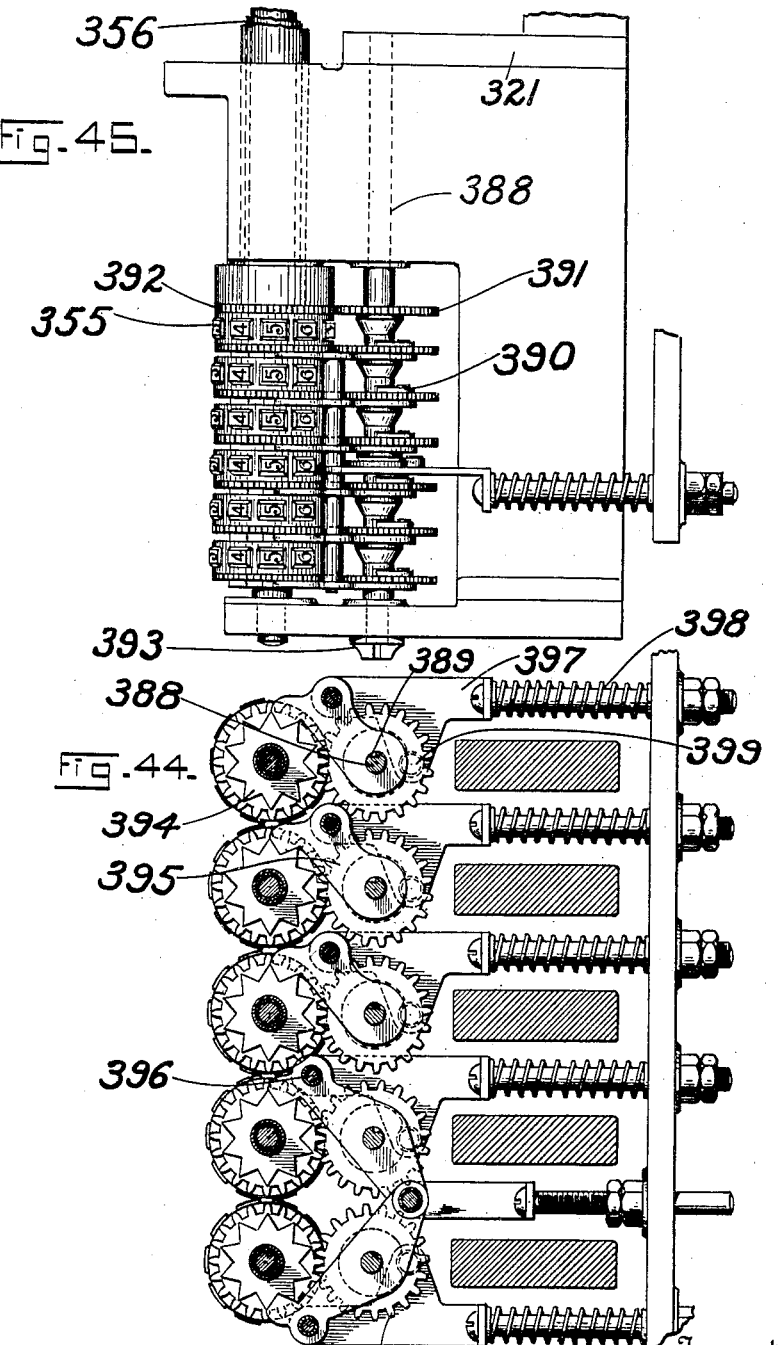

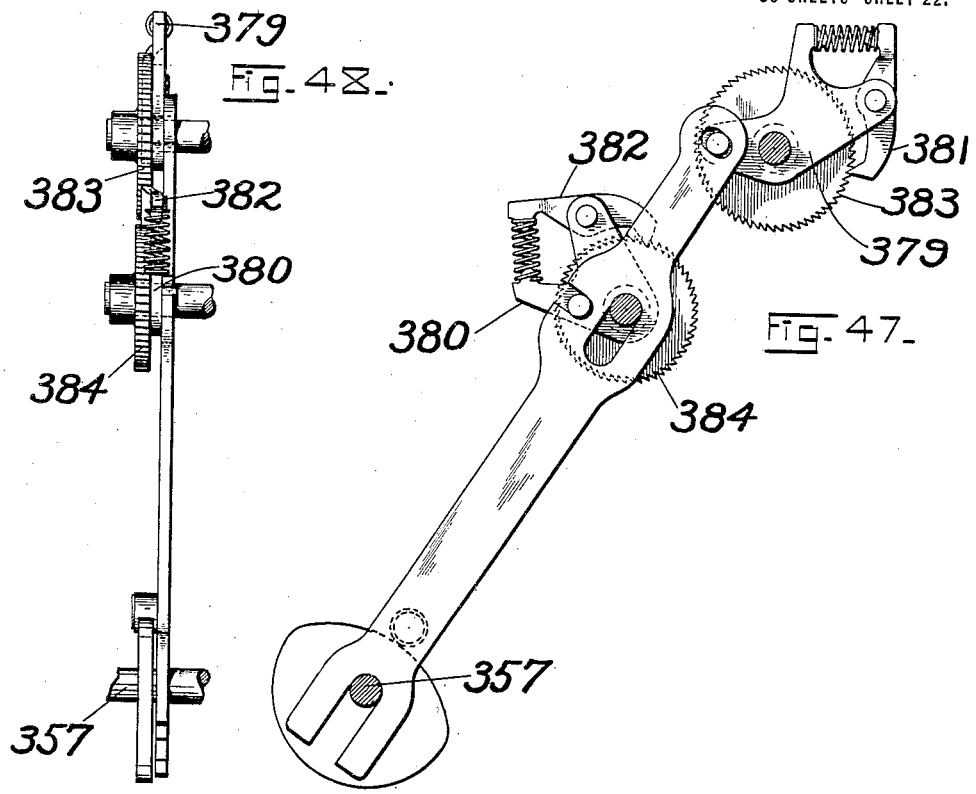
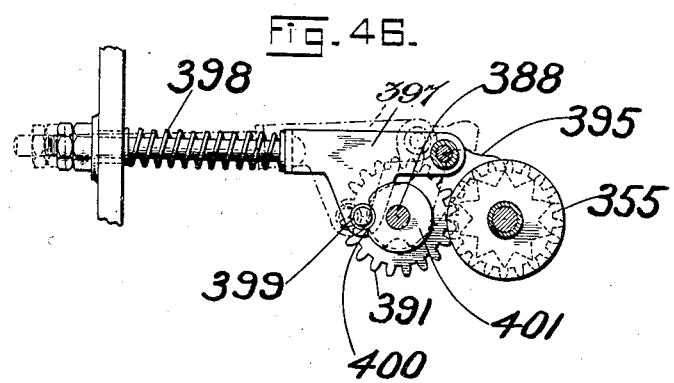

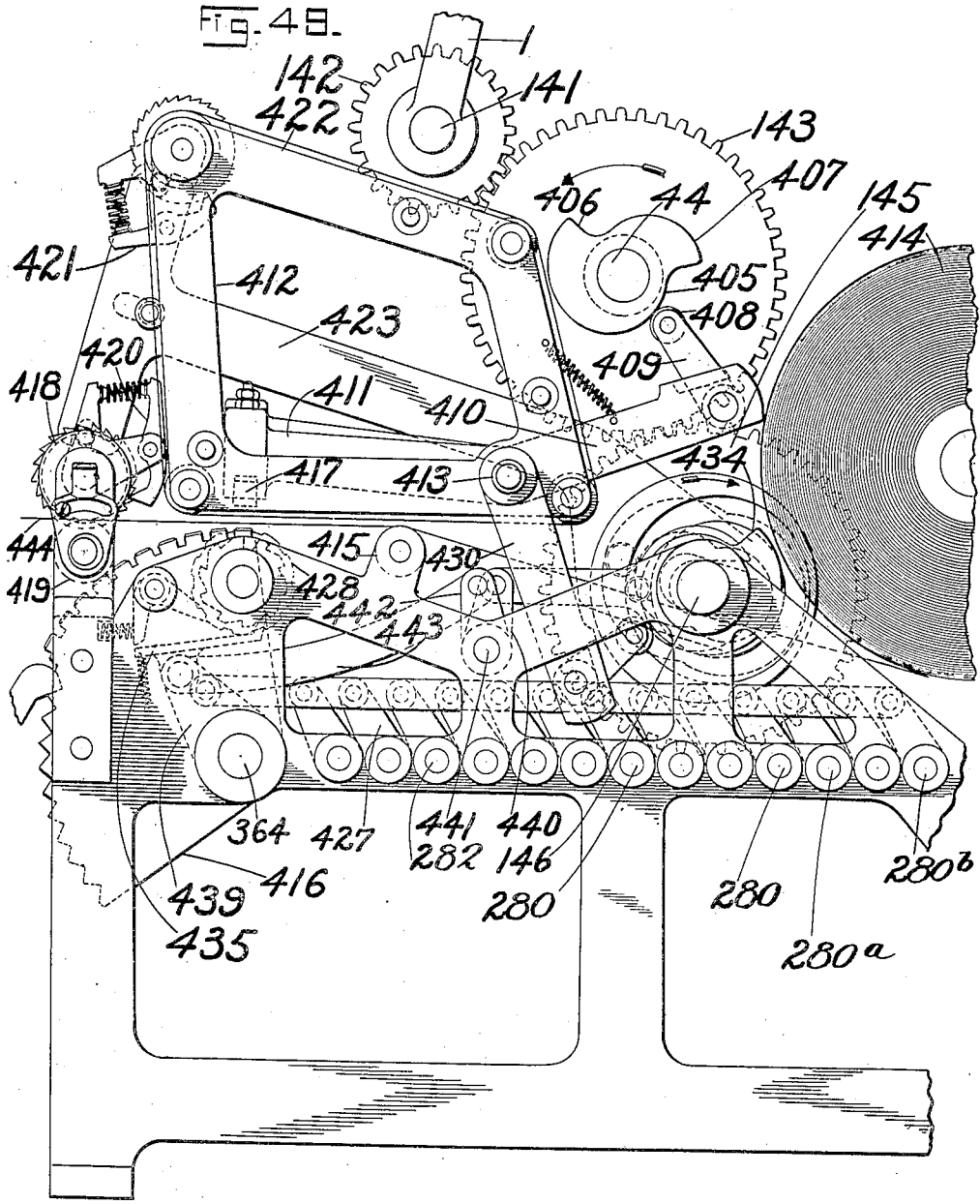

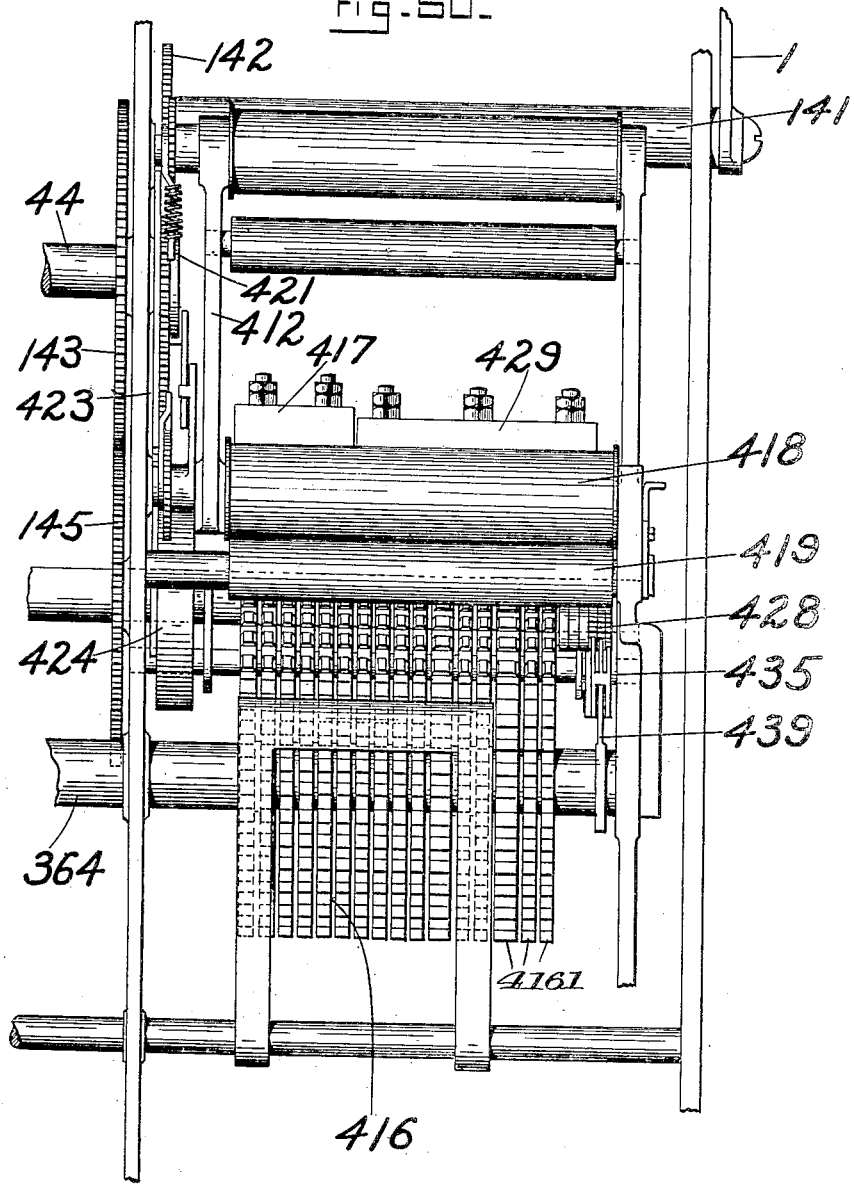

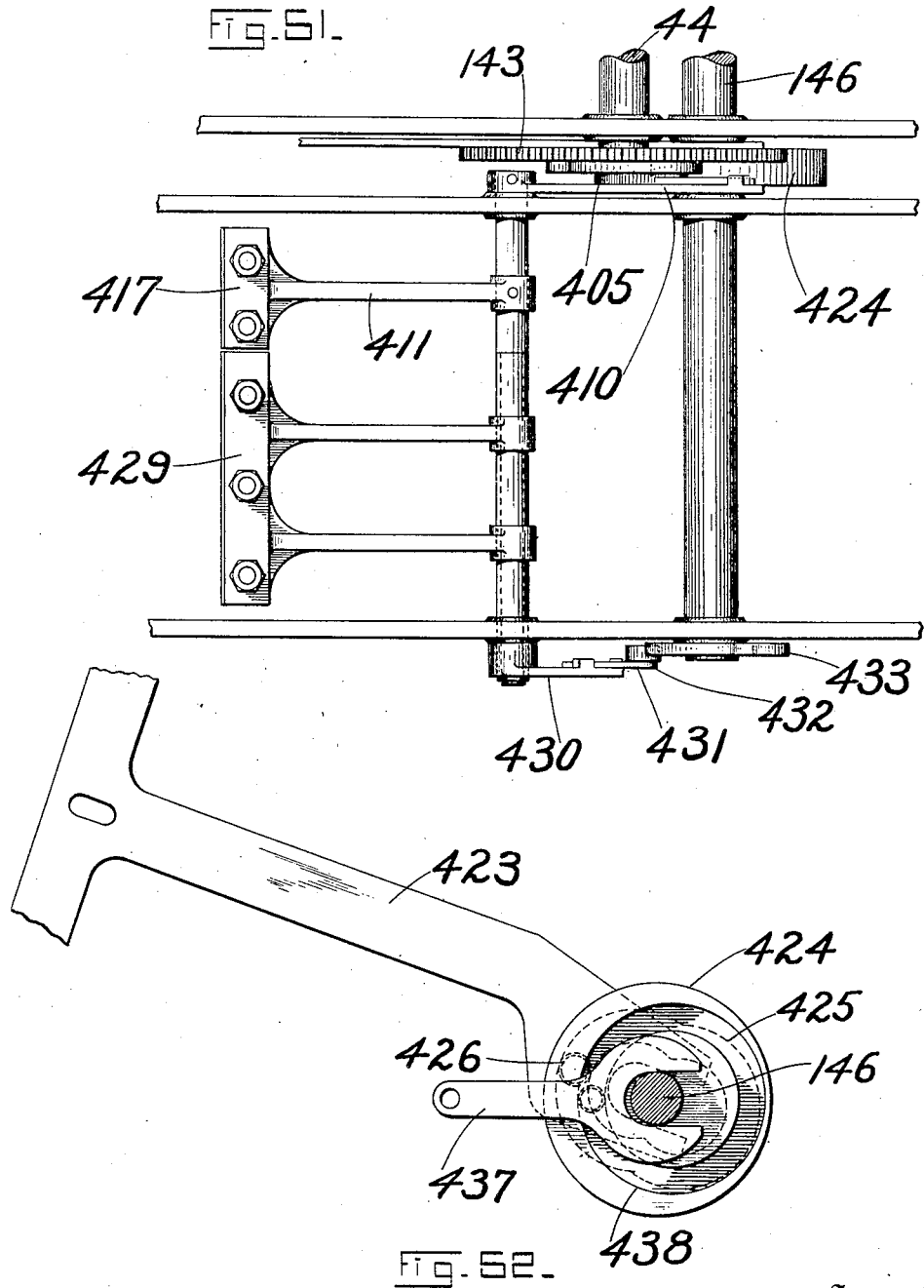

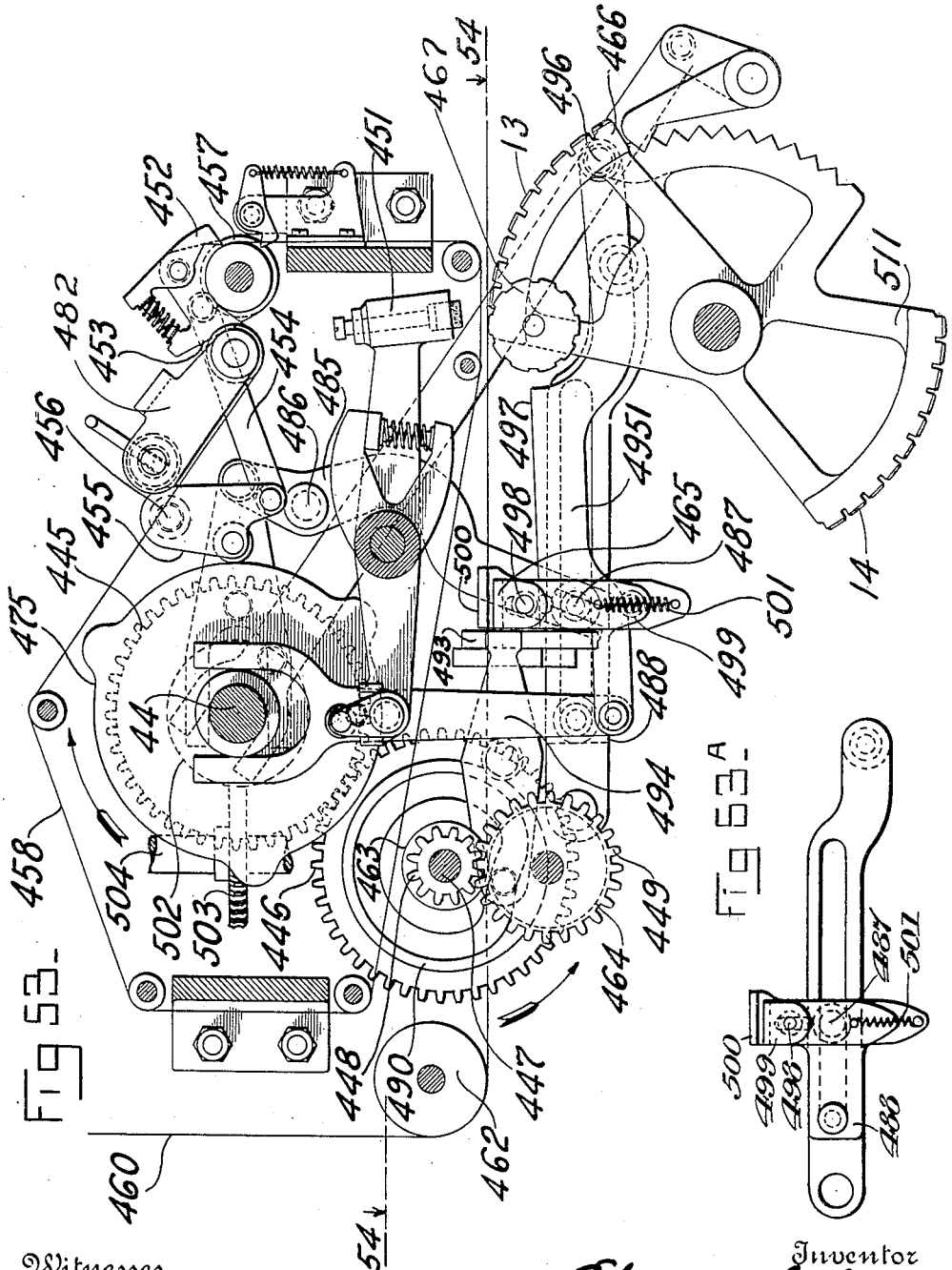

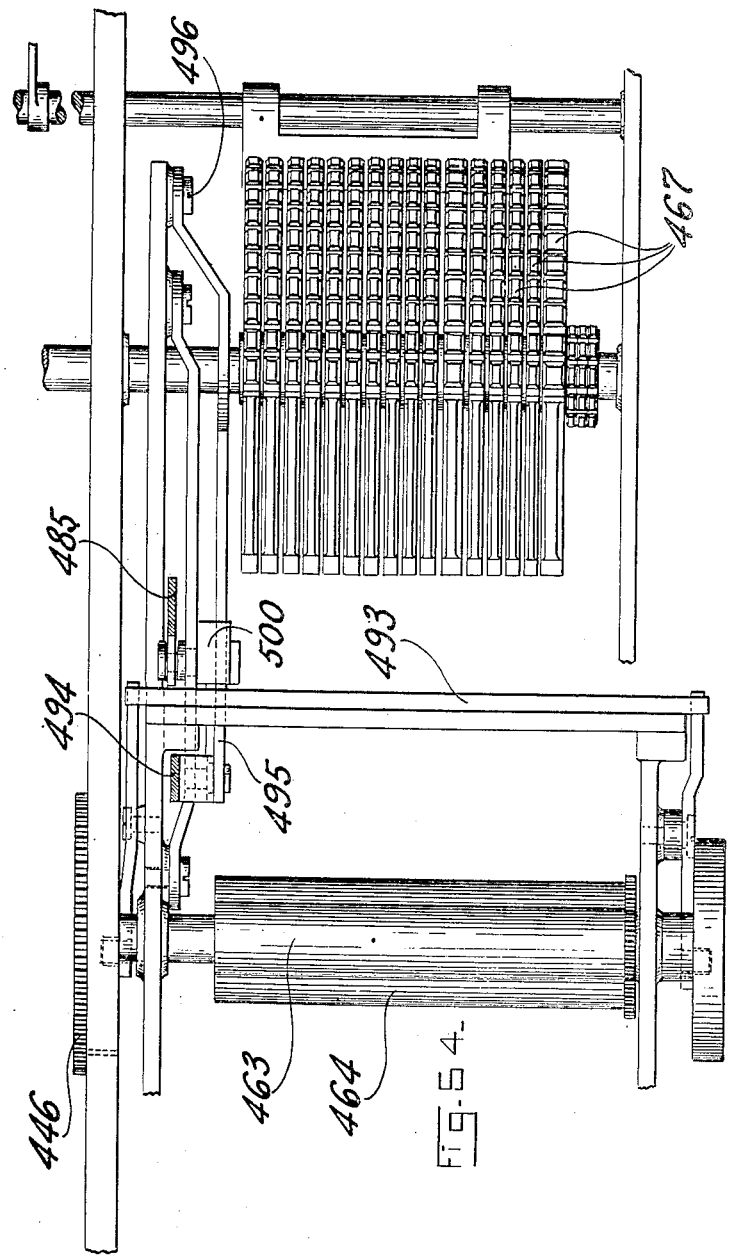

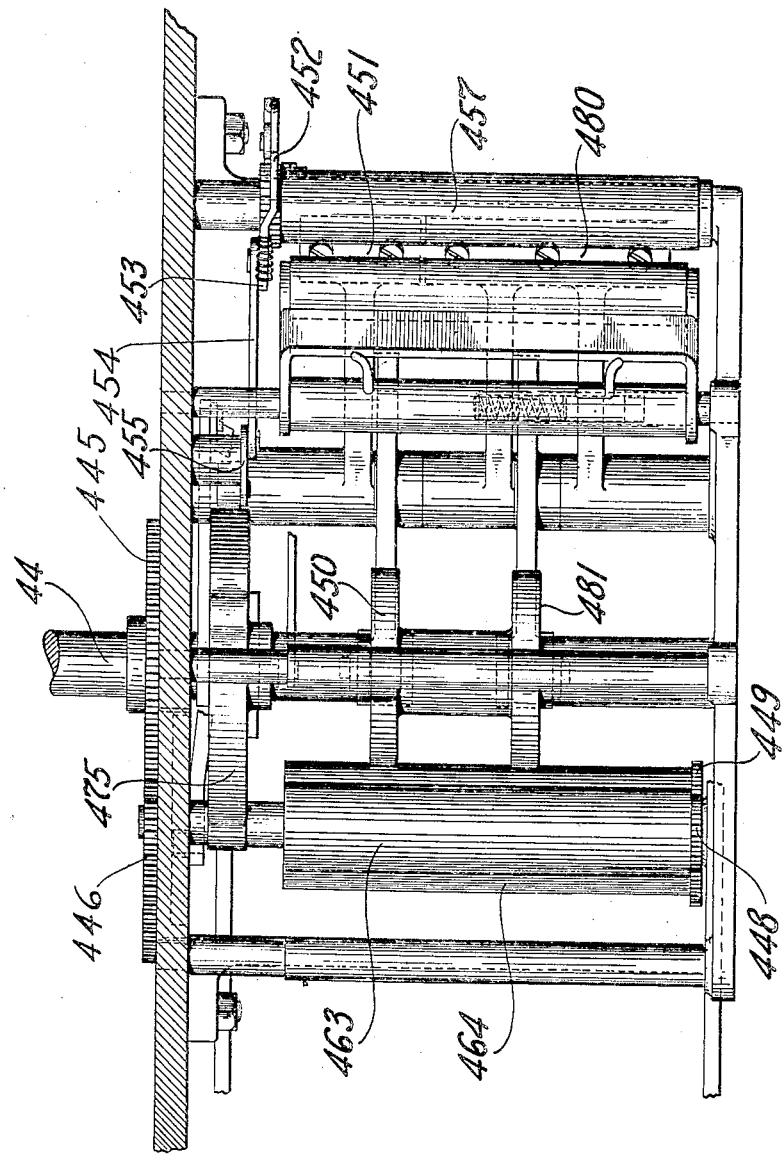

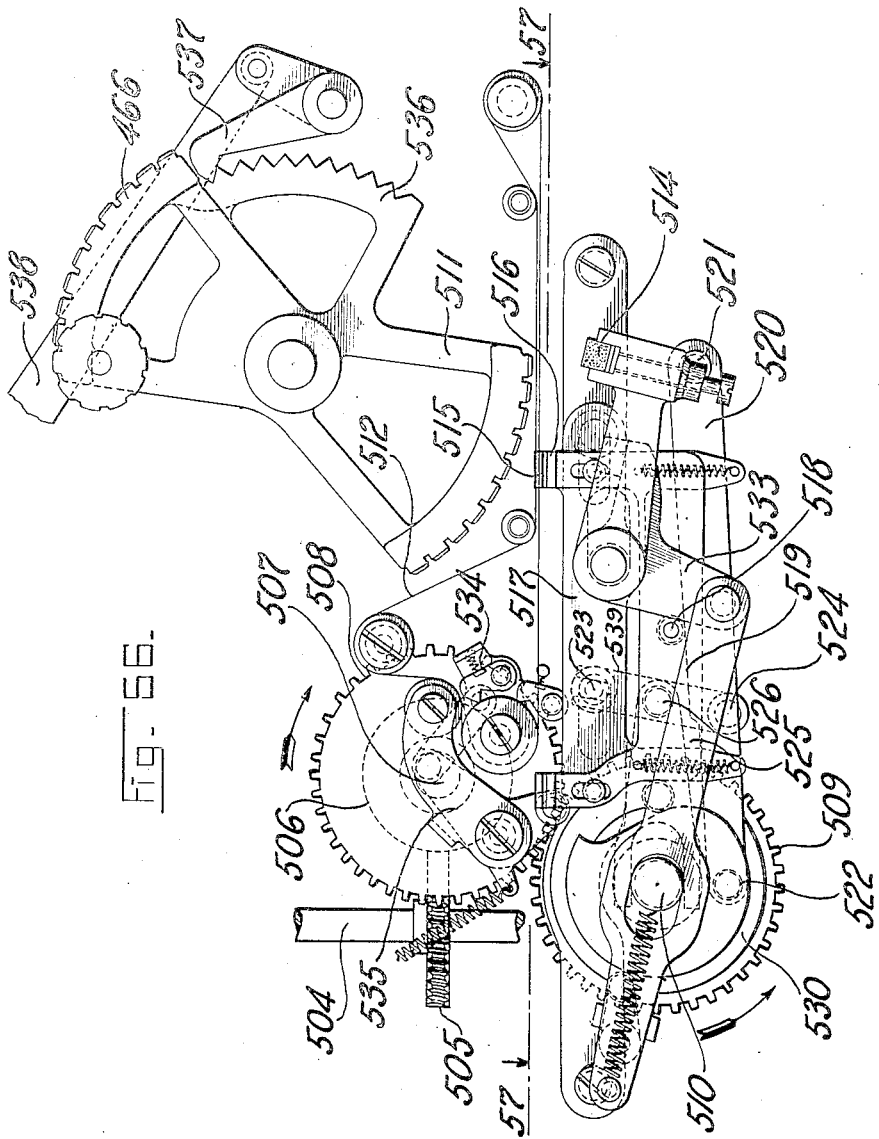

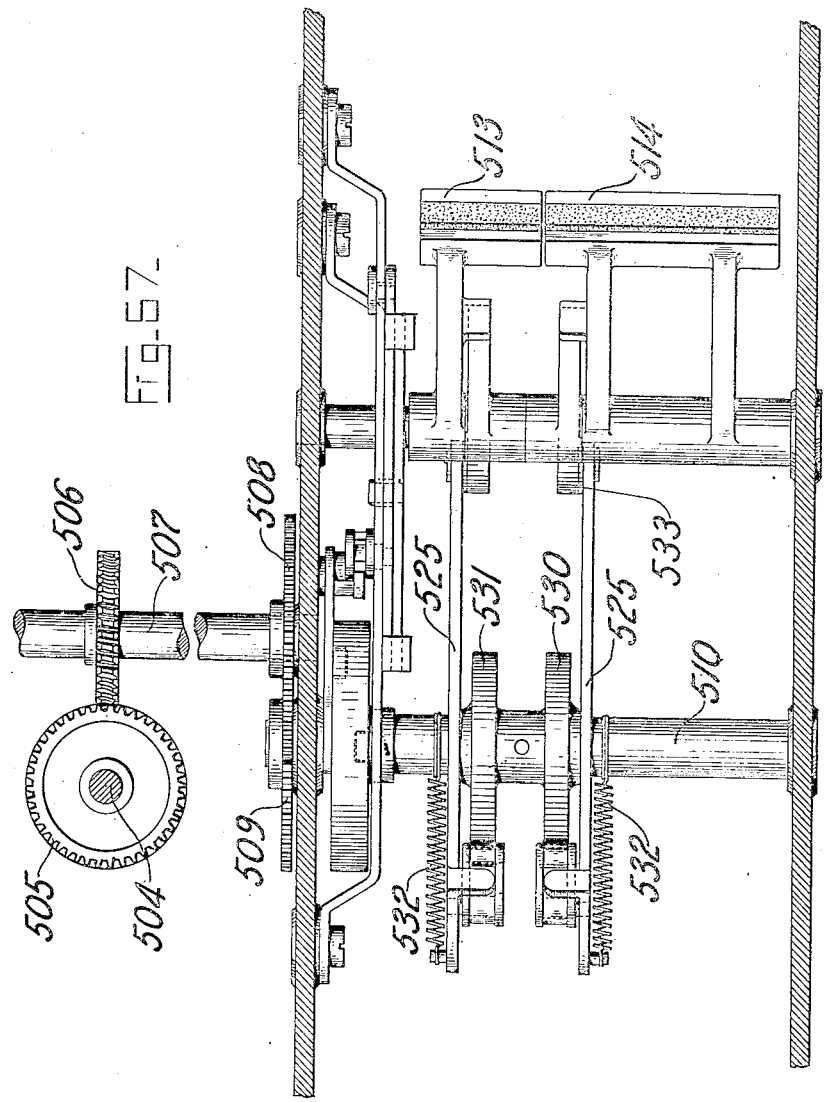

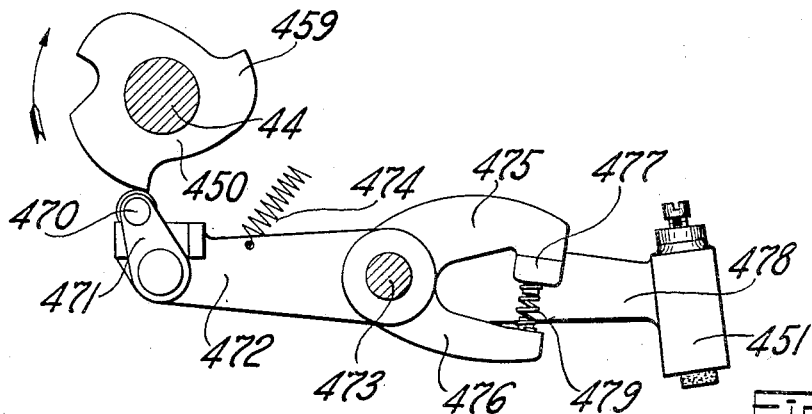
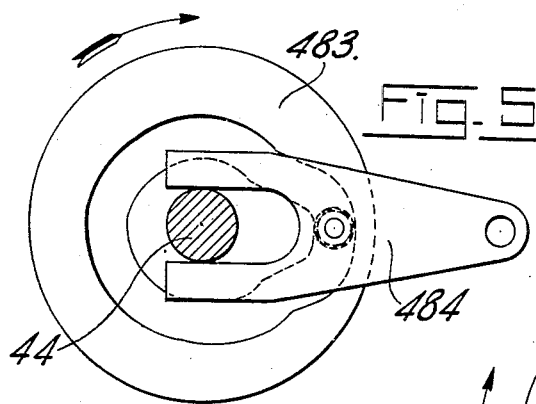
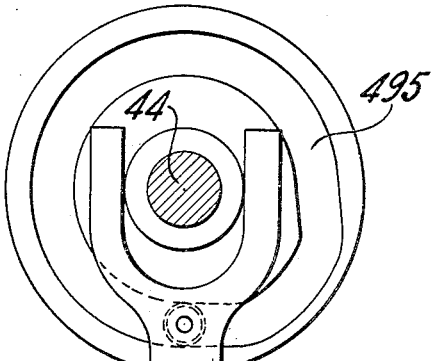
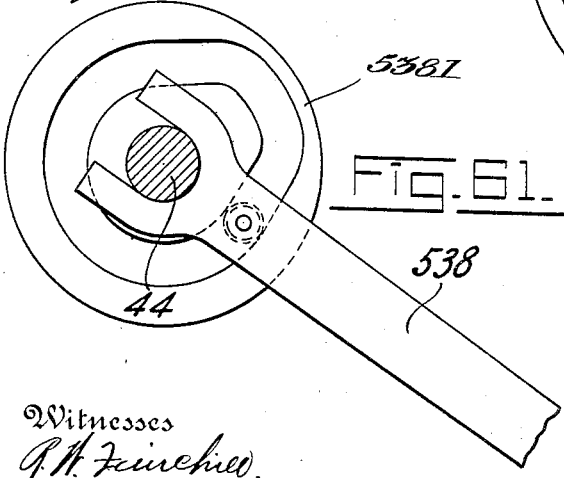

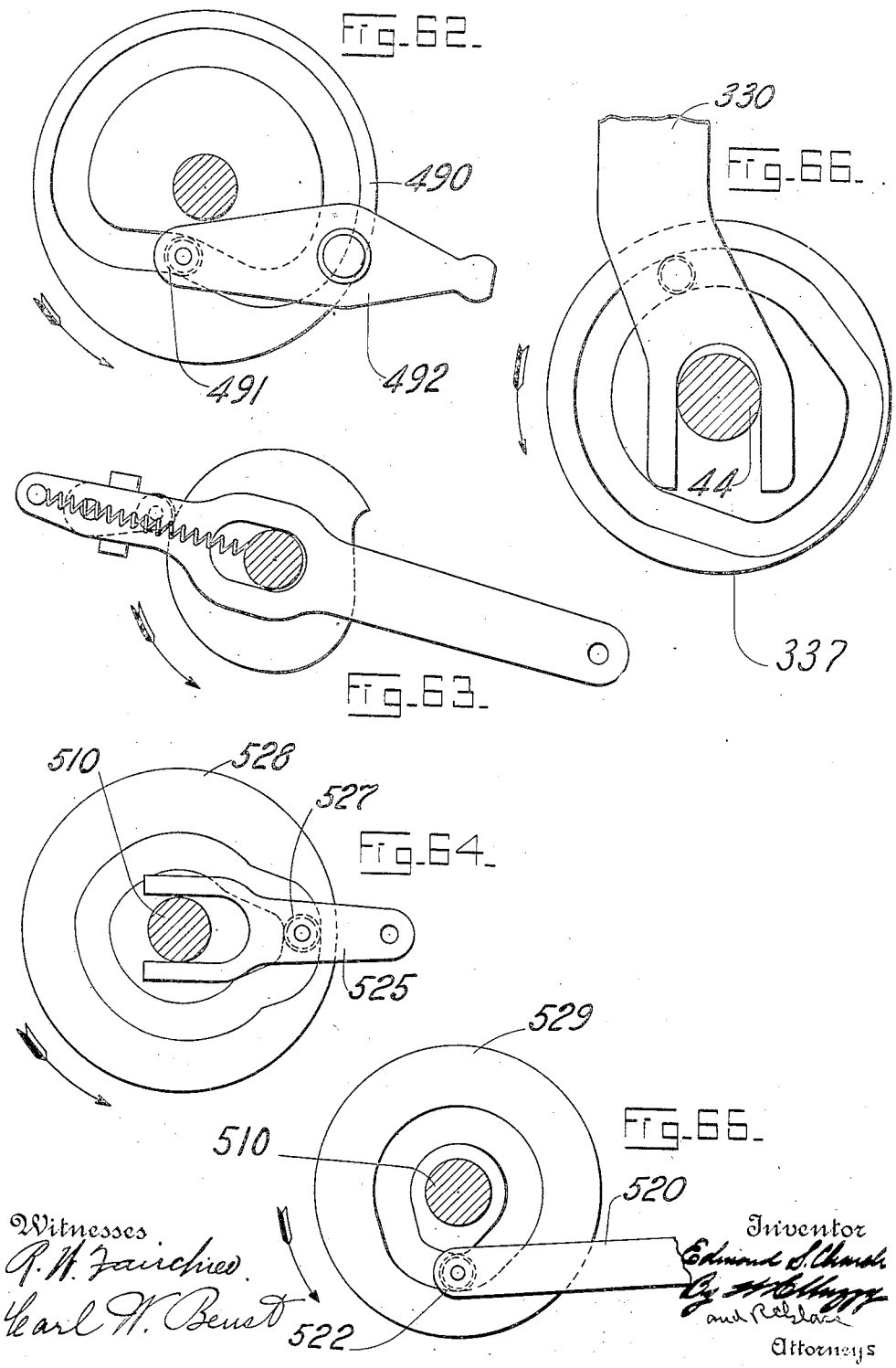

E. S. CHURCH.
CASH AND CREDIT REGISTER.
APPLICATION FILED JAN. 17, 1910.

1,206,813.

Patented Dec. 5, 1916.
33 SHEETS—SHEET 33.

Fig. 67.

```
1868 MAY 13  7  BC   27  $000.80
                         $019.20
1869 MAY 13 18  P   137  $000.50
                         $018.60
1870 MAY 13 21  Ch  308  $001.75
                         $096.25
1871 MAY 13 24  Ca  463  $002.00
                         $021.65
```

Fig. 68.

| CASH. | $1845.00 |
| CASH RC. ON AC. | $0125.50 |
| PAID OUT. | $0387.00 |
| CHARGES ON AC. | $0756.00 |
| BAL CHARGES. | $0630.50 |

Fig. 70.

Salesman._____19___
No._____M._____
Address_____

Amt Forward. $0321.50
921-MAY 13-10-Ch-523- $0025.50
Balance. $0347.00

Fig. 69.

| CONSEC. NUMBER. | DATE. | CLERK | TRANS | CUST. NUMBER. | ON ACCOUNT. |
|---|---|---|---|---|---|
| | | Amt Forward. | | | $0321.50 |
| 921 | MAY 13 | 10 | Ch | 523 | $0025.50 |
| | | Balance. | | | $0347.00 |

WITNESSES:
R. W. Fairchild
Earl W. Beust

INVENTOR
Edmund S. Church
BY
ATTORNEYS

UNITED STATES PATENT OFFICE.

EDMUND S. CHURCH, OF DAYTON, OHIO, ASSIGNOR TO THE NATIONAL CASH REGISTER COMPANY, OF DAYTON, OHIO, A CORPORATION OF OHIO, INCORPORATED 1906.

CASH AND CREDIT REGISTER.

1,206,813.   Specification of Letters Patent.   Patented Dec. 5, 1916.

Application filed January 17, 1910. Serial No. 538,470.

*To all whom it may concern:*

Be it known that I, EDMUND S. CHURCH, a citizen of the United States, residing at Dayton, in the county of Montgomery and State of Ohio, have invented certain new and useful Improvements in Cash and Credit Registers, of which I declare the following to be a full, clear, and exact description.

This invention relates to a type of cash and credit register which is provided with means for operating separate or detachable total retaining or accumulating devices, one of which is provided for each clerk and one for each customer.

The present invention is in many respects an improvement of the invention described in the co-pending application of E. S. Church, Serial Number 338,502, filed October 11, 1906.

The machine by means of which the detachable total retaining devices are actuated and which in turn at times control the actuation of the machine, is provided as are other cash registers, with a detail printer, a check printer, and indicating devices. The machine is also provided with a novel printing mechanism which is adapted for simultaneously printing totals of different classes of transactions.

The setting of the printers is accomplished by devices controlled by the keyboard, total retaining devices and the special totalizers.

The special totalizers receive their settings from the keyboard.

The machine serves not only to record each transaction and the amount thereof and also the totals of different classes of transactions, but will make complete printed records of each customer's account and also of the business handled by each clerk, add to or subtract from the different total retaining devices and the different totalizers and print the result of each addition or subtraction.

The machine is operated by first inserting the desired total retaining devices and then setting up the amount of a transaction on the keyboard, then depressing the special transaction key representing the class of transaction. The depression of the special key determines whether or not the amount of the transaction shall be added to or subtracted from one of the special totalizers, one of the clerks' total retaining devices and one of the customers' total retaining devices.

At the beginning of the operation of the machine, the customer's retaining device controls the positioning of the type carriers of the check printer according to the total amount which has been accumulated by such retaining device. An impression of this total is at this time made upon the check or voucher which is to be issued by the check printer. After this printing occurs the amount of the transaction which is being recorded, is printed on the check just below the total which had been printed. The amount of the transaction is also printed upon the detail strip and is also added to or subtracted from its respective special totalizer and the retaining devices. Finally there is printed upon the detail strip and the check the total of the amount which had been accumulated by the customer's retaining device and the amount of the transaction or the difference between the two thus making two printed records of the balance of the customer's account.

The special totalizer pinions are sleeved to separate type wheels and for this reason these type wheels will at all times be set according to the totals on the special totalizers. A large platen is provided for the printer of the special totalizers by means of which an impression may be taken by one operation of the platen of all the totals of the special totalizers.

The detail printer is arranged to print the amount of each transaction together with the customer's number and the clerk's number, the total retaining devices having elements which determine the setting of the type carriers for these numbers. The detail printer is also arranged to print simultaneously the date upon which the transaction is made and also a character indicating the class of the transaction. The check printer is also arranged to print the date and class of transaction, the clerk's number and the customer's number.

From the foregoing outline it will be understood that some of the objects of the invention are to provide a cash register which is adapted to operate simultaneously upon a plurality of separate total retaining devices so as to record amounts thereon by means of either addition or subtraction; to provide a machine which is capable of separately keeping the accounts of different customers and also recording the totals of different classes of transactions and of issuing a check or slip giving a complete record of any one transaction and also of the standing of the customer's account before and after the particular transaction; to provide a cash register with printing mechanism in which a single operation of the platen will give an impression indicating the totals of all the different classes of transactions of which the machine is arranged to make record; to provide an accounting machine with a plurality of totalizing devices which may be added to or subtracted from at will, according to the manipulation of the special keys.

Further objects of the invention are to provide interlocking devices between the cash register and the total retaining devices for the purpose of preventing operation of the register until at least one retaining device has been inserted into the machine and to prevent the depression of a certain special key if a retaining device is wrongly in the machine at the time a transaction which is represented by such special key is recorded; to provide a check printer which is arranged to take three impressions for each transaction from a single set of type wheels, these type wheels being set successively to the total which had been accumulated by the customer's retaining device, the amount of the transaction, and the balance; to provide a totalizer with means for rotating the totalizer in either direction, said means being provided with transfer devices which are suitable for transferring in operations both of addition and of subtraction; to provide a totalizing device and means for differentially rotating the same in either direction with a transfer device independent of the differential means and which co-acts with the totalizer for transferring in either adding or subtracting operations; to provide an accounting machine with a plurality of totalizers and means for differentially rotating the totalizers either forwardly or backwardly and a totalizer selecting device which is controlled from the keyboard and determines which of the totalizers shall be brought into operative relation with the differential mechanism and whether or not such relation shall cause addition or subtraction; and to provide a machine with a plurality of totalizers and a single set of actuators arranged for simultaneously adding to one totalizer and subtracting from another.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 10:
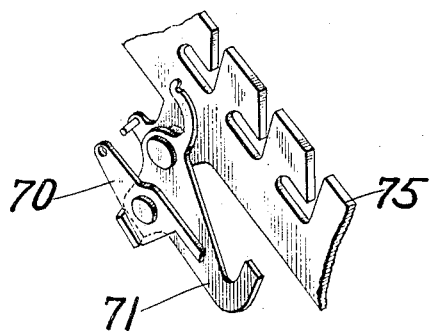
Figure 11:
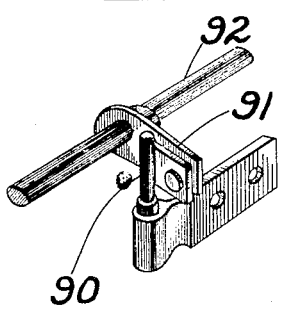

Of said drawings, Figure 1 is a front elevation of the entire machine with the cabinet omitted. Fig. 2 is a perspective view of a customer's total retaining device. Fig. 3 is a top plan view of a customer's retaining device but with its containing case omitted. Fig. 4 is a perspective view of one of the clerks' total retaining devices. Fig. 5 is a transverse vertical section of a retaining device showing one of the number slides by means of which the retaining device controls the setting of identifying type when drawn into the register. Fig. 6 is a transverse vertical section of a retaining device illustrating a register lock operating key of the retaining device. Fig. 7 is a transverse vertical section of one of the retaining devices showing one of the denominational slides. Fig. 8 is a perspective view of a locking and alining plate in the retaining device. Fig. 9 is a detail in side elevation illustrating how the retaining devices are drawn into the machine and the mechanism for preventing the withdrawal of a retaining device until the machine has been fully operated. Fig. 10 is a detail in perspective of part of the mechanism which is shown in Fig. 9. Fig. 11 is a detail in perspective of mechanism which unlocks the accumulators in a retaining device just before they are actuated by the machine. Fig. 12 is a detail view mainly in side elevation but partly in section of a retaining device and its carriage and also co-acting devices of the machine. Fig. 13 is a detail of part of the locking device which is operated by the insertion of a retaining device into the machine, illustrating the locking device in its normal position and also in three of its moved positions. Fig. 13ᴬ is a detail of some of the parts shown in Fig. 13. Fig. 14 is a fragmentary view of the bank of transaction keys illustrating how the depression of the cash key is prevented when a customer's retaining device is in place in the machine. Fig. 15 is a top plan view of the two sets of racks, of which one set is controlled by clerks' retaining devices and the other set by the customers' retaining devices. These racks in turn position the accumulators of the retaining devices when new amounts are added thereto. Fig. 16 is a detail view in side elevation of the differential mechanism of the machine which is controlled by and in turn controls the denominational slides of the clerks' retaining devices. Fig. 16ᴬ is a detail view in side elevation of the differential mechanism of the machine which is positioned by and in turn positions the denominational slides of the customers' retaining devices. This view also illustrates means for longitudinally shifting the supporting shaft for the subtotalizers. Fig. 130

Figure 29:
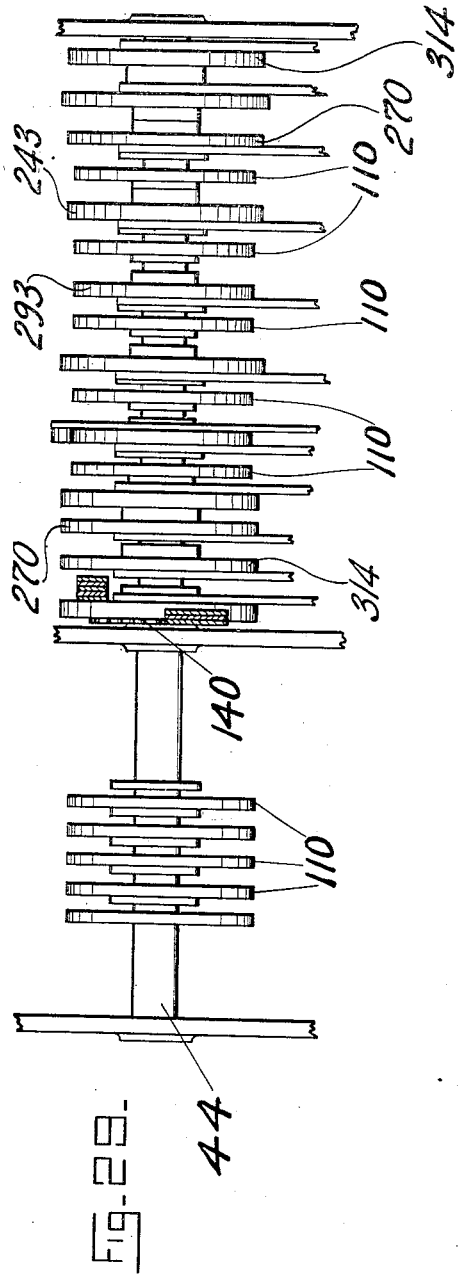
Figure 28:
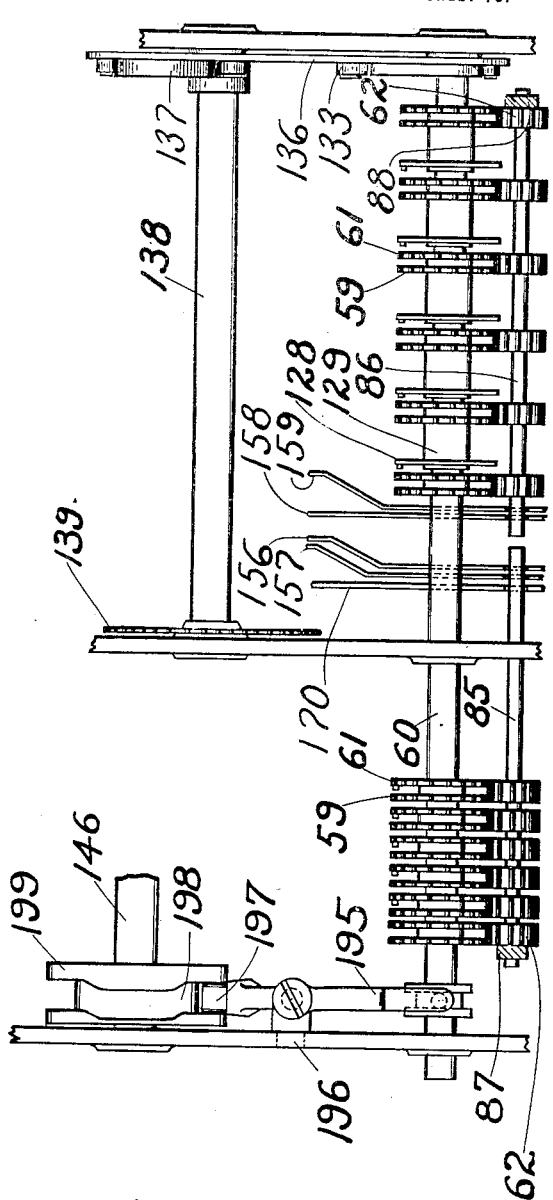

16ᴮ is a detail in side elevation illustrating the alining devices for alining the slides of the machine which are set by the identifying and the number blades of the recorder boxes. Fig. 17 is a top plan view of the mechanism shown in Fig. 16. Fig. 18 is a transverse vertical section of the machine taken on the line 18—18 of Fig. 1. Fig. 19 is a detail view in side elevation of one of the key detents and locking and restoring devices for the detent. Fig. 20 is a detail view of a slide which coöperates with the key detent. Fig. 21 is a detail view in side elevation of one of the differential slides or racks which are controlled in their movement by the keys. This view also illustrates the restoring device for the differential slides. Fig. 22 is a fragmentary view of the key detent for the bank of special or transaction keys including a locking device which co-acts with the detent. Figs. 23, 24, 25 and 26 are details in side elevation of slides which are actuated by the bank of transaction keys, the actuation of which determines whether or not an amount determined by depressed keys of the keyboard, is to be added or subtracted from the clerks' and the customers' total retaining devices. Fig. 23ᴬ is a detail of a cam preventing the actuation of the clerks' sub-totalizer at the entry of transactions of certain classes. Fig. 27 is a detail of a slide which is controlled in its movement by the bank of transaction keys and which serves to select desired totalizers for actuation and also determines the positioning of the totalizers for addition and subtraction. Fig. 28 is a top plan view illustrating the sub-totalizers for the clerks' and customers' retaining devices. Fig. 29 is a top plan view of the main drive shaft of the machine and cams carried thereby. Fig. 30 is a top plan view of one of the transfer devices of the sub-totalizers. Fig. 31 is a side elevation of the transfer device showing the transferring device in the position which it assumes at the time that the amount on the sub-totalizers is transferred to the retaining devices. Fig. 32 is another side elevation of the transfer device, but showing the same as it would appear when being tripped. Fig. 33 is a detail in perspective of one member of the transfer device. Fig. 34 is a detail in perspective of a pawl of the transfer device. Fig. 35 is a detail in side elevation of the differential mechanism which is controlled by the keyboard. Fig. 36 is a side elevation of the special or transaction totalizers with the differential mechanism for the same and the selecting mechanism by means of which desired totalizers are brought to operative relation with the differential mechanism and positioned for operations of addition or subtraction. Fig. 37 is a fragmentary detail of part of the selecting mechanism which is shown in Fig. 36 and also in Fig. 27. Fig. 38 is a plan view of the special totalizers showing the actuating mechanism in section. Fig. 39 is a vertical section of the totalizer selectors. Fig. 40 is a front elevation of the special totalizers. Fig. 41 is a detail in side elevation of one of the transfer devices of the special totalizers. Fig. 42 is a front elevation of the printing mechanism for the special totalizers and the detail strip printer. Fig. 43 is a right side elevation of the printing mechanism for the special totalizers and also shows the roll of detail paper and part of the detail strip printer. Fig. 44 is a transverse vertical section through the special printer showing the type wheels with alining devices and the cushioned frames in which the type wheels are mounted. Fig. 45 is a top plan view of the mechanism shown in Fig. 44. Fig. 46 is a detail in side elevation of one of the cushioned carrying frames for the special type wheels. Fig. 47 is a detail of the paper feeding mechanism for the special printer. Fig. 48 is a rear elevation of the paper feeding mechanism of the special printer. Fig. 49 is a right side elevation of the detail strip printer. Fig. 50 is a front elevation of the detail strip printer. Fig. 51 is a detail in top plan of the printing hammers of the detail strip printer. Fig. 52 is a detail of cams for operating the paper feeding mechanism of the detail strip printer and the consecutive numbering device of the detail strip printer. Fig. 53 is a left side elevation of the check printing mechanism. Fig. 54 is a horizontal section of the check printing mechanism taken on the line 54—54 of Fig. 53. Fig. 55 is a top plan view of the check printing mechanism. Fig. 56 is a right side elevation of the inserted slip printer. Fig. 57 is a horizontal section taken on the line 57—57 of Fig. 56. Figs. 58 to 65 inclusive are details of cams of the check and inserted slip printers. Fig. 66 is a detail of a cam for operating one of the pitmen shown in Fig. 36. Fig. 67 is a detail of part of the printed detail strip. Fig. 68 is an illustration of one impression of the special printer. Fig. 69 shows one of the printed checks, and Fig. 70 shows one of the printed slips.

The operation of the machine will be briefly outlined before the various mechanisms are described in detail. When a transaction is to be recorded, the clerk's total retaining device and the customer's total retaining device upon which it is desired to record the transaction, are first inserted into the machine and then the amount of the transaction is set up on the key board. The special key which represents the class of the transaction is also depressed. The insertion of the retaining devices serves to unlock the special keys so that they may be depressed and the machine operated. If, for instance, the special key which is depressed is the "received on account" key, the "received on account" totalizer will be brought into operative relation with the differential mechanism by the operation of the machine and the amount which has been set up on the keyboard will be added to this totalizer.

When the retaining devices are first inserted into the machine, they are merely placed upon carriages which are automatically drawn into the machine by the operation of the driving mechanism.

The total retaining devices comprise a plurality of adjustable slides which may be positioned by the machine to represent different amounts and it will be understood that a former operation of the machine may have left these slides in other than their zero positions. The adjustable slides are normally locked and when the retaining devices are drawn into the machine, the slides in the retaining devices engage coacting slides of the machine causing the same to move extents which correspond to the setting of the retaining slides. The slides or rack bars of the machine mesh with segment gears and when the slides are at rest in their inner positions the segment gears are operatively connected with two sets of pinions, which will hereinafter be called the clerk sub-totalizer and the customer sub-totalizer. The next operation which occurs is the unlocking of the retaining slides and then the return of the rack bars of the machine to their outer or zero position, causing the slides of the retaining devices to be moved to their zero positions and through the segment gears transmitting the differential movement of the rack bars to the sub-totalizers. By the above operation the setting of the accumulators or slides of the retaining devices is transferred to the sub-totalizers. Next, the differential mechanism which is controlled by the value keys is moved according to the value keys which are depressed and is caused to transmit its differential movement to the sub-totalizers either adding to or subtracting from the same as is required by the particular operation. The differential movement of this mechanism is also transmitted to one or more of the transaction totalizers.

Both the rack bars and the differential mechanism in turn set the type carriers of the detail printer and the check printer and impressions are taken from these printers after each setting. The final operation which occurs is to transmit the final setting of the sub-totalizers to their respective retaining devices and to the type carriers of the detail printer and the check printer. The platen is again operated effecting an impression of the standing of the customer's account as altered by the transaction which was recorded in the machine.

When cash purchases are to be recorded it is not necessary to insert the customer's retaining device into the machine because if it were inserted the amount of the transaction would be merely added to the retaining device and then subtracted from the same leaving the accumulators of the entry retaining device in their original position. But in the case of the clerk's retaining device the amount of the sale is always added thereto. "Paid out" amounts only, are subtracted from the clerk's retaining device. By this construction the clerk's retaining device will always be set to the actual amount due from the clerk to his employer.

The special totalizers are usually rotated in a forward or adding direction, but certain of these totalizers are at times backwardly rotated for the purpose of subtracting amounts therefrom as will be hereinafter pointed out.

Referring to Fig. 1 of the drawings, 1, denotes an operating handle, 2, banks of value keys, 3, a bank of special or transaction keys, 4, a row of release keys, 5, a carriage for the customers' total retaining devices, 6, a carriage for the clerks' retaining devices, 7, value indicators, 8, special indicators, 9, a special printer, 10, a detail strip printer, 11, a check printer, 12, one of the sub-totalizers. It may be seen from this figure that the type carriers of the check printer are provided with two sets of type, 13 and 14. The set 13 is employed for printing a check and the set 14 for printing an inserted sales slip, the mechanism for which is located beneath the type carriers.

The mechanisms of all the printers are shown in detail in the drawings and these mechanisms together with the total retaining devices and co-acting elements and other mechanisms of the register will be described in the following order: total retaining devices and co-acting elements of the machine; driving mechanism of the register; keyboard; sub-totalizers; differential mechanism; special totalizers; special indicators; special printer; detail strip printer; check printer; and inserted slip printer.

*Detachable total retaining devices and co-acting elements of the machine.*—The detachable retaining devices are illustrated in Sheet 2 of the drawings. Figs. 2 and 4 respectively, are views of a customer's retaining device and a clerk's retaining device. The customer retaining device is somewhat larger than the clerk retaining device for the purpose of providing room for a greater number of identifying blades or slides 15. The blades or slides by means of which totals of transactions are accumulated, are represented at 16 and each represents a denominational order and may be set to ten different positions, viz., from zero to nine. These blades are positioned to indicate different numbers by co-acting elements in the register and in turn are capable of positioning these elements of the register for the purpose of causing printed records to be made of amounts which are accumulated by the retaining device. The blades are slidable on transverse bars 17 and are provided with alining teeth 18 so that the blades may be locked in any position in which they may be set. An alining plate which co-acts with the teeth of the blades is represented at 19 and is hinged to one of the bars 17 at 20. A spring 21 serves normally to draw the locking plate 19 into engagement with the blades 16, a pointed flange 22 of the plate entering between the teeth 18 of the blades. Springs 23 serve to urge blades 16 to their highest or "nine" positions when released from the plate 19, the purpose of which will be hereinafter more fully described. The identifying blades 15 are also mounted upon the bars 17 and are of varying lengths so that when the retaining device is drawn into the machine these blades will differentially position type setting elements of the machine. It thus results that the printed records which are made by the machine may be identified with the particular retaining devices which were employed in making the records. The identifying blades are slightly slidable upon the bars 17 and are spring-drawn in one direction for the purpose of positioning the blades so that notches 25 with which they are provided will normally not register with a flange 26 on the locking plate 19. For this reason these notches must be alined before the amount blades of the retaining device may be unlocked. The register itself is provided with means for alining the blades 15 by alining the co-acting members of the register which are differentially positioned by these blades when the retaining device is drawn into the machine. The off-setting of the notches of the blades 15 with respect to the flange 26 is therefore very slight. After the retaining devices are in place in the machine the plates 19 are rocked at the desired time by plungers which are pivoted within the register in position to enter openings 27 of the retaining devices. The casings 29 of the retaining devices have suitable slots 30 for the purpose of permitting the co-acting slides of the register to enter said devices to be positioned by and to position the blades 15 and 16. These openings are normally closed by spring drawn guards 31 which are lifted upwardly by members on the carriages for the retaining devices at the time of the insertion of said devices into the carriages.

No riveting or fastening devices are used to hold together the various parts of the retaining devices. The different parts of the devices are formed from sheet metal and assembled in a certain order and then placed in frames 32 which are also made from sheet metal and have generally a U section. Each frame and the mechanism which it contains is then inserted in a casing 33, this casing serving to prevent displacement of the various elements of the retaining device. After the mechanism is in place in the casing 33, flanges 34 of the casing are bent inwardly thus preventing removal of the contained mechanism. The flanges 34 are not forced tightly against the back 35 of the frame 32 thus leaving a space between the flanges and the back for the insertion of a printed card by means of which the retaining device may be identified. The casings 33 are preferably drawn at one operation thus providing an extremely rigid though light element.

Fig. 9 illustrates in side elevation one of the carriages for the retaining devices and the mechanism by means of which the carriage is moved into and out of the machine. Each retaining device contains an immovable blade 46 which is provided with a shoulder 47 for the purpose of co-acting with a spring-pressed latch 48 (Fig. 9) mounted on the carriage. When a retaining device is pushed into the carriage, the latch 48 springs over the shoulder 47 of the plate 46 preventing the withdrawal of the retaining device. The carriages 5 and 6 are slidably mounted upon rods 36 and 37 and are connected by links 38 to levers 39 which are pivoted to the frames of the machine by pins 40 and are provided with rollers 41 extending into races 42 of cams 43 which are carried by a drive shaft 44. The method of mounting the carriages is readily seen from Fig. 1. The carriages are connected by a frame-bar 1761 so that they will move together. Carriage 5 is supported by a rod 36 and carriage 6 by rod 37. The drive shaft 44 is caused to make one rotation at each operation of the machine in the direction indicated by the arrow 45. It may be seen from the formation of the race 42 that the lever 39 will be rocked immediately upon the rotation of the shaft 44 in such direction that it will draw the link 38 inwardly and thereby pull the carriages 5 and 6 into the machine, holding the same in such position until nearly the end of the operation of the machine when the drive shaft completes its rotation, and the carriages are then moved out to their normal position.

When the carriages 5 and 6 are moved into the machine, the blades 16 and 15 of the entry retaining devices engage co-acting bars or plungers 50, (Fig. 15) in the register and push these bars inwardly from their normal position more or less according to the setting or length of the blades of the entry retaining devices. The bars 50 are spring-drawn toward their outer positions by springs 51, (Fig. 16), therefore when the bars 50 are engaged by the blades 16 and 15, they are pushed inwardly against the action of the springs 51 and are prevented from being overthrown upon their inward movement by pawls 52 (Fig. 12), which are slidably mounted on two bars 53 carried by wings 54 on the carriages. The inward movement of the carriages is equal to nine units of movement of the bars 50; therefore if one of the blades 15 is of such length as to represent 9 or if one of the blades 16 is in its outer or nine position such blade will be in engagement with its respective bar 50 during the entire inward movement of the carriage and the pawl 52 for such bar will remain in the first notch of the bar during the entire movement and when the carriage reaches its inner position, will prevent further inward movement of the bar 50. If the blade 15 or 16 is in a position to represent a number lower than nine, the pawl 52 will, upon the inward movement of the retaining device, ride over teeth 55 of the bar 50 until the bar is engaged by the blade, but the pawl will remain in the particular notch which it engaged at the time of contact between the blade and the bar 50 during the further inward movement of the carriage thus preventing the bar from being overthrown.

The bars 50 which are engaged by the amount blades 16 carry racks 56 (Figs. 15 and 16ᴬ), which mesh with small segment gears 57. These segment gears are rigid with segment gears 58 mounted loosely on a shaft 296 and which mesh continuously with idle gears 59 loosely journaled upon a shaft 60 for the sub-totalizers. The idle gears 59 are each located at the side of companion gears 61 (Figs. 17 and 28), also loosely journaled upon the shaft 60 and the gears 59 and 61 are at times connected together in pairs by broad pinions 62. These broad pinions are carried by a rocking frame which may be held in position for meshing the broad pinions either upon the up-stroke of the segment gears 58 or upon their return. If in mesh upon the return of the segments 58 the sub-totalizer pinions will be rotated in a forward or additive direction and when the setting of the retaining slides is transferred to the sub-totalizers, the sub-totalizers are rotated in a forward direction. For this reason the broad pinions are held out of mesh with the pinions 59 and 61 at the time the retaining devices are drawn into the machine. After this occurs the broad pinions are rocked into mesh and the segment gears 58 are returned to their zero positions thereby rotating the sub-totalizer pinions 61 in a forward direction according to the differential movement of the segment gears 58 as controlled by the retaining devices. The manner in which the broad pinions are rocked into and out of mesh, and also the manner in which the segment gears 58 are returned to zero position will be described further on but it was desired here to point out how the differential settings of the amount blades of the entry devices are transferred to the two sets of gears 61 (Fig. 28). The right hand set constitutes the customer sub-totalizer and the left hand set constitutes the clerk sub-totalizer.

One of the latches 48 by means of which the entry retaining devices are locked to their respective carriages, is illustrated in detail in Fig. 13. This figure shows the latch in its normal position by heavy full lines, in its fully moved position by broken lines and in two intermediate positions, by dot and dash lines and full light lines. When the nose of the plate 46 of a retaining device first engages the latch 48 it raises the latch from the position in which it is shown by the heavy lines to the position in which it is shown by the dot and dash lines. Each latch is carried by a shaft 63 on the carriages 5 and 6 and the shaft 63 of the carriage 6 carries fast thereto an arm 64 (Figs. 9 and 12) which is provided with a pin 65 extending through a slot 66 in a lever 67 which is pivoted to the frame of the machine by a pin 68. The lever 67 carries a pin 69 which co-acts with a pawl 70 pivoted to a retaining pawl 71 for the key detent of the bank of transaction keys 3. The normal position of the lever 67 is shown in Fig. 9, but when the latch 48 is rocked upwardly, the movement of the arm 64 through the pin 65 causes the lever 67 to rock forwardly thereby rocking the pawl upon its pivot and permitting the pin 69 to pass by the end of the pawl so that when the pawl comes to rest it will be in the rear of the pin 69. The latch 48 is then in its uppermost position where it rests upon the shoulder 47 (Fig. 6) of the plate 46. When it passes the shoulder 47, the latch 48 drops to the position in which it is shown by full light lines in Fig. 13, thereby causing the lever 67 to return part way to its original position, but upon this movement of the lever 67, the pin 69 being in front of the pawl 70 and the pawl being prevented from rocking on its pivot by a flange 72 of the pawl 71, the pawl 71 will be rocked out of engagement with a notch 73 in a plate 74 which is fixed to the frame of the machine. The pawl 71 is carried by the key detent 75 of the bank of special or transaction keys 3. By this construction, after the clerk's retaining device is in place, one of the special keys may be depressed though it was previously locked. The depression of a special key will unlock the machine. The object in providing the locking device which has just been described is to prevent the operation of the machine until one of the clerks' retaining devices is in position in the machine. This same locking device is not repeated upon the customer side of the machine as it is not necessary to prevent an operation of the machine until a customer's retaining device is in place.

Cash records are not recorded on the customer retaining devices, as previously stated, and in order to prevent the depression of the cash key when a customer's device is on the carriage 5, the following mechanism is provided: A shaft 76 extends over the carriage 5 for the customer retaining devices and has an arm 77 fast thereon which normally extends downwardly into a casing opening 78 into which the customer retaining device is inserted. Upon the insertion of the retaining device, the arm 77 is rocked upwardly thereby causing the shaft 76 to be rocked, and this shaft carries fast thereto an arm 79 (Fig. 14). A slide 80 which is at the side of the bank of special or transaction keys is carried by the arm 79 and is guided in its movement by a pin 81. The slide is provided with a shoulder 82 which when the slide is moved upwardly by the rocking of the shaft 76 comes into the path of a pin 83 carried by the cash key 84. By this arrangement, depression of the cash key is prevented whenever a customer retaining device has been inserted into the machine.

The setting of the amount blades 16, as previously mentioned, is not transferred to the sub-totalizers at the time the retaining devices are drawn into the machine and therefore merely causes the positioning of the slides 50. For this reason during the rearward movement of the slides 50 the broad pinions 62 are held out of mesh with the pinions 59 and the pinions 61 of the sub-totalizers until the slides 50 come to rest in their inner positions. The broad pinions are then meshed with the two sets of gears 59 and 61 and the segment gears 58 are returned to their zero positions, causing the sub-totalizer pinions to be rotated forwardly extents which are equal to the original movements of the slides 50 and the return of the segment gears 58 also causes the slides 50 to be returned to their zero positions. The blades 16, must, of course, be unlocked to permit their movement before the bars 50 may be returned to their original positions and these blades are unlocked at the proper time by plungers 90 (Figs. 9 and 11) which are carried by arms 91 fast on a shaft 92, which shaft is oscillated for the purpose of projecting the plungers 90 through the openings 27 in the retaining devices and thereby rocking the plates 19 (Fig. 3) out of engagement with the alining teeth 18 of the blades 16. The shaft 92 is oscillated by a cam 93 (Fig. 9) which is carried by the drive shaft 44 and which acts upon a roller 94 on a lever 95 which is pivoted to the frame by a pin 96 and by means of a pin 97 is connected to a link 98 which at its forward end is pivoted to an arm 99 on the shaft 92. After the plates 19 have been held in their unlocking positions a sufficient length of time, the cut-away part 100 of the cam 93 again arrives opposite the roll 94 permitting a spring 101 to return the shaft 92 to its original position thereby withdrawing the plungers 90 from the openings 27 of the retaining devices.

Loosely pivoted upon the shaft 92 (Fig. 12) are slotted arms 147 through which extends a rod 148 passing through the upper ends of all of the overthrow-preventing pawls 52 and when the shaft 92 is rocked for the purpose of unlocking the accumulators of the retaining devices, arms 149 which are carried by the shaft 92 engage pins 150 on the arms 147 thus causing all of the pawls 52 to be lifted clear of the teeth 55 of the bars 50. It may be observed from the formation of the cam 93 that the pawls 52 will not be permitted again to lower into engagement until the completion of the operation of the machine.

It was previously stated that the identifying blades 15 in the retaining devices are normally in such position that their notches 25 (Fig. 5) are slightly out of alinement with the flanges 26 of the plate 19 and that in order to rock the plate 19 for the purpose of unlocking the amount accumulating slides 16 it is necessary to bring all of the notches 25 into alinement. This is accomplished by alining the co-acting slides 50 (Fig. 16$^B$) in the register. It will be understood that the inward movement of the retaining devices causes the slides 50 which co-act with the blades 15 to be pushed slightly out of alinement. For the purpose of alining these particular slides 50 they are mechanically connected to alining segments 274 and these segments are adapted to be engaged by pawls 275 at the proper time for alining the slides 50. The pawls 275 are operatively connected to the link 98 (Fig. 9) by an arm 276 on a shaft 277 which carries the pawls and a spring 278 which unites the arm 276 with the link 98. Mention was previously made of this link and how it was drawn inwardly for the purpose of disengaging the overthrow pawls 52 (Fig. 12) and of projecting the plungers 90 through the openings 27 in the retaining boxes. The arrangement is such that the alining pawls 275 will engage the alining segments 274 before the plungers 90 engage the plates 19 of the entry devices.

The plungers 50 which are actuated by the identifying blades 15 of the retaining devices are pivoted at their ends to arms 279 on shaft 280 and these shafts communicate the differential movement of these plungers 50 to the type carriers of the printers.

In the case of the plungers 50 which co-act with the amount blades 16 of the customers' retaining devices, these are pivoted to arms 281 (Fig. 16^A) which are located forward of the arms 279 and carried by shafts 282 and by this means communicate the setting of the amount blades 16 of the customer total devices to the type carriers. The shafts 280 and 282 are connected to the type carriers of the detail printer, check printer and inserted slip printer, but not to the type carriers of the special printer.

In regard to the amount plungers 50 which are on the clerk side of the machine (Fig. 16) these plungers also carry racks 56 which mesh with segment gears 57 also rigid with a set of segment gears 58, but the blades 50 which co-act with the blades 16 on the clerk side of the machine are not normally connected to the shafts 282 and therefore do not interfere with the transfer of amounts from the customer's retaining device to the printers. But the racks 56 of the clerk's side may at certain times be connected to the shafts 282 through the racks 283 (Fig. 16) and segment gears 284 for the purpose of operatively connecting the segment gears 58 on the clerk's side with the segment gears 58 on the customer's side. It is these last mentioned segment gears which receive movement direct from the differential mechanism when under the control of the keyboard by meshing with a set of key controlled racks. The segment gears 58 which are on the clerk side of the machine do not mesh with these racks.

In order to hold the racks 283 (Fig. 16) out of mesh with the segment gears 284 at all times, except when the key controlled racks are actuated from the keyboard, the drive shaft 44 is furnished with cams 285 which operate rollers 286 on levers 287 which are pivoted to the machine frame at 288 and connected by links 289 and studs 290 with the racks 283. The racks 283 are pivotally mounted to the machine frame at 284 in such a manner as to allow of their lineal movement and are connected with the racks 56 of the clerk side by the pins 291.

At the end of the operation of the machine the total retaining device must be released and ejected from the casing, and the mechanism for accomplishing this function will be next described. Fig. 13^A shows the normal positions of the parts. When the retaining device is inserted in the machine the casing thereof engages the arm 77 fast on shaft 76 and rocks this arm, thereby also elevating an arm 103 fast on this shaft 76. The arm 103 carries a by-pass pawl 105 pivoted thereto and normally drawn by a spring against a pin 1051 in the arm 103. Therefore when the retaining device is inserted and the arm 103 elevated, the pawl 105 will engage a pin 106 on an arm 107 fast to the shaft 63 which also carries the latch pawl 48, but no movement of the arm 107 will be caused as the pawl 105 will merely rock around its pivot in the arm 103. It will be remembered that the shaft 63 and the pawls or latching arms 48 move with the retaining device carriage into the machine. Therefore when the mechanism of the machine returns the retaining device carriage to its outer position, the pin 106 will then engage the by-pass pawl 105 on its rear side, inasmuch as the arm 103 is still elevated, the retaining device still engaging the arm 77. In this direction of movement of the retaining device carriage the by-pass pawl 105 cannot yield and therefore the arm 107 will be rocked around the shaft 63, thus elevating the latch pawls 48 and releasing the retaining device, which may then be withdrawn from the carriage by hand. As the latches 48 rock upwardly lugs 481, extending downwardly therefrom, engage the forward ends of the retaining devices and push them outwardly enough to prevent the latches 48 from returning into engagement with the projections 47 in the retaining devices.

*Driving mechanism of the register.*—The crank handle 1 by means of which the machine is operated is journaled upon a stub shaft 141 (Fig. 49) together with a pinion 142 and the pinion 142 meshes with a gear 143 secured to the drive shaft 44. The driving mechanism is operated by twice rotating the handle 1, and as the pinion 142 is but half the size of the gear 143 the drive shaft 44 will be caused to make one rotation at each operation of the driving mechanism. The shaft 44 carries a gear 144 (Figs. 1 and 18) which meshes with a gear 145 carried by a companion drive shaft 146. The shafts 44 and 146 carry the main operating cams of the machine with the exception of the cams which are carried by the shaft 138 (Figs. 16 and 28), but this shaft 138 is also geared to the shaft 44 by the gears 139 and 140. The objects of the shaft 138 will be stated farther on.

One of the principal cams carried by the drive shafts is a cam 270 on the shaft 44 (Fig. 16^A). This cam causes a pitman 271 to reciprocate three times upon each operation of the machine. The pitman is connected at its lower end to an arm 272 on the shaft 296 upon which all of the segment gears 58 are loosely journaled and this shaft carries a pair of arms between which extends a rod 273. This rod extends across the front edge of downwardly extending projections of the segment gears 58. The formation of the race in the cam 270 is such that the rod 273 will be rocked upwardly in advance of the upward movements of the segment gears 58 and these segment gears are successively rocked upwardly first by means of the inward movement of the retaining devices, second by the upward movement of the racks 200, which are controlled by the banks of value keys, and third by the resetting of the sub-totalizers for the purpose of differentially setting the segment gears 58 according to the amounts which have been added to the sub-totalizers, so that upon the return of the segment gears 58 these amounts can be transmitted to the retaining devices. It follows that the object of the cam 270 is to return the segment gears 58 to their home or zero positions after each of these three upward movements.

*Keyboard.*—The keyboard consists of seven banks of value keys 2, one bank of transaction keys 3, and a row of release keys 4 at the bottom of the keyboard. The value keys control the differential movement of racks 200 (Figs. 18 and 35). These racks are provided with three sets of rack teeth 201, 202 and 203 and receive motion from a segment gears 204 loosely journaled on a shaft 250. Power for driving these segment gears is furnished from the driving mechanism and the extents of movement of the segment gears are determined by the particular value keys which are depressed. The rack teeth 202 serve to communicate the differential movement of the racks to the segment gears 58 which are on the customer side of the machine and through these segment gears to the sub-totalizers. The rack teeth 203 serve to communicate the differential movement of the racks to the value indicators 7 and to actuating racks 205 of the special totalizers.

Each bank of value keys controls the movement of a slide 206 such as illustrated in Fig. 21. Each value key of a bank is provided with a pin 207 which extends across the front edge of the respective slide at the upper end of one of a series of rectangular notches 208. These pins also extend across the openings of key detents 209, one of which is illustrated in Fig. 19, and also across inclined edges 210 of slides 211 which co-act with the key detents 209 for the purpose of retaining the key detents in their locking position for the proper length of time. Upon the depression of a key its pin 207 engages the inclined slot 210 of the slide 211 causing the slide to move upwardly to the position in which it is shown in Fig. 20 and thereby disengaging a pawl 212 from a notch 213 in the detent 209 permitting the detent to lower under the action of a spring 214 so that one of slots 215 in the detent will engage the pin 207 of the depressed key preventing its release until the completion of the operation of the machine at which time a rod 216 is raised for the purpose of lifting the detents 75 and 209 to release the keys.

The rod 216 is carried by an arm extending from a shaft 217 (Fig. 18) which shaft is oscillated for the purpose of releasing the keys by a cam which is carried by the drive shaft 44 and actuates a pitman 218 which connects the cam with a downwardly extending arm on the shaft 217.

If a key has been depressed by mistake it may be released before the operation of the driving mechanism by the depression of the release key 4 of the particular bank. The release keys 4 are also provided with pins 207 (Fig. 22) which co-act with inclined surfaces 219 of the key detents and when a release key is depressed it causes the detent to rise far enough to become disengaged from the pin 207 of the depressed value key, permitting the value key to return to its undepressed position under the action of its own spring. It is impossible to release an amount key after a transaction key is operated. To this end locks 220 (Fig. 22) on depression of a transaction key rock either into notches 221 or under the lower edges 222 of the detents 209 and thereby prevent their movement. These same locks serve to prevent movement of the detents 209 of the banks in which no keys are depressed. The locks 220 are actuated by a pitman 292 (Figs. 9 and 19) which receives movement upon the depression of a transaction key. The pitman 292 at its forward end is connected to the detent 75 for the bank of transaction keys and is connected by a slot and pin connection to an arm 223 (Figs. 19 and 22) rigid on a shaft 294 with arms 224. The arms 224 bear against springs 225 and are provided with lugs 226 in the path of the arms 220 for the purpose of rocking the arms 220 forward or withdrawing them from engagement with the detents 209 upon depression of a transaction key. A disk 293 is rigidly mounted on the shaft 44 and co-operates with a block on the pitman 292 to lock the latter in moved position until near the end of the operation of the machine at which time the detents 75 and 209 are restored to normal position. The differential slides 206 are normally locked in their lower positions, as shown in Fig. 21, by arms 227 journaled loosely on a rod 294, and are drawn to locking positions by a spring 2941. When a key is depressed its pin 207 is moved into the path of slide 206, and when the key is completely depressed, the detent plate 209 drops to a position such that it locks the key in its depressed position. Carried by the driving shaft 44 is a disk 229 having a cam projection 230 arranged to engage a roller 231 mounted on a pitman 232. The free end of the pitman is pivoted to an arm 234 by a pin 233, the arm 234 being journaled on a frame rod 235. Also journaled on this pin 233 are a series of connecting arms 236, each adjacent one of the detents 209 and connected thereto by a pin and slot connection 2361. These arms 236 have downwardly extending projections 2362, and when the key detents drop to lock the keys these projections 2362 will drop in front of the upper projections 237 of the arms 227. Then when the machine is operated the disk 229 will draw the pitman 232 rearwardly, and thus the connecting arms 236 will engage and withdraw such of the latches 227 as correspond to banks in which keys are depressed. The slides 206 may then move upwardly under the action of springs 238 to extents depending on the keys which have been depressed. At the end of each operation the key detents 209 are released and move upwardly, thus withdrawing the connecting arms 236 from their connections with the latching arms 227, and thus the differential slides 206 may again be locked in their normal positions. It may be seen from Fig. 21 that the notches 208 in the slides 206 are of graduated lengths, and by this construction if the highest or nine key is depressed the slide will be permitted to move up nine units of movement. The remaining keys permit the slide to move upwardly less amounts according to their value. The differential upward movements of the slides 206 cause the segment gears 204 to be rocked downwardly accordingly around their pivot shaft 250 as the slides are provided with rack teeth 239 meshing with teeth 240 on the segment gears. After the segment gears 204 have been differentially moved in the direction indicated by the arrow 241 the racks 200 (Fig. 18) are rocked around their pivots 235 into mesh with the segment gears 58, 204 and pinions 242 of the indicator drums 7.

The shaft 44 (Fig. 21) carries a pair of cams 243 which are provided with shoulders 244 and races 245 for co-acting with rolls 246 and 247 on pitmen 248 for the purpose of causing the pitmen to lower upon the beginning of action of the drive mechanism at the time the slides 206 are permitted to move upwardly. The pitmen 248 are connected at their upper ends with bell crank levers 249 which are pivoted upon the shaft 250 which also carries segment gears 204. The bell crank levers 249 carry at their lower ends a rod 251 which extends across the forward edges 252 of the segment gears 204. It is when the segment gears are at rest in their differentially moved positions that the racks 200 are meshed with the same and after the meshing of the racks the pitmen 248 are returned to their upper positions thereby returning all the segment gears 204 to their initial or zero settings but causing their differential movements to be transmitted to the racks 200. As the racks 200 mesh with the pinions 242 of the indicators 7 the indicators will be rotated upon the rise of the racks extents to indicate the amount which was set up on the keyboard. Also as the racks 200 mesh with the segment gears 58 these segment gears will be differentially set according to the amount which was set up on the keyboard. This movement of the racks, of course, occurs after the amount on the retaining devices has been transferred to the sub-totalizers and the accumulators of the retaining devices reset to their zero positions. If it is desired to subtract the amount which is set up on the keyboard from one or the other of these sub-totalizers the broad pinions for such totalizer will be held in mesh with the gears 59 and 61 (Fig. 28) during the upstroke of the racks 200, but if it is desired to add such amount to one or the other of the subtotalizers the broad pinions 62 are held in mesh upon the return of the racks 200 to their initial positions.

The racks 200 are returned to their initial positions with the segment gears 58 by means of arms 295 (Fig. 18) which carry a rod 297 extending through slots 298 in the racks 200 and slots in the ends of the arms 295. The arms 295 are secured to the shaft 296 supporting said segment gears 58 and which shaft is oscillated for the purpose of returning the segment gears 58 by the cams 270 (Fig. 16ᴬ), the operation of which was previously described.

The bank of special or transaction keys controls the operating mechanism of the register for the purpose of determining whether an amount which is set up by the value keys shall be added to or subtracted from the sub-totalizers as follows: The shaft 146 carries cams (Figs. 23, 24, 25 and 26) for the purpose of rocking the broad pinions 62 into and out of mesh with the sets of pinions 59 and 61. There are two of these cams 151 and 152 for rocking the broad pinions, which are opposite the clerk's sub-totalizer, into and out of mesh and two others, 153 and 154, for rocking the broad pinions which are opposite the customer's sub-totalizer. The cams 151 and 153 if operatively connected with their respective sets of broad pinions will cause the broad pinions to be meshed at the proper time for operations of addition whereas if the cams 152 and 154 are operatively connected with their respective broad pinions the broad pinions will be operated at the proper time for causing operations of subtraction from the sub-totalizers. The operations of addition or subtraction are determined by the time of meshing of the broad pinions, addition taking place if said pinions are meshed during the return of segments 58 while subtraction is accomplished if said pinions are meshed during the setting of segments 58, as before stated. The sub-totalizers if rotated at all upon the insertion of the retaining devices are always rotated in a forward direction and it is only when amounts are transferred to the sub-totalizers from the keyboard of the cash register that the sub-totalizers are occasionally backwardly rotated. For this reason the cams 151, 152, 153, and 154 are all so formed that no matter which of the cams are in operative relation with the broad pinions said pinions will be held in mesh upon the first return of the segment gears 58 after said gears have been differentially set by the retaining devices. The cams 151, 152, 153, and 154 respectively, actuate pitmen 156, 157, 158, and 159 and each of these pitmen is provided with a notch 160 which when the broad pinions 62 are in their unmeshed or normal position are beneath the shafts 85 of the broad pinions. These pinions are normally held in their unmeshed positions by springs 161 and are left in this position at the completion of each operation of the machine. The pitmen are all pivoted at their forward ends to slides which are under the control of the bank 3 of special keys. The special keys carry pins 162 (Fig. 27) which extend through slots 163 and 164 in slides 165, 166, 167 and 168. The special keys which carry the pins 162 represent classes of transactions in the following order and as lettered at the side of pins in Fig. 27. The uppermost key is marked "Special," and reading downwardly the remaining keys are: Refund cash, Expense, Paid out, Void, Cash, Received on account, Charge, Account paid.

The object of the key marked "Special" is to take care of odd or unusual transactions in which it is desirable to add an amount to the customer's retaining device but not at the same time effect the setting of the clerk's retaining device. It will be understood that the machine cannot be operated if no clerk's retaining device is in place on the carriage, and for this reason when a "special" record is to be made in the machine one of the clerk retaining devices must be in place in order to effect the registration although the positions of the accumulators of the clerk's retaining device are not disturbed. The "refund cash" key causes the amount which is set up on the keyboard to be subtracted from the clerk's retaining device without effecting the setting of the customer's retaining device. The "expense" key causes addition on the customer's side of the machine and subtraction from the clerks' devices but before this special key is depressed a special retaining device is placed in the carriage on the customer's side of the machine. This special retaining device is for the purpose of accumulating the totals of all transactions which come under the head of "Expense."

The "paid out" key causes the amount which is set up on the keyboard to be subtracted from the clerk's total device while not effecting a customer's device. The depression of the "void" key will not alter the setting of the clerk's retaining device but causes the amount which is set up on the keyboard to be subtracted from the customer's device. The depression of the "cash" key causes the amount which is set up on the keyboard to be added to the clerk's device only. As previously stated, it is not necessary to insert the customer's device into the machine when cash registrations are made. The depression of the "received on account" key causes the amount which is set up on the keyboard to be added to the clerk's total device and subtracted from the customer's device. The depression of the "charge" key causes the amount to be added to the customer's retaining device only. When the "account paid" key is depressed the amount which is set up by the keyboard is subtracted from the customer's retaining device only. The various combinations of addition and subtraction which it is desired to effect by the depression of these keys are accomplished by the arrangement of blank spaces and inclined slots in the slides 165, 166, 167 and 168. It will be understood that the pins 162 of the keys extend across all of these slides and only such of the slides as have inclined slots 163 opposite the particular key which is depressed will be carried upwardly. The upward movement of any one slide will carry its respective pitman upwardly around the shaft 146 as a pivot, causing its respective notch 160 partly to encircle one of the shafts 85 or 86 and by these means operatively connect a particular one of the cams which operate the pitmen to one or the other sets of broad pinions 62 and as before mentioned the races in these cams are differently formed; the cams 151 and 153 causing the broad pinions to be held in mesh during the return stroke of the differential racks 200 (Fig. 18) and the cams 152 and 154 causing the broad pinions to be held in mesh during the upstroke of the differential racks 200.

One other cam is necessary for the purpose of holding the broad pinions of the clerk's totalizer in mesh at the proper times for permitting the setting of a clerk's device to be transferred to the subtotalizer and back again, when such registrations are made as "special," "void," "charge" and "account paid." Upon these registrations the clerk's device is neither added to nor subtracted from but is ejected from the machine with the same setting as when inserted into the machine, but it is necessary to have a clerk's retaining device in the machine in order to operate it, and as the retaining device becomes automatically unlocked when the machine is operated, it is necessary to transfer the setting of the retaining device to the subtotalizer in order that the setting be not lost upon the resetting of the denominational slides of the total device under the action of the spring pressed plungers 50 of the machine. The design of the machine is such that the retaining devices could be reset merely by causing the broad pinions to remain out of mesh during the latter part of the operation of the machine. But the cam above referred to prevents the resetting of the clerk subtotalizer when "special," "void," "charge" or "account paid" transactions are recorded. This cam is numbered 169, Fig. 23A, and the pitman which it controls and which connects it to the broad pinions is indicated at 170 in this figure and Fig. 28. It will be seen from the shape of the groove in cam 169 that this cam retains the broad pinions unmeshed during both setting and resetting of racks 200.

*Subtotalizers.*— The subtotalizers are merely two sets of pinions 61 (shown in plan in Fig. 28) combined with carrying mechanism and the broad pinions 62 by means of which the subtotalizer pinions are operatively connected with the pinions 59. The carrying devices are never employed when amounts are transferred from the retaining devices to the subtotalizers but are necessary when the subtotalizers are disconnected from the retaining devices and connected to the differential mechanism of the register and as the subtotalizers may be rotated either in a forward or backward direction by the differential mechanism, the carrying devices are arranged for transferring either in operations of addition or operations of subtraction. The drawings show six pinions in each of the subtotalizers, and accordingly five carrying devices are provided for each subtotalizer. One such carrying device is illustrated in Figs. 30 to 34 inclusive. It comprises a reciprocating pitman 107 which is forked over the drive shaft 44 and the subtotalizer shaft 60 and carries a roll 108 which extends into a race 109 of a cam 110 which is carried by the main drive shaft. This drive shaft is caused to make one rotation in the direction of arrow 111 upon each operation of the machine and the race of the cam 110 is so formed that the pitman 107 will not be projected forward its full throw until after the subtotalizers have been actuated by the differential mechanism and the drive shaft nears its home position. A fork 112 is pivoted to the pitman by pin 113 and when in its normal position, as shown in Fig. 31, upon the reciprocation of pitman 107 will just clear the teeth of the gear 61 which are located at 114 and 115 and will not be moved forward far enough to engage the teeth of the gear which are in the line of movement of the ends of the fork. In order to effect a transfer it is merely necessary to rock the fork 112 in one direction or the other, depending upon whether the transfer occurs in an adding or subtracting operation. For this purpose the pitman 107 carries a pawl 116 which at the time of adding or subtracting, extends into the path of movement of a trip pin 117 on the gear 61 of next lower order than the gear which is in the vertical plane of the fork 112. The pawl 116 lies between a pair of pawls 118 carried by a slide 119 which reciprocates with the pitman 107, as it is united with the pitman 107 by a spring 120, and the pawls 118 are held in engagement with the pawl 116 by a spring 1211 which unites the two pawls 118. When one of the gears 61 passes from nine to zero, or zero to nine, the trip pin 117 which it carries strikes the pawl 116 rocking the same upon its pivot 121 in a direction which depends upon the direction of rotation of the gear 61. When the pawl 116 is so rocked the rear end of the pawl engages one of the pawls 118 rocking the same outwardly as illustrated by Fig. 32. The pawls 118 are provided with laterally extending lugs 122 which normally engage the rear edge of the fork 112, but when the pawl is rocked outwardly one lug is carried away from the rearward edge of the fork and thereby permits the spring 120 to draw the slide 119 from the position in which it is shown in Fig. 31 to the position in which it is shown in Fig. 32. The slide 119 at this time moves relatively to the pitman 107 and as the slide carries the pawls 118, the lug 122 of the pawl which still remains in engagement with the rear edge of the fork 112 causes the fork to be rocked around its pivot as indicated in Fig. 32. One of the prongs of the fork will then be in line with one of the teeth 114 or 115 and for this reason will cause the gear 61 to rotate one tooth space when the pitman 107 is projected farther forwardly. The direction of rotation of the gear 61 when engaged by the fork 112 is determined by the angular position of the fork, which in turn is determined by the direction of rotation of the gear 61 which caused the rocking of the fork.

The cam 110 which operates the pitman 107 is provided with a shoulder 123 which co-acts with a roller 124 on the slide 119 for the purpose of causing the slide to return to its normal position slightly in advance of the pitman 107 thus permitting the pawls 118 to return to their initial position as the return movement of the slide causes the lugs 122 of the pawls to be carried away from shoulders 125 of the fork.

Each pawl 118 is provided with a shoulder 126 which shoulders, on the return of the slide 119, engage pins 127 on the fork 112, causing the fork to rock back to its original position. Then when the pitman 107 is restored the fork 112 and the pawls will come again to the position in which they are indicated in Fig. 31. When the pawl 116 is engaged by the trip pin 117 the pin 117 does not clear the tip of the pawl before the completion of this particular unit of movement of the pin. For this reason it is necessary to move the pawl rearwardly so that it may assume its horizontal position and not interfere with the restoring of the pawls 118. It may be seen from Fig. 31 that the race 109 is suitably formed for this purpose.

The transfer mechanism has been described as though the transfer trip pins 117 were carried directly by the gears 61. This is the case in regard to the subtotalizer which is in the clerk division of the machine, but the subtotalizer which is in the customer division of the machine has its elements so separated, as indicated in Fig. 28, that it is more convenient to mount the transfer pins on disks 128, which are carried by sleeves 129 secured to the gears 61.

The subtotalizer gears 61 when added to are rotated in the direction indicated by the arrow 130 (Fig. 16), and the zero position of the slide bars 50 is as indicated in the same figure. Before the retaining boxes are ejected from the machine it is necessary to transfer the setting of the subtotalizers to the slides 50 so that the total blades 16 may be positioned in correspondence with the final setting of the subtotalizers. For this purpose the gears 61 of the subtotalizers carry pawls 131 which are arranged for coacting with longitudinal grooves 132 in the shaft 60. These grooves are but slightly longer than the width of the pawls and are not normally in the path of the pawls but the shaft 60 is arranged to be slid in a longitudinal direction after the subtotalizer has been set, for the purpose of bringing the grooves into coacting relation with the pawls, after which, the shaft 60 is given a one half rotation in such a direction that the pawls are engaged and caused to rotate their respective gears 61 backwardly or in a subtracting direction to zero positions. In order to transfer the setting of the subtotalizers to the slides 50 the broad pinions 62 are moved into mesh with the gears 61 and 59 before the shaft 60 is rotated, thereby coupling the gears in pairs. The gears 59 mesh with the segment gears 58 and the shaft 60 carries a cam disk 133 which is so formed that when it is engaged by rolls 134 and 135 on a pitman 136, the shaft will be rotated and thereby cause the resetting of the subtotalizers. The pitman 136 is reciprocated by a cam 137 carried by a shaft 138, which shaft is provided with a gear 139 meshing with a gear 140 on the main drive shaft 44. The gear 139 is as shown in Fig. 16 of twice the size of gear 140, and, thus the shaft 138 is given a one half rotation at each operation of the machine. At one operation roller 134 engages cam 133 and forces shaft 60 in a direction opposite to arrow 130, through one half a rotation. At the next operation roller 135 is in operation and engages said cam 133 and gives it another one half rotation. It will be noted that pinions 59 and 61 have each twenty teeth as shown.

*The differential mechanism.*—The racks 200 of the differential mechanism are normally out of mesh with the segment gears and pinions with which they are adapted to be meshed and as it is necessary to transfer amounts from the retaining devices to the subtotalizers and then to restore the accumulators or slides of the retaining devices and the racks 58 (Fig. 18) before the amount which is set up upon the keyboard is transferred to the subtotalizers, the racks 200 are permitted to remain out of mesh for a sufficient length of time during the beginning of the operation of the machine to allow this operation. After all of the segment gears 58 have been restored to zero positions a cam 261 (Fig. 35) pushes a pitman 262 upwardly. The pitman 262 is pivoted at its upper end to an arm 263 on a shaft 264 and the shaft 264 (Fig. 18) carries a pair of arms 265 between which extends a rod 266. This rod carries a pair of arms 267 which carry a rod 268 extending through slots 269 in the racks 200. When the pitman 262 is moved upwardly the rocking of shaft 264 causes the arms 267 to be drawn forwardly far enough to carry the rack teeth 203 into mesh with the pinions 242 and the rack teeth 201 into mesh with the segment gears 204 but the segment gears 204 are at this time in their moved positions. The racks 200 are pivoted at 235, therefore when the rack teeth 203 and 201 are carried into mesh with their respective pinions and segment gears the rack teeth 202 are meshed with the segment gears 58.

*Special totalizers.*—The special totalizers and their selecting devices are illustrated in Fig. 27 and Figs. 36 to 41 inclusive. It has been explained how the upward movement of the differential racks 200, which are controlled by the keyboard, causes the rotation of indicator pinions 242. These pinions serve to connect the racks 200 to a second set of racks 253 (Fig. 36) which drive the special totalizers. It was also stated that certain of the special totalizers are at times added to and at times subtracted from by the operation of the differential mechanism.

There are five special or transaction totalizers, while there are nine special or transaction keys. The special totalizers (Fig. 36) reading from top to bottom are respectively for "Cash," "Cash received on account," "Paid out," "Charge on account" and "Balance charge." The transaction keys reading from top to bottom are the "Special," "Refund cash," "Expense," "Paid out," "Void," "Cash," "Received on account," "Charge," and "Account paid." It was explained how these keys control addition to or subtraction from the retaining devices. These keys also control the adding and substracting mechanism for the special totalizers. When the "special" key or the "charge" key is depressed the operation of the machine will cause addition to the "balance charge" totalizer. The depression of the "refund cash" key, the "expense" key, the "paid out" key, or the "account paid" key causes addition to the "paid out" totalizer. The depression of the "void" key causes subtraction from the "balance charge" totalizer. The depression of the "cash" key causes addition to the "cash" totalizer. The depression of the "received on account" key causes addition to the "received on account" totalizer and subtraction from the "balance charge" totalizer. The depression of the "charge" key besides causing addition to the "balance charge" totalizer also causes addition to the "charge" totalizer.

The bank of transaction keys, in accordance with the above plan, controls the differential movement of a spring actuated slide 300 (Figs. 27 and 36). The slide 300 is urged by a spring 301 to move upwardly but is normally prevented from such movement by a detent similar to the detent which was explained in connection with the description of the keyboard. When permitted to move upwardly it is limited in its movement by the pin 162 of the particular transaction key which is depressed. These pins are located opposite rectangular notches 302 of varying lengths in the plate 300. The extent of upward movement of the slide 300 determines the extent of rocking of a bell crank lever 303 which is pivoted to the frame of the machine by a pin 304 and to the plate 300 at 305. At its lower end the bell crank lever is pivotally connected to a rack bar 306 which meshes with a pinion 307 carried by a sleeve 308 which loosely surrounds the drive shaft 146. This sleeve also carries a plurality of disks 309 which are provided with notches 310. The notches 310 are adapted to be entered by totalizer selecting slides 311 if brought opposite the lower ends of the slides. The slides 311 are urged to move downwardly by springs 312, but are normally prevented from descending as slots 318 in the upper ends thereof surround pins 317 carried by arms 315 fast on a shaft 316. Shaft 316 is rocked to permit slides 311 to descend by a pitman 313. There is one slide for each special totalizer and one disk 309 for each slide but the disks may have more than one notch 310. Upon an operation of the machine one of the notches 310 is brought opposite its respective slide 311 and the slide will move downwardly under the action of its spring 312 upon the rise of pitman 313, which is caused to move upwardly at the desired time by a cam 314 carried by the drive shaft 44. Each selector slide is provided with a short horizontal slot to receive a pin 319 which extends to the selector from a corresponding frame 320 and each frame 320 is pivoted at its inner end to a slide 321. These slides support the transaction or special totalizers and are so mounted in a frame 322 that they may be moved in a horizontal direction backwardly and forwardly. The lowering of any selector 311 causes a pin 323, which is carried by its respective frame 320, to enter a recess 324 in one of a pair of slides 325 or 326. The slides 325 and 326 are slidably mounted side by side upon rods 327 and 328 so that the slide 325 may be moved forwardly and the slide 326 rearwardly. The slide 325 carries a pin 3281 which extends through an inclined slot 329 in a pitman 330 and the slide 326 carries a pin 331 which extends through an oppositely inclined slot 332 in said pitman. The pitman 330 is arranged to be moved upwardly at the correct time for meshing the special totalizers, by a cam 337 (Fig. 66) which is carried by the drive shaft 44. It may be seen from Fig. 36 that the slots 329 and 332 are inclined in opposite directions and that the rise of the pitman will cause the slide 325 to be moved forwardly while the slide 326 is moved rearwardly. If upon the operation of the machine one of the frames 320 is operatively connected with one of these slides its respective totalizer will be moved either forwardly into mesh with racks 333 or rearwardly into mesh with racks 334 depending upon which slide the frame 320 is connected to. The two sets of racks 333 and 334 are both connected to the set of racks 253 and the meshing of the special totalizers occurs before the racks 253 are differentially moved downward and for this reason the operation of the special totalizers occurs upon the rise of the differential racks 200 which through the pinions 242 control the movements of the racks 253.

The three higher special totalizers (Fig. 36) are added to only; for this reason the slide 326 does not extend upwardly far enough to engage the respective frames 320 for these totalizers. The bottom totalizer is arranged for addition and subtraction while the second totalizer from the bottom is arranged for subtraction only. For this reason the slide 325 is not provided with a recess 324, or rather one of the hook-shaped ends which help to form the recess, opposite this second totalizer. It accordingly does not interfere with the movement of the frame 320 for this totalizer when the totalizer is pushed rearwardly into mesh with the rack teeth 334. When addition is to take place in the bottom totalizer one of the deep notches 310 is brought into the line of movement of the foremost selector 311 and the frame 320 for the totalizer is accordingly carried downward double the normal distance, bringing the pin 323 for such frame opposite a horizontal notch 336 in the slide 326 and accordingly this slide does not interfere with the carrying of the bottom totalizer into position for addition. When the bottom totalizer is to be subtracted from the shallow cut 310 in the foremost disk 309 is brought opposite the selector. In this case the pin 323 of the frame of the totalizer is not carried downwardly far enough to come into engagement with the slide 325. The selectors 311, with the exception of the foremost one (Fig. 36), are provided with rectangular openings 335 at the points of the pins 319 for the purpose of permitting movement of the selectors without interference. This is better illustrated in Fig. 39. After the special totalizers have been added to or subtracted from as desired, the pitman 330 is returned to its normal position thereby returning the special totalizers to their disengaged position after which the pitman 313 is restored to its normal position thereby withdrawing the selectors 311 from the cuts in the disks 309 and permitting the slide 300 to be restored to its normal position upon the completion of the operation of the machine.

The transferring mechanism for the special totalizers is also illustrated in Figs. 36 to 41 inclusive. The racks 253 are not integral with the rack members 333 and 334, but carry the racks in such manner that the racks may, under spring action, move downwardly one tooth space in advance of their companion racks 253 if necessary for the purpose of transferring. The racks are urged downwardly this extra unit of movement by springs but are normally prevented by pawls 338 which engage notches 339 in the racks 333 and 334 and are carried by racks 253. Frames 340 are pivoted at 341 to frames 342 and the frames 342 carry pawls 343 which are provided with noses 344 for the purpose of being engaged by the pins 345 of the totalizer pinions. The pawls 343 are rocked away from the totalizer pinions by the pins 345 regardless of the direction of rotation of the totalizer pinions and when rocked away from the totalizer pinions engage the extensions 346 of the frames 340 rocking the frames 340 in such direction that the pawls 338 of next higher order than the pawls 344 which actuated the frame will be engaged at their lower ends and rocked out of engagement with the notches 339 in their respective racks. The pawls 343 which are on the addition side of the totalizer are of course engaged by the pins 345 only when the totalizer pinions are being rotated in a forward direction, but similar pawls are provided on the subtracting side of the special totalizer mechanism and these are engaged only when the special totalizers are being rotated in a backward direction. The transfer devices on both the adding and subtracting sides of the special totalizers are of course arranged to transfer from lower to higher orders, but while the downward movement of the racks causes addition on one side it will cause subtraction on the other side depending on with which side a totalizer is in mesh.

Owing to the fact that the "balance charged" totalizer 254 is so constructed as to have amounts added thereto and subtracted therefrom, it is of course to be understood that the pinions of said totalizers are provided with two transfer pins 345, located upon opposite sides of said pinions, which pins actuate the trip pawls 343 coöperating with the adding and subtracting racks 333 and 334 respectively of higher denominations.

At the completion of each operation of the machine the racks 253 and 333 and 334 are left in their lowered or moved positions in order that the indicators with which the racks 253 mesh may be left in their set positions until the next operation of the machine. Mechanism for this reason is provided for restoring the racks to their zero positions at the beginning of each operation of the machine. This mechanism consists of the rod 259 (Fig. 36) which is carried by a pair of arms 258 fast on a shaft 257. This shaft also carries an arm 256 to which is pivoted a pitman 255 (Fig. 18) which extends from the arm 256 to the drive shaft 44. The pitman 255 is operated by the drive shaft 44 and timed for the purpose of raising the rod 259 at the beginning of the operation of the machine and immediately lowering the rod after the meshing of racks 200 so that it will not interfere with the lowering of the racks 253 and 333 and 334 upon the rise of the main racks 200 of the differential mechanism.

*Special indicators.*—The special indicators 8 (Figs. 1 and 18) are fixed upon a shaft 349. There are two of these indicators, one for reading from the front of the machine and the other for reading from the rear of the machine. The shaft 349 on which said indicators are loosely journaled carries a pinion 350 which meshes with an intermediate gear 351 in turn meshing with a special indicator rack 352. This rack meshes with an idle pinion loose upon the shaft 353 of the value indicators, which is in position to be rotated by a rack which is similar to the racks 200 which have been described, but is under the control of the bank of transaction keys and does not transmit its movement to one of the segment gears 58. The rack 348 is also somewhat similar to the racks 253 but does not carry racks 333 and 334 as do the racks 253. Because of this arrangement the special indicators are set as desired upon the rise of the racks 200 and are restored to zero at the beginning of each operation of the machine by the rod 259 when the same moves upwardly.

*Special printer.*—The special printer is illustrated in Figs. 42 to 48 inclusive. It consists merely of a plurality of sets of type carriers 355 which are carried by the special totalizer shafts and concentric tubes 356 with the special totalizer pinions. By this construction the type carriers 355 are at all times positioned in accordance with their respective pinions in the special totalizers. The type carriers are rigid with the special totalizers and the slidable frames 321 which carry the special totalizers are also arranged to support the type carriers.

A single platen 3560 extends across the face of all of the type carriers 355. This platen is not arranged to be actuated by the driving mechanism of the machine but by a separate means consisting of a key which is adapted to be fitted to the square head of the shaft 357 (Fig. 43). By rotating this shaft, cams 358 and 359, which are carried by the shaft, respectively actuate a locking device for the sliding frames 321 and a platen operating mechanism.

The locking device is necessary because without it when an impression is taken the special totalizers would move more or less with the platen and it is preferable to have the special totalizers rigidly supported at the time the impression is taken. The locking device which is actuated by the cam 358 consists of an upright slidable member 360 which is provided with a roll 361 coacting with the cam. At its lower end this upright 360 is pivoted to a lever 362 which is pivoted to the frame of the machine at 363 and extends rearwardly beneath an upright slide or locking bar 364 which is provided with lugs 365 for obstructing rearward movement of the frames 321. The locking plate 364 is shown in Fig. 43 in its operative position with the lugs 365 at the rear of the frames 321 and if an impression were taken with the mechanism in this condition rearward movement of the frames 321 would be prevented by the plate 365. Normally the plate 364 is in a lower position with the lugs 365 between the frames 321 and for this reason does not prevent shifting of the special totalizers.

Upon the rotation of the shaft 357 the cam 359 engages a roller 366 on a pitman 367 causing the pitman to be moved forwardly. The rear end of the pitman 367 is pivoted to a pair of arms 368 and 369 which are respectively pivoted at their outer ends to arms 370 and 371. These arms are loosely journaled on the shaft 357 and with the levers 368 and 369 form a parallelogram structure which tensions a spring 372 extended between two pivots for the four arms. When the highest part of the cam 359 clears the roll 366 the spring 372 is permitted to extend the four arms in a horizontal direction and the pivot between the levers 368 and 369 extends through a lug on the platen 3560 and the platen 3560 is slidably mounted in the frame 373. An impression is accordingly taken as soon as the roll 366 is free of the cam 359.

The paper upon which the special totals are printed leads from a supply roll 374 around a roll 375, upwardly between the platen and the type carriers and out through the cabinet of the machine after passing between feed rolls 376 and 377. After an impression the paper 378 is drawn upwardly by hand until the printed matter is exposed, and is then torn from the remainder of the strip. Feeding mechanism is provided for this paper which upon the rotation of shaft 357 feeds the paper a short distance upwardly so that it will extend above the printer far enough to permit being gripped for the purpose of withdrawal. The feed roll 377 is eccentrically mounted so that it may be rocked away from feed roll 376 at this time. The feed occurs before the shaft 357 is rotated far enough to permit the platen to operate. The arrangement of the feeding mechanism is illustrated in Fig. 47. It consists merely of an oscillating pitman driven by a cam on the shaft 357 and which is arranged to rock levers 379 and 380 which respectively carry feed pawls 381 and 382. The feed pawl 381 acts upon a ratchet 383 which is rigid with the feed roll 376 and the feed pawl 382 acts upon a ratchet 384 which is rigid with a roll 385 (Fig. 43). The last mentioned roller is for the purpose of feeding an endless ink ribbon 386 which passes around the roller 385 and four rollers 387. A sample of the impressions which are effected by the special printer is shown in Fig. 68.

As the resetting mechanism (Figs. 44 and 45) for the special totalizers is located in the special printer it will be described here. It consists of shafts 388 which are provided with longitudinal grooves 389 for the purpose of permitting the passage of pawls 390 in one direction while being adapted for engaging the pawls when the shafts 388 are rotated in the same direction. The pawls 390 are carried by gears 391 which are loosely journaled upon the shafts 388 and respectively mesh with pinions 392 which are secured to the type carriers 355. Each shaft 388 is provided with a key seat 393 to serve for the rotation of the shaft. The gears 391 are of course differentially rotated according to the rotation of the type carriers thus causing the pawls 390 to be set according to the setting of the type carriers. By the rotation of a shaft 388 the respective pawls for this shaft will be engaged in whatever position they may be in by the grooves of the shaft and caused to rotate their respective gears 391 to zero positions and accordingly cause the resetting of the type carriers and special totalizers.

Each type carrier 355 is rigid with an alining disk 394 which is normally engaged by a spring pressed pawl 395 for the purpose of preventing accidental rotation of the type carriers and their respective totalizer pinions. Fig. 44 illustrates the manner in which the pawls 395 are mounted. They are all loose upon the shafts 388 and at 396 are pivoted to spring pressed slides 397, the springs being indicated at 398. These slides 397 are provided with rollers 399 which normally rest in notches 400 (Fig. 46) in disks 401 which are rigidly secured to the shafts 388. For this reason when the shafts 388 are rotated upon resetting operations the rolls 399 will be forced out of the notches in the disks 401 against the action of the springs 398 thereby carrying the slides 397 rearwardly causing the pawls 395 to be withdrawn from engagement with the alining disks. As soon as the shafts 388 have completed their rotations the notches 400 in the disks 401 arrive opposite the rolls 399 and for this reason the pawls 395 at this time spring into engagement with their respective alining disks 394 and check further rotation of the shafts. By this means the operator is apprised of the fact that the totalizers are in their zero positions.

*Detail strip printer.*—The detail strip printer is arranged to take two impressions upon each operation of the machine. One impression is for the purpose of printing the amount of the transaction which is recorded and the other impression is for the purpose of printing the total amount added on the customer's retaining device at the time that it is ejected from the machine. To accomplish this function a platen operating cam 405 (Fig. 49) is mounted fast on drive shaft 44 and provided with two actuating shoulders 406 and 407. The cam 405 acts upon a roller 408 on an arm 409 which is carried by a rearward extension 410 of a platen arm 411 which is pivoted to the printer frame 412 at 413. The detail paper is led from a supply roll 414 over a roll 415 and between a set of type carriers 416 and a platen 417. It then passes between feed rolls 418 and 419. The feed roll 418 is rigid with a ratchet which is adapted to be engaged by a feed pawl 420, which, together with a feed pawl 421 for an ink ribbon 422, is actuated by a pitman 423 which is reciprocated at the proper times by a cam 424 (Fig. 52) which is carried by the drive shaft 146. The race 425 of this cam which engages the roller 426 of the pitman 423 is indicated by the broken lines.

The type carriers 416 are shown linked to arms 427 on the shafts 282, 280, 280ª and 280ᵇ which shafts are differentially rocked by the retaining devices and the differential mechanism respectively for setting up amounts of transactions and total amounts, the number of the customer's retaining device, the class of transaction, and the number of the clerk's retaining device. As previously explained the shafts 282 are first moved to the correct angular position for causing the type carriers 416 to come to the position for the printing of the total amount which is on the customer's retaining device at the time it is inserted into the machine. Then the shafts 250 are rocked to the correct position for setting the type carriers 416 to the amount of the transaction which is being recorded by the machine. Finally these shafts are positioned so that the type carriers 416 will come to a position for printing the total amount which is on the customer's retaining device at the time that it is ejected from the machine. The reason that the type carriers are moved to these three different positions while only two impressions are taken from the same is that they are rigidly connected through the shafts 282 and arms and links with the type carriers of the check printer in which the three impressions are taken upon each operation of the machine.

At the side of the type carriers 416 are dating type carriers 416¹ and consecutive numbering type carriers 428. The platen 417 is of just sufficient length to take impressions from the type carriers 416 which are connected to the amount shafts 282 as it is necessary to take two impressions from these type carriers and the platen 417 is operated by the two-shouldered cam 405. A sample of the detail strip is illustrated in Fig. 67 and it may be seen from this figure that in regard to the consecutive number, customer's number, class of transaction, clerk's number and date it is only necessary to effect one impression from these type carriers. For this reason a separate platen 429 is provided. The platen 429 is fast to an arm 430 to which is pivoted an arm 431 provided with a roll 432 resting against the periphery of a cam 433. The cam 433 is provided with a single shoulder 434 so that the platen 429 will be operated once only at each rotation of the drive shaft 146. The shoulder of the cam 433 is so located that it will cause the platen 429 to operate simultaneously with the platen 417 at the first operation of the platen 417.

The consecutive numbering device 428 is actuated by a multi-prong pawl 435 which is pivoted upon the supporting shaft 364 for the type carriers 416 and is operated by a pitman 437 (Fig. 52) which in turn is actuated by the race 438 in the cam disk 424. The pitman is connected to the arm 439 which carries the multi-prong pawl by an arm 440, shaft 441, arm 442, and a link 443.

The feed roll 419 is eccentrically mounted as indicated in Fig. 49 for the purpose of being shifted away from the feed roll 418 thus permitting the free threading of the detail strip 444.

*Check printer.*—A sample of the work accomplished by the check printer is illustrated in Fig. 69. From this figure it may be seen that the type carriers of the check printer must be adapted for printing "numbers of transactions", "date", "clerks' numbers", "classes of transactions", "customers' numbers" and "amounts". The amount type carriers are set for the printing of three different amounts by the operation of the machine. First, an impression is taken of the amount which is on the customer's retaining device at the time that it is inserted into the machine, then an impression is taken of the amount of the transaction which is being entered in the machine and finally an impression is taken of the balance or the amount which the slides of the customer's retaining device represent at the time it is ejected from the machine. To accomplish this triplicate printing from certain of the type carriers and only one printing from the remainder of the type carriers, two platens are provided, one of which is operated three times while the other is operated once only, at each operation of the machine. The drive shaft 44 (Fig. 53) carries the cams for operating the platens. One cam is provided with three operating shoulders while the other cam is provided with one shoulder only. The check printer itself is shown in Figs. 53 to 55 inclusive and details of the check printer are shown in Figs. 58, 59, 60, 62, 64 and 65.

Power is supplied to the check printing mechanism through the drive shaft 44 which carries a gear 445 meshing with a gear 446 which is carried by a stub shaft 447. The shaft 447 carries a pinion 448 meshing with a gear 449. This gear is also carried by a stub shaft located within the check printer and the three shafts mentioned carry elements for operating the printer. The drive shaft 44 carries a cam 450 (Fig. 58) for operating a platen 451. This is the platen which effects impressions of amounts and is operated three times at each operation of the machine. The cam 450 is provided with three shoulders 459 which act upon a roller 470 carried by a small spring-pressed arm 471 carried by an arm 472 which is pivoted upon a shaft 473. The arm 472 is operatively connected with the platen 451 and the object of the spring-pressed arm 471 is to cause a sudden operation of the platen under the action of the spring 474 as soon as the roll 470 clears the tip of one of the shoulders 459, no matter how slowly the drive shaft is being rotated. The arm 472 is rigid with arms 475 and 476 and the arm 475 normally rests upon a lug 477 on the platen arm 478 which is loosely pivoted upon the shaft 473 and the arm 476 supports a spring 479 which is compressed between the arm 476 and the lug 477 of the platen arm. When the rearward end of the arm 472 rises under the action of the spring 474 the arm 475 by engagement with the lug 477 forces the platen arm downwardly and the slight compression of the spring 479, following the impact of the roll 470 with the shallow part of the cam 450, allows the platen to effect the impression and then the expansion of the springs 479 immediately carries the platen a slight distance clear of the type carriers. A platen 480, which effects the printing of the "date", "clerk's number", "class of transaction" and "customer's number," is mounted and operated similarly to the platen 451 but cam 481 (Fig. 55), which operates this platen, is provided with only one shoulder. The shaft 44 also carries a cam 4751 for operating the feeding mechanism of an endless ink ribbon 458 which comprises a pawl 452, carrying arm 453 for the pawl and link 454 which unites the arm 453 with an arm 455 which is pivoted to the printer frame by a pin 456. The pawl 452 is arranged for engagement with a ratchet which is rigid with the ink ribbon feed roll 457. The cam 475 is provided with three shoulders for the purpose of operating the ink ribbon feeding mechanism three times, or once for each impression of the printing mechanism. An ink ribbon tensioning device is indicated at 482.

The strip of check paper 460 is led from the supply roll 461 (Fig. 1) around the roll 462 (Fig. 53), between the feed rolls 463 and 464 and into a gripping device which is indicated at 465. From this gripping device it passes over the type carriers 466 and 467, and from these out through the machine cabinet. The type carriers 467 are dating wheels for which the setting mechanism is omitted from the drawings. The check feeding mechanism consists of the pitman 484 (Fig. 59) operated by a cam 483 and a lever 485 (Fig. 53) which is pivoted to the forward end of the pitman and to the frame at 486. At its lower end it is forked over a pin 487 which is carried by a sliding table 488. The paper gripping device is mounted in this sliding table 488.

The check strip is fed forward upon each operation of the machine for the purpose of bringing a sufficient length of the strip into position in the check printing mechanism to serve for the check which is issued upon the next succeeding operation of the machine. This part of the check strip is also separated from the remainder of the strip after being fed forward, and when the check is printed the check gripping and feeding device first carries it forward into position for receiving the first impression. The gripping and feeding device then returns the check a slight distance into position for receiving the second impression and after this returns it still farther inwardly into position for receiving the third impression. The gripping device then releases the check and is returned to its normal position. In the meantime the strip of check paper is fed forward far enough to bring a part of the strip into position for being operated upon by the printing mechanism in the succeeding operation of the machine.

The specific arrangement is as follows: The check strip 460 is fed forwardly during the entire operation of the machine by the feed rolls 463 and 464 which are geared to the drive shaft 44. At the beginning of rotation of the drive shaft a cam 490 (Fig. 62) acts upon a roller 491 rocking a knife-carrying arm 492 in the proper direction for lifting knife 493 (Fig. 53) clear of the strip of check paper and at the same time a pitman 494, which operates the check gripping device, is lifted by a cam 495 (Fig. 60) which is carried by the drive shaft 44. The lower end of the pitman 494 is pivoted to an arm 4951 (Fig. 53) which arm is pivoted to the frame of the machine at 496. This arm extends downwardly from its pivot 496 at an angle to the horizontal plane but when the pitman is lifted it comes to a horizontal position. The upper edge 497 of the arm 4951 engages a roll 498 on the gripping device when the arm is lifted and forces a slidable member 499 on the gripping device against a coacting member 500 of the grip. The part of the check strip which had been severed from the remainder of the strip at the completion of the last previous operation of the machine is at this time between the gripping members of the check feeding mechanism. After the check has been so gripped the pitman 484 is drawn inwardly by the cam 483 its full extent of movement thus rocking the lever 485 on its pivot 486 and thereby carrying the gripping device outwardly. This movement brings the check into proper position for receiving the first impression. After the first impression is taken the cam 483 returns the pitman 484 part way to its original position and when in this intermediate position the second impression is taken. After which the pitman 484 is drawn still farther toward its initial position for the purpose of bringing the check into proper position for the third impression. After the third impression is taken the cam returns the pitman 484 the remainder of the distance to its initial position. But before this last movement of the pitman the check gripping device is released permitting the gripping device to be opened under the action of a spring 501 in time to permit passage of the advancing edge of the check which is at this time being fed forward by the rolls 463 and 464.

*Inserted slip printer.*—One of the printed sales slips is illustrated in Fig. 70. The printer for printing these slips is illustrated by Figs. 56, 57, 63, 64 and 65. It receives power from a spiral gear 502 (Fig. 53) which is carried by the drive shaft 44 and meshes with a gear 503 carried by a vertical shaft 504. The shaft 504 (Fig. 56) carries another spiral gear 505 meshing with a spiral gear 506 on a shaft 507 and the shaft 507 carries a gear 508 which meshes with a gear 509 on a cam shaft 510. This printer is arranged for printing upon an inserted slip in the same manner as the check printing mechanism prints upon the check. Type segments for the slip printer are integral with the type segments 466 of the check printer and are indicated at 511 (Fig. 56). An ink ribbon 512 is arranged to be fed between type carriers 511 and platens 513 and 514 (Fig. 57). The reason for the two platens is that three impressions are taken from the amount type carriers while only one is taken from the remainder of the carriers and for this same reason means are provided for feeding the slip for the purpose of receiving the three impressions. When the slip is inserted into the machine it is placed between flanges 515 and a member 516 of a gripping device. The member 516 is mounted to slide in a vertical direction on a carriage 517 and carries a roll 518 which extends across the upper edge 519 of a plate 520 which is pivoted to the frame at 521. This plate 520 carries a roller 522 which is acted upon by a cam carried by the shaft 510 for rocking the plate upwardly so that its upper edge comes to a horizontal plane. The cam is arranged to hold the plate in its upper position during the greater part of the operation of the machine and when in this position it holds the member 516 in gripping position but does not prevent its movement with the carriage or slide 517 forwardly or rearwardly in a horizontal plane. The slide 517 is moved for the purpose of carrying the slip from one printing position to another by a forked arm 539 through which extends a pin 523 on the slide 517 and which is pivoted to the frame by a pin 524 and to a pitman 525 by a pin 526. The pitman 525 is provided with a roll 527 extending into the race of a cam 528 (Fig. 64). The cam 528 is arranged that after the first impression on the slip the pitman will be drawn inwardly its full throw. The second impression is then taken and the pitman is returned part way when the third impression is taken; finally at the completion of the operation of the machine the cam 528 returns the pitman and the carriage 517 to their original positions. The arm 520 which operates the gripping devices is also returned to its original position at the completion of the operation of the machine. Cam 529 which operates this arm is illustrated in Fig. 65.

Cams for operating the platens of the slip printer are shown at 530 and 531 (Fig. 57). The cam 530 is provided with only one actuating shoulder whereas the cam 531 has three similarly to the cam 450 of the check printer (Fig. 58). The platens when released by the cams are actuated by springs 532 and the hammer parts of the platen are resiliently carried by bell crank levers 533 which connect the platen hammers to pitmen 525 so that under the impetus received from the pitmen they will be sprung upwardly far enough to effect the impression and then return a slight distance away from the type wheels so as not to effect the withdrawal of the printed slip. The shaft 507 operates a feed device 534 for the ink ribbon 512 and a tensioning device for the ink ribbon is provided as indicated at 535.

Alining teeth 536 are cut in the type segments as indicated in Fig. 56. These teeth are engaged by pawls 537 when impressions are being taken from the type carriers. The pawls 537 are actuated by a pitman 538 which is actuated by a cam 5381 (Fig. 61) carried by the drive shaft 44.

The general operation of the machine will doubtless be clear from the detail description given, but it may be briefly restated as follows: Assuming that a clerk has made a cash sale, he will depress the amount keys 2 corresponding to the amount of the sale and also depress the cash key in the bank of keys 3, after inserting his total retaining device into the machine on the carriage 6. The depression of the amount keys raises the three plates corresponding thereto and shown in Figs. 19, 20 and 21. The elevation of plate 211 releases the detent plate 209, and this in turn moves to a position such that the latches 227 for the remaining plate 206 will be connected to the pitman 232. The depression of the cash key elevates the plate 168, shown in Fig. 26, thereby connecting the cam 154 so that it may control the operation of the sub-totalizer for the clerk and prepare it to have an amount added thereto. When the total retaining device is inserted in the carriage it is latched there by the arm 48 of Fig. 13, and an insertion of the total retaining device on the carriage serves to release the bank of transaction keys through the arm 67 shown in Fig. 12. As the transaction assumed is a cash transaction no customer total retaining device is inserted in the machine, and the mechanism for locking the cash key, as shown in Fig. 14, is therefore not employed. On operating the handle 1, the carriage 6 is first drawn into the machine by the link and cam device of Fig. 9, and the amount slides of the total retaining device then engage and adjust differentially the segments 58 of Fig. 17 through the plungers 50. At this movement, however, the sub-totalizer is not operated insomuch as the pinions 62 are not in engagement therewith. The main operating mechanism next returns the segments 58 to normal positions through the bar engaging the downwardly extending arms of these segments, and at this time the sub-totalizer is actuated as the cam 154 causes the pinions 62 to connect the sub-totalizer with these segments 58. Thus, the amount previously indicated by the slides of the clerk's total retaining device is transferred to the sub-totalizer. When the differential slides 206 are released they move upward until stopped by the amount keys which have been depressed, thus permitting the lowering of the segments 204 of Fig. 21. Then the rack bars 200 of Fig. 35 are rocked around their pivot rod 235 by the mechanism of this figure, so as to engage the segments 204 with the rack 201, and at the same time to engage the racks 202 and 203 respectively with the segments 58 and the indicator pinions. These racks are then moved upwardly to normal positions with the segments 204, thus setting the indicators to a position exhibiting the amount of the transaction and thus again setting the differential segments 58. During this second setting of segments 58 the clerk's sub-totalizer is again disengaged from the segments 58 by the cam 151, but on the second resetting to normal positions of these segments by the mechanism of Fig. 16ᴬ the sub-totalizer is actuated, thus as a result of its two operations it now indicates the sum of the amount previously on the total retaining device and the amount of the new transaction. The sub-totalizer is then reset to zero position by the mechanism of Fig. 16, and as at this time the segments 58 are connected to the sub-totalizer they are moved to corresponding extents, and the plungers 50 connected thereto are also moved. As the slides of the total retaining device are spring pressed to engage the plungers 50 this last movement of the plungers sets the amount slides to the new amount and the slides may then be latched in that position. The cam of Fig. 9 lastly causes the carriage 6 to move to its outward position and the total retaining device may then be extracted from the machine.

The special totalizers of Fig. 36 are actuated by the rack bars 200 which were stated to control the addition of the amount to the sub-totalizer. When the indicators 7 are set to the amount of the transaction the bars 253 are moved to equivalent extents. The elevation of the plate 300 rotates the notched disks 309, and the control bars 311 may then drop to extents determined by the notches 310 in these disks. In the particular transaction referred to the connecting frame 320 for the upper or cash totalizer will be permitted to lower until its pin 323 engages the notch 324 of the proper plate 330. Elevation of this plate 330 will draw the cash totalizer into engagement with the adding racks 333, so that the upward movement of the bars 253 will add the amount indicated by the depressed keys to the cash totalizer. The type carriers for the various printers are set in correspondence with the segments 58, of the transactions from the segments 58, and impressions are taken therefrom on the detail strip and the check. In the case of a charge transaction, the customer's total retaining device would also be inserted into the machine and the charge key pressed. The operation will be substantially that indicated above, except that the charge totalizer of the group shown in Fig. 36 will be added to.

While the form of mechanism herein shown and described is admirably adapted to fulfil the objects primarily stated, it is to be understood that it is not intended to confine the invention to the one form of embodiment herein shown and described as it is susceptible of embodiment in various forms all coming within the scope of the claims which follow.

What is claimed is as follows:

1. In a machine of the class described, the combination with a differentially movable plunger, of a detachable total retaining device comprising a differentially adjustable element, a carriage on which said retaining device may be manually placed, positioned in the line of said plunger, and means for moving said carriage and thereby engaging said retaining element with said plunger.

2. In a machine of the class described, the combination with a differentially movable plunger, of a detachable total retaining device comprising a differentially adjustable element, a carriage on which said retaining device may be manually placed, means carried by said carriage for locking said retaining device thereon, and means for moving said carriage and thereby engaging said retaining element with said plunger.

3. In a machine of the class described, the combination with a detachable total retaining device and a carriage on which said retaining device may be manually placed, of means for locking said retaining device on said carriage, a bank of keys, having devices normally preventing actuation thereof, and connections from said retaining device locking means for disabling said preventing devices.

4. In a machine of the class described, the combination with a detachable total retaining device manually insertible into the machine, of a bank of transaction keys, a plate operated by said keys, devices normally latching said plate, a latch for said retaining device, moved to latching position by the insertion of said retaining device into the machine, and connections whereby said retaining device latch releases said plate latching device.

5. In a machine of the class described, the combination with a detachable total retaining device manually insertible into the machine, of a bank of transaction keys, a device for blocking movement of one key of said bank, and connections actuated by insertion of said retaining device for moving said blocking device to blocking position.

6. In a machine of the class described, the combination with a detachable total retaining device comprising a differentially adjustable element, and a carriage on which said retaining device may be manually placed, of a differentially movable mechanism in the machine including a slide, means for moving said carriage and thereby engaging said differentially adjustable element with said slide and positioning the same, means for restoring said differential mechanism to normal position and a sub-totalizer operated by the restoration of said differential mechanism.

7. In a machine of the class described, the combination with a detachable total retaining device comprising a differentially adjustable element, of means for forcing said retaining device into the machine, a differential mechanism including a slide positioned to be engaged and operated by said differentially adjustable element as it enters the machine, means for restoring said differential mechanism to normal position, a sub-totalizer operated by the restoration of said differential mechanism, and means for further actuating said differential mechanism.

8. In a machine of the class described, the combination with a detachable total retaining device comprising a differentially adjustable element and means for locking said element in any of its set positions, of means for forcing said retaining device into the machine, a differential mechanism including an element positioned to be operated by said retaining device element as it enters the machine, means for restoring said differential mechanism to normal position and thereby restoring said retaining device element to zero position, a sub-totalizer operated by the restoration of said differential mechanism, and means for releasing said locking means before said restoration.

9. In a machine of the class described, the combination with a detachable total retaining device comprising a differentially adjustable element, and means for forcing said retaining device into the machine, of a differential mechanism comprising an element in the path of and operated by said retaining device element as it enters the machine, means for twice restoring said differential mechanism to normal position, a sub-totalizer operated by the first restoration of said differential mechanism, a bank of keys, mechanism controlled by said keys and constructed to position said differential mechanism again, and connections whereby said sub-totalizer may be operated either by the movement of said differential mechanism as controlled by said keys or by its second restoration movement.

10. In a machine of the class described, the combination with a detachable total retaining device manually insertible into the machine and comprising a differentially adjustable element, of a differential mechanism in the machine comprising an element positioned by said retaining device element when inserted in the machine, means for twice restoring said differential mechanism to normal position, a sub-totalizer, a bank of keys, mechanism controlled by said keys constructed again to position said differential mechanism, and devices constructed to engage said sub-totalizer with said differential mechanism during its first restoration and during either its positioning movement by said key controlled mechanism or its second restoration to normal position.

11. In a machine of the class described, the combination with a detachable total retaining device manually insertible into the machine and comprising a differentially adjustable element, of a differential mechanism in the machine including an element positioned by said retaining device element when the same is inserted in the machine, means for twice restoring said differential mechanism to normal position, a sub-totalizer, a bank of keys, mechanism controlled by said keys constructed again to position said differential mechanism, devices constructed to engage said sub-totalizer with said differential mechanism during both restorations thereof, and means for thereafter resetting said sub-totalizer to normal position while it is engaged with said differential mechanism.

12. In a machine of the class described, the combination with a sub-totalizer comprising a gear, of an actuating device therefor also including a gear, means for oscillating said actuating gear to differential extents, an intermediate pinion constructed to connect said totalizer gear with said actuating gear, and means for retaining said intermediate pinion in connecting position during movement of said actuating gear in either direction as desired.

13. In a machine of the class described, the combination with a sub-totalizer and an actuating device therefor, with means for giving said actuating device reciprocations to differential extents, of connecting devices including differently timed cams and links connected to said cams, and constructed to cause connections of said totalizer to said actuating device, a bank of keys, and plates connected to said links and having differently placed camming surfaces engaged by said keys.

14. In a machine of the class described, the combination with a totalizer comprising a gear having a transfer trip pin mounted thereon; of a transfer operating device including a slide, a bifurcated pawl mounted on said slide and having its bifurcations positioned to engage teeth on opposite sides of said gear, a trip arm also carried by said slide and positioned to be engaged by said trip pin and to cause rocking of said bifurcated pawl, and means for reciprocating said slide.

15. In a machine of the class described, the combination with a toothed bar mounted to slide and to rock, of a segment gear and a pinion positioned near opposite ends and on opposite sides of said bar, keys controlling the sliding movement of said bar, devices for rocking said bar to engage it with said segment and said pinion, an indicator driven by said pinion, and a totalizer driven by said segment.

16. In a machine of the class described, the combination with a plurality of totalizers each including a gear pinion, of a pair of rigidly connected racks on opposite sides of said pinions, means for differentially moving said racks, means for shifting any of said gear pinions into mesh with one of said racks, and a bank of keys having connections to control said shifting means.

17. In a machine of the class described, the combination with a totalizer including a gear pinion, of a pair of rigidly connected racks on opposite sides of said pinion, means for differentially moving said racks, a frame connected to shift said pinion into mesh with said racks, plates moved in opposite directions at each operation of the machine, and keys having connections to engage said shifting frame with either of said plates.

18. In a machine of the class described, the combination with a totalizer including a series of gear pinions, and printing devices including a series of type carriers permanently connected to said gear pinions, of a series of actuating racks for said gear pinions, means for shifting said pinions into and out of mesh with said racks, a platen confronting said type carriers, and a platen operating device having connections to lock said type carriers and pinions against said shifting movement.

19. In a machine of the class described, the combination with an operating mechanism, of two classes of accumulators, each class consisting of a plurality of accumulators, a set of amount determining devices, means controlled by said determining devices, and operated by the operating mechanism for adding an item on any accumulator of one class and subtracting the same from any accumulator of the other class at a single operation of the operating mechanism.

20. In a machine of the class described, the combination with a plurality of type carriers, and means for differentially moving them to bring any desired combination of types to a printing line, of two platens side by side and each confronting part of said printing line, separate cams operating said platens simultaneously to take an impression from all type at the printing line, and an additional cam for additionally operating one of said platens.

21. In a machine of the class described, a detachable total retaining device comprising a casing, a plurality of differentially adjustable amount slides mounted in said casing, and springs connected to said slides and tending to move said slides toward their position indicating the highest or "nine" amount.

22. In a machine of the class described, the combination with a detachable total retaining device manually insertible in the machine and comprising a differentially adjustable amount element and means for locking the same, of a differential mechanism in the machine including a slide positioned to confront said differentially adjustable element when the same is inserted in the machine, a locking device for said slide, a plunger releasing the amount element locking means, and an arm constructed to release said slide locking device and to actuate said plunger simultaneously.

23. In a machine of the class described, the combination with a detachable total retaining device comprising a differentially adjustable amount element, of a carriage on which said retaining device may be placed manually, means for drawing said carriage into the machine, a differential mechanism in the machine comprising a slide positioned to be confronted by said amount element, and a latching device for said slide mounted on said carriage, and preventing overthrow of said slide.

24. In a machine of the class described, the combination with a detachable total retaining device and a carriage on which said device may be placed manually, of a latching element for said retaining device mounted on said carriage, a releasing means for said latching element also mounted on said carriage, and a stationary part against which said releasing means strikes as the carriage moves to its normal position.

25. In a machine of the class described, the combination with a clerk's and a customer's detachable total retaining devices each comprising differentially adjustable amount elements, of a carriage on which said retaining devices may be manually placed, with means for drawing said carriage into the machine, two differential slides positioned to confront respectively the two retaining devices when the same have been inserted and to be operated by the amount element thereof, key controlled mechanism for further operating the differential slide corresponding to the customer's amount retaining element, and means for connecting the two slides during operation of the customer's differential slide by said key controlled mechanism.

26. In a machine of the class described, the combination with a clerk's and customer's total retaining devices each comprising an amount element, and manually insertible in the machine, of two differential devices in the machine positioned to confront respectively the clerk's and the customer's amount elements and to be operated thereby, key controlled mechanism for further operating the differential device corresponding to the customer's amount element, and a shiftable rack constructed to connect the two differential devices only during operation of the customer's differential device by said key controlled mechanism.

27. In a machine of the class described, the combination with printing devices comprising type carriers and means for taking impressions therefrom, of a gripping device for a record material comprising two relatively movable and normally separated parts, a carrier for said gripping device, means for sliding said carrier after a printing impression and a plate engaging one of said gripping device parts with means constructed to move said plate and thereby bring said two gripping parts together and retain them together during movement of said carrier.

28. In a machine of the class described, the combination with a detachable total retaining device comprising amount determining elements, of a differential mechanism in the machine comprising differentially adjustable devices constructed to be differentially adjusted under control of said amount determining elements, printing devices permanently connected to said differentially adjustable devices, a sub-totalizer and means for connecting it to elements of said machine differential mechanism, key controlled devices for further adjusting said differential mechanism and said totalizer, means for resetting said totalizer to zero and thereby a third time adjusting said differential mechanism, and means for taking impressions from said printing mechanism in each of its three adjusted positions.

29. In a machine of the class described, the combination with a detachable total retaining device manually insertible into the machine, of a bank of keys and means normally locking said keys against operation, a second bank of keys and means, normally in unlocking relation, for locking one of the keys of said second bank, and separate connections, actuated by manual insertion of said retaining device in the machine, to release said first locking means and to move said second locking means to locking position.

30. In a machine of the class described, the combination with a detachable total retaining device manually insertible into the machine, and having a projection, of a latching arm positioned to be engaged and moved by said projection and then to move in front thereof as the retaining device is inserted into the machine, a bank of keys, means for locking said keys, and connections from said key locking means to said latching arm, including a by-pass pawl constructed to cause release of said keys only when said latching arm moves in front of said projection.

31. In a machine of the class described, the combination with a detachable total retaining device manually insertible into the machine, of a carriage on which said retaining device may be manually placed, connections for moving said carriage in the machine, an arm carried by said carriage and constructed to latch said retaining device to the carriage, a bank of keys, means for normally locking said keys, and connections, including an arm having a slot, whereby said latching arm releases said key locking means.

32. In a machine of the class described, the combination with a bank of keys, and a plate constructed to be operated by said keys, of a stationary arm, an element pivoted to said key operated plate, and constructed to be obstructed by said stationary arm, a by-pass pawl carried by said element, and means for engaging and moving said by-pass pawl and thereby releasing said element from said stationary arm.

33. In a machine of the class described, the combination with a detachable total retaining device having a differentially adjustable element and which may be manually inserted in the machine, of a carriage on which said retaining device may be manually placed, means for moving said carriage in the machine, a bar positioned to be engaged by said retaining device element and having ratchet teeth, and a pawl carried on said carriage and positioned to engage the ratchet teeth on said bar.

34. In a machine of the class described, the combination with a differential element, and a plate having graduated notches and connected to said element, a bank of keys positioned to obstruct said plate notches when said keys are depressed, an arm normally latching said plate against movement, a key detent plate, a main operating mechanism, and connections from said operating mechanism, controlled by said key detent plate, to withdraw said latching arm from said notched plate.

35. In a machine of the class described, the combination with a bank of keys, and a plate constructed to be given movements of graduated extents under control of said keys, means normally locking said plate, a key detent plate, and a releasing arm carried by said detent plate, and movable thereby to position to engage said locking means, with devices for then operating said releasing arm.

36. In a machine of the class described, the combination with a totalizer including gear wheels and a shaft on which said wheels are carried, of pawls constructed to connect said wheels to said shaft, a cam fast to said shaft, and a pitman having rollers mounted thereon and engaging opposite sides of said cam, with means for actuating said pitman.

37. In a machine of the class described, the combination with a totalizer element, and an actuating device therefor, of means for giving said actuating device oscillations of various extents, devices for coupling said actuating device and said totalizer element, two differently timed mechanisms constructed separately to control said coupling devices, a bank of keys and connections controlled by said keys for making said timed mechanisms separately effective.

38. In a machine of the class described, the combination with a plurality of totalizers, of a corresponding number of entry retaining devices, an operating mechanism, means controlled thereby for transferring the amounts on the retaining devices to the corresponding totalizers, and amount manipulative devices for controlling the actuation of all of said totalizers during the same operation of the operating mechanism in which the amounts on the retaining devices are transferred to the totalizers.

39. In a machine of the class described, the combination with a plurality of totalizers, of a corresponding number of entry retaining devices, an operating mechanism, means controlled thereby for transferring the amounts on the retaining devices to the corresponding totalizers, amount manipulative devices controlling the actuation of all of said totalizers, and means for transferring back to the respective retaining devices the amounts represented by the final positions of the corresponding totalizers.

40. In a machine of the class described, the combination with a plurality of totalizers, of a corresponding number of entry retaining devices, amount determining devices, an operating mechanism, and means controlled thereby for transferring the amounts on the retaining devices to the corresponding totalizers and then adding to one of the latter and subtracting from the remainder the amount represented by the operated amount determining devices.

41. In a machine of the class described, the combination with a customer's retaining device and a clerk's retaining device, of totalizers coöperating therewith, amount determining devices, an operating mechanism, and means controlled thereby for transferring the amounts on the retaining devices to the coöperating totalizers and then adding to one of the latter and subtracting from the other the amount represented by the operated amount determining devices.

42. In a machine of the class described, the combination with a customer's retaining device and a clerk's retaining device, of totalizers coöperating therewith, amount determining devices, an operating mechanism, and means controlled thereby for transferring the amounts on the retaining devices to the coöperating totalizers and then adding to the customer's totalizer and subtracting from the clerk's totalizer the amount represented by the operated amount determining devices.

43. In a machine of the class described, the combination with a plurality of totalizers, of a corresponding number of entry retaining devices, amount determining devices, an operating mechanism and means actuated thereby for transferring the amounts on the retaining devices to the corresponding totalizers, then adding to one of the latter and subtracting from the remainder the amount represented by the operated amount determining devices and thereafter transferring back to the respective retaining devices the sum and difference of the corresponding totalizers.

44. In a machine of the class described, the combination with a customer's retaining device and a clerk's retaining device, of totalizers coöperating therewith, amount determining devices, an operating mechanism, and means actuated thereby for transferring the amounts on the retaining devices to the coöperating totalizers, then adding to the clerk's totalizer and subtracting from the customer's totalizer the amount represented by the operated amount determining devices and thereafter transferring back to the respective retaining devices the sum and difference of the corresponding totalizers.

45. In a machine of the class described, the combination with a customer's retaining device and a clerk's retaining device, of totalizers coöperating therewith, amount determining devices, an operating mechanism, and means actuated thereby for transferring the amounts on the retaining devices to the coöperating totalizers, then adding to the clerk's totalizer and subtracting from the customer's totalizer the amount represented by the operated amount determining devices and thereafter transferring back to the respective retaining devices the sum and difference of the corresponding totalizers.

46. In a machine of the class described, the combination with a set of amount determining devices, of actuators controlled thereby, an operating mechanism, and a plurality of detachable total retaining devices constructed to be attached to the machine and to be actuated by the actuators during a single operation of the operating mechanism.

47. In a machine of the class described, the combination with a set of amount determining devices, of actuators controlled thereby, a plurality of normally detached total retaining devices constructed to be attached to the machine and to have added to one and subtracted from the remainder of the total devices by the actuators an amount corresponding to the operated amount determining devices.

48. In a machine of the class described, the combination with a customer's total retaining device and a clerk's total retaining device, both of said devices being normally detached from the machine, of actuators therefor, a set of amount determining devices controlling said actuators, and means for establishing coöperative relation between the total retaining devices when attached to the machine and the actuators in such a manner that the amount represented by the operated amount determining devices will be added to one of said total retaining devices and subtracted from the other.

49. In a machine of the class described, the combination with a pair of totalizers including denominational elements, of actuators therefor, sets of amount determining devices controlling said actuators, the sets corresponding to the totalizer denominational elements, and means for establishing coöperative relation between said actuators and totalizers in such a manner that the amount represented by the operated amount determining devices will be added to one of said totalizers and subtracted from the other.

50. In a machine of the class described, the combination with a plurality of totalizers including denominational elements, of actuators therefor, sets of amount determining devices controlling said actuators, the sets corresponding to the totalizer denominational elements, means for establishing coöperative relation between the totalizers and actuators, and special manipulative devices controlling the means for establishing coöperative relation between the totalizers and actuators in such a manner that any one of the totalizers may have added thereto or subtracted therefrom the amount represented by the operated amount determining devices depending on the special manipulative device operated.

51. In a machine of the class described, the combination with a differentially movable plunger, of a detachable total retaining device for positioning said plunger, a carriage on which said retaining device may be manually placed, a lever connected to said carriage, and a cam for oscillating said lever to move said carriage and thereby causing said total retaining device to thereby position said plunger.

52. In a machine of the class described, the combination with an element to be differentially positioned, of detachable total retaining devices employed to position said element, and operating means for moving said total retaining devices into the machine differentially to position said element.

53. In a machine of the class described, the combination with a differentially movable plunger, of a detachable total retaining device comprising a differentially adjustable element and an immovable member, a carriage on which said retaining device may be manually placed, a spring pressed latch carried by said carriage for engaging said immovable member to lock said retaining device on said carriage, and means for moving said carriage and thereby engaging said retaining element with said plunger.

54. In a machine of the class described, the combination with a detachable total retaining device, of operating mechanism for moving said device into the machine, amount manipulative means having devices normally preventing actuation thereof and means for disabling said preventing devices when the total retaining device is moved into the machine.

55. In a machine of the class described, the combination with a detachable total retaining device manually insertible into the machine, of a bank of keys, a device normally in unlocking position for locking one of said keys against operation, and controlled so as to release the key by the insertion of the device into the machine.

56. In a machine of the class described, the combination with an indicator and a totalizer, of an actuator therefor normally out of operative position therewith, manipulative means, a member differentially positioned by said manipulative means before said actuators are moved into operative position with said indicator and said totalizer and adapted to be engaged by said actuator when the actuator is moved into operative position, and operating means for moving said actuator into operative position and restoring said differentially positioned member to normal position differentially to move said actuator.

57. In a machine of the class described, the combination with a plurality of totalizers, of a pair of actuating members therefor, means for differentially moving said actuating members, means for shifting any one of said totalizers into engagement with one of said actuating members, spring drawn slides for connecting said shifting means with the desired totalizer, and manipulative means for controlling said slides for the purpose described.

58. In a machine of the class described, the combination with a plurality of printing devices each comprising a type carrier, of a pair of racks for actuating said type carriers in an additive or subtractive sense, means for differentially moving said racks, means for shifting any of said printing devices to establish coöperative relation between the type carrier and one of the actuating racks, a bank of keys having connections to control said shifting means, a platen, and a platen operative device having connections to lock said type carriers against said shifting position.

59. In a machine of the class described, the combination with a plurality of type carriers and means for differentially moving them to bring any desired combination of types to a printing line, of two platens side by side and each confronting part of said printing line, and means for operating said platens simultaneously to take an impression from all the type at the printing line and for additionally operating one of said platens.

60. In a machine of the class described, the combination with two detachable total retaining devices, means for drawing the same into the machine, two differentially movable slides positioned to be operated respectively by the two retaining devices, manipulative means for further operating one of said slides, and means for connecting the two slides only during further operation of the one slide by the manipulative means.

61. In a machine of the class described, the combination with a totalizer, of a mechanism for resetting the totalizer to normal zero position and including a pitman, and means for moving said pitman in reverse directions at successive operations of the machine to reset the totalizer to normal zero position at each operation of the machine.

62. In a machine of the class described, the combination with a totalizer including gear wheels and a shaft on which said wheels are carried, of pawls constructed to connect said wheels to said shaft, a cam fast to said shaft, a pitman, and a cam for moving said pitman in reverse directions at successive operations of the machine.

63. In a machine of the class described, the combination with a plurality of totalizer elements, of a member having reverse movements at successive operations of the machine for turning said totalizer elements in the same direction to normal zero position at every operation of the machine.

64. In a machine of the class described, the combination with a plurality of totalizer elements and a member on which said elements are carried, of means constructed to connect said elements with said carrying member, a driving member for said carrying member, means for actuating said driving member in reverse directions upon successive operations of the machine, and connections intermediate said carrying member and said driving member whereby said carrying member is driven in the same direction upon every operation of the machine.

65. In a machine of the class described, the combination with a plurality of totalizers, each comprising a plurality of denominational elements, a single set of actuators corresponding in number to the number of denominational elements of each totalizer, means for controlling the movement of the actuators; and means for establishing reverse relationship between the plurality of totalizers and the single set of actuators whereby an amount determined by the first mentioned means may be added to one of the totalizers and subtracted from the other.

66. In a machine of the class described, the combination of a plurality of totalizers, each comprising a plurality of denominational elements, a single set of actuators, a corresponding set of manipulative means, one means for each actuator for controlling differential movement of the latter; and mechanism for establishing reverse relationship between the totalizer elements of the totalizers, and the actuators whereby an amount determined by the manipulative means may be added to one totalizer and subtracted from the other.

67. In a machine of the class described, the combination of a plurality of totalizers, each comprising a plurality of denominational elements, a single set of actuators corresponding in number to the number of denominational elements of each totalizer, means for controlling the movement of the actuators, and means for establishing reverse relationship between the plurality of totalizers and the single set of actuators whereby an amount determined by the first mentioned means may be simultaneously added to one of the totalizers and subtracted from the other.

68. In a machine of the class described, the combination of a plurality of totalizers each comprising a plurality of denominational elements, a single set of actuators; a corresponding set of manipulative means, one means for each actuator for controlling differential movement of the latter; mechanism for establishing reverse relationship between the totalizer elements of the totalizers, and the actuators whereby an amount determined by the manipulative means may be added to one totalizer and subtracted from the other, and means for making a record of the amount added and subtracted from the totalizers.

69. In a machine of the class described, the combination of a plurality of totalizers each comprising a plurality of denominational elements; a set of actuators, manipulative mechanism for controlling the differential movement of the actuators comprising separate devices for each actuator, operating mechanism for the machine constructed to drive the actuators, and manipulatively controlled means for selecting a plurality of the totalizers and controlling the establishment of reverse relationship between the selected totalizers and the actuators whereby the latter may add on one and subtract from the other an amount determined by the manipulation of the manipulative mechanism.

70. In a machine of the class described, the combination of a plurality of totalizers each comprising a plurality of denominational elements; a set of actuators, manipulative mechanism for controlling the differential movement of the actuators comprising separate devices for each actuator, operating mechanism for the machine constructed to drive the actuators; manipulatively controlled means for selecting a plurality of the totalizers and controlling the establishment of reverse relationship between the selected totalizers and the actuators whereby the latter may add on one and subtract from the other an amount determined by the manipulation of the manipulative mechanism; and means for making a record of the amount added and subtracted from the totalizers.

71. In a machine of the class described, the combination with a pair of totalizers, of differentially movable devices, two racks carried by each device and positioned on opposite sides of said totalizers, operating means for said devices, and means for establishing coöperative relation during the operation of the operating mechanism, between one of the totalizers and the racks on one side and the other totalizer and the racks on the other side to add on one and subtract from the other of said totalizers.

In testimony whereof I affix my signature in the presence of two witnesses.

EDMUND S. CHURCH.

Witnesses:
 Roy C. Glass,
 Carl W. Beust.